US012615575B2

(12) United States Patent
Liu et al.

(10) Patent No.: US 12,615,575 B2
(45) Date of Patent: Apr. 28, 2026

(54) SIDELINK SYNCHRONIZATION SIGNAL BLOCK TRANSMISSIONS IN A SHARED SPECTRUM

(71) Applicant: QUALCOMM Incorporated, San Diego, CA (US)

(72) Inventors: Chih-Hao Liu, San Diego, CA (US); Jing Sun, San Diego, CA (US); Xiaoxia Zhang, San Diego, CA (US); Yisheng Xue, San Diego, CA (US); Juan Montojo, San Diego, CA (US); Tao Luo, San Diego, CA (US); Peter Gaal, San Diego, CA (US); Changlong Xu, Beijing (CN); Ozcan Ozturk, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 685 days.

(21) Appl. No.: 18/000,334

(22) PCT Filed: Jun. 9, 2020

(86) PCT No.: PCT/CN2020/095067
§ 371 (c)(1),
(2) Date: Nov. 30, 2022

(87) PCT Pub. No.: WO2021/248300
PCT Pub. Date: Dec. 16, 2021

(65) Prior Publication Data
US 2023/0247528 A1 Aug. 3, 2023

(51) Int. Cl.
*H04W 48/08* (2009.01)
*H04W 74/0808* (2024.01)

(52) U.S. Cl.
CPC ....... *H04W 48/08* (2013.01); *H04W 74/0808* (2013.01)

(58) Field of Classification Search
None
See application file for complete search history.

(56) References Cited

U.S. PATENT DOCUMENTS

| 10,541,851 B2 | 1/2020 | Malik et al. |
| 11,064,424 B2 | 7/2021 | Zhang et al. |
| (Continued) | | |

FOREIGN PATENT DOCUMENTS

| CN | 110582113 A | 12/2019 |
| CN | 110692276 A | 1/2020 |
| (Continued) | | |

OTHER PUBLICATIONS

Catt: "Sidelink Synchronization Mechanism in NR V2X", 3GPP TSG RAN WG1 Meeting #98bis, R1-1910330 Sidelink Synchronization Mechanism in NR V2X—Final, 3rd Generation Partnership Project, Mobile Competence Centre, 650, Route Des Lucioles, F-06921 Sophia-Antipolis CE, vol. RAN WG1, No. Chongqing, China, Oct. 14, 2019-Oct. 18, 2019 Oct. 5, 2019, XP051789134, 13 Pages, Figures 3, 4 Sections 1, 2.3, 2.4.2, Sections 1, 2.4.2-2.4.3.

(Continued)

*Primary Examiner* — Ayman A Abaza
*Assistant Examiner* — Camquyen Thai
(74) *Attorney, Agent, or Firm* — QUALCOMM Incorporated

(57) ABSTRACT

Methods, systems, and devices for wireless communications are described. Generally, the described techniques provide for efficiently identifying resources for transmitting one or more sidelink synchronization signal blocks (S-SSBs) in the shared spectrum or efficiently beam sweeping multiple S-SSBs in the shared spectrum. In one aspect, a user equipment (UE) may transmit an S-SSB in a sidelink bandwidth part (BWP) in the shared spectrum such that a lower edge of the S-SSB is aligned with or offset from a (Continued)

Identify a discovery reference signal (DRS) window in a shared spectrum including a set of starting positions for transmitting one or more sidelink synchronization signal blocks ⟍2205

Perform a listen-before-talk procedure to gain access to the discovery reference signal window in the shared spectrum ⟍2210

Transmit the one or more sidelink synchronization signal blocks at a first starting position of the set of starting positions after gaining access to the discovery reference signal window in the shared spectrum ⟍2215

⟍2200 lower edge of the sidelink BWP. In another aspect, a UE may beam sweep S-SSBs in one or more S-SSB bursts in a S-SSB period to improve the chances that another UE may receive the S-SSBs. In yet another aspect, resources allocated for S-SSB transmissions may facilitate flexible S-SSB transmissions while minimizing gaps to prevent other UEs from incorrectly determining that a sidelink BWP in a shared spectrum is clear for transmission.

24 Claims, 28 Drawing Sheets

(56)                  References Cited

U.S. PATENT DOCUMENTS

| | | | | |
|---|---|---|---|---|
| 2018/0049142 | A1* | 2/2018 | Yang | H04L 5/0048 |
| 2018/0241526 | A1* | 8/2018 | Chendamarai Kannan | |
| | | | | H04B 7/06952 |
| 2019/0150068 | A1* | 5/2019 | Montojo | H04L 5/0046 |
| | | | | 370/329 |
| 2020/0053637 | A1* | 2/2020 | Tsai | H04L 5/0094 |
| 2020/0084739 | A1* | 3/2020 | Si | H04L 5/0048 |
| 2020/0329494 | A1* | 10/2020 | Mondal | H04W 74/0808 |
| 2020/0367184 | A1* | 11/2020 | Huang | H04L 5/00 |
| 2021/0282079 | A1* | 9/2021 | Wu | H04L 5/005 |
| 2022/0263618 | A1* | 8/2022 | Harada | H04L 5/0048 |
| 2022/0264646 | A1* | 8/2022 | Wang | H04W 74/0866 |
| 2022/0311575 | A1* | 9/2022 | He | H04L 5/0048 |
| 2022/0394638 | A1* | 12/2022 | Yang | H04L 5/005 |
| 2023/0121866 | A1* | 4/2023 | Wu | H04L 1/1812 |
| | | | | 370/329 |

FOREIGN PATENT DOCUMENTS

| | | |
|---|---|---|
| CN | 110971362 A | 4/2020 |
| JP | 2018512782 A | 5/2018 |
| WO | WO-2018217471 | 11/2018 |
| WO | WO-2019023241 | 1/2019 |
| WO | WO-2020001285 A1 | 1/2020 |
| WO | WO-2020020031 A1 | 1/2020 |
| WO | WO-2020027635 A1 | 2/2020 |
| WO | WO-2020032203 A1 | 2/2020 |
| WO | WO-2020032781 A1 | 2/2020 |
| WO | WO-2020033795 A1 | 2/2020 |
| WO | WO-2021237654 A1 | 12/2021 |

OTHER PUBLICATIONS

Fujitsu: "Enhancements to Initial Access Procedure and Scheduling Request Procedure for NR-U", 3GPP TSG RAN WG1 #96bis, R1-1904588, Xi'an, China, Apr. 8-12, 2019, Apr. 12, 2019 (Apr. 12, 2019) Section 2.1, pp. 1-7.
International Search Report and Written Opinion—PCT/CN2020/095067—ISA/EPO—Mar. 8, 2021.
Vivo: "NR Sidelink Synchronization Mechanism", 3GPP Draft, 3GPP TSG RAN WG1 Meeting #95, R1-1812308_NR Sidelink Synchronization Mechanism, 3rd Generation Partnership Project (3GPP), Mobile Competence Centre, 650, Route Des Lucioles, F-06921 Sophia-Antipolis Cedex, France, vol. RAN WG1, No. Spokane, USA, Nov. 12, 2018-Nov. 16, 2018, Nov. 11, 2018 (Nov. 11, 2018), XP051554213, 8 Pages.
Huawei, et al., "Sidelink Synchronization Mechanisms for NR V2X", 3GPP TSG RAN WG1 Meeting #98bis, R1-1910057, 3rd Generation Partnership Project (3GPP), Mobile Competence Centre, 650, Route Des Lucioles, F-06921 Sophia-Antipolis, vol. RAN WG1, No. Chongqing, China, Oct. 14-20, 2019, Oct. 20, 2019, XP051788864, Sections 1-2, 27 Pages, Para [0005].
Samsung: "Discussion on Resource Allocation Mechanisms for NR V2X", 3GPP Draft, 3GPP TSG RAN WG1 Meeting #95, R1-1812987 Discussion on Resource Allocation Mechanisms for NR V2X, 3rd Generation Partnership Project (3GPP), Mobile Competence Centre, 650, Route Des Lucioles, F-06921 Sophia-Antipolis, vol. RAN WG1, No. Spokane, USA, Nov. 12, 2018-Nov. 16, 2018 Nov. 11, 2018 (Nov. 11, 2018), XP051554966, 7 Pages, Para [03.1].
Supplementary European Search Report—EP20939827—Search Authority—The Hague—Feb. 7, 2024.
Ericsson: "On Details of S-SSB Design", 3GPP TSG-RAN WG1 Meeting #96bis, R1-1905503, Xi'an, China, Apr. 8-12, 2019, pp. 1-5.

* cited by examiner

FIG. 5

DRS Window 705

| S-SSB 0 715-a | S-SSB 1 715-b | S-SSB 2 715-c | S-SSB 3 715-d |

Starting
Position
720-a

Starting
Position
720-b

Transmitted Sweeping Burst 710

| S-SSB 1 715-b | S-SSB 2 715-c |

LBT
Fails

LBT
Clears

700

First slot 805-a                    First slot 805-b

LBT
Clear

Pad the gap with
PBCH extension
810

800-a

First slot 805-c                    First slot 805-d

LBT
Clear

Pad the gap with
CP extension
815

800-b

Figure 9:
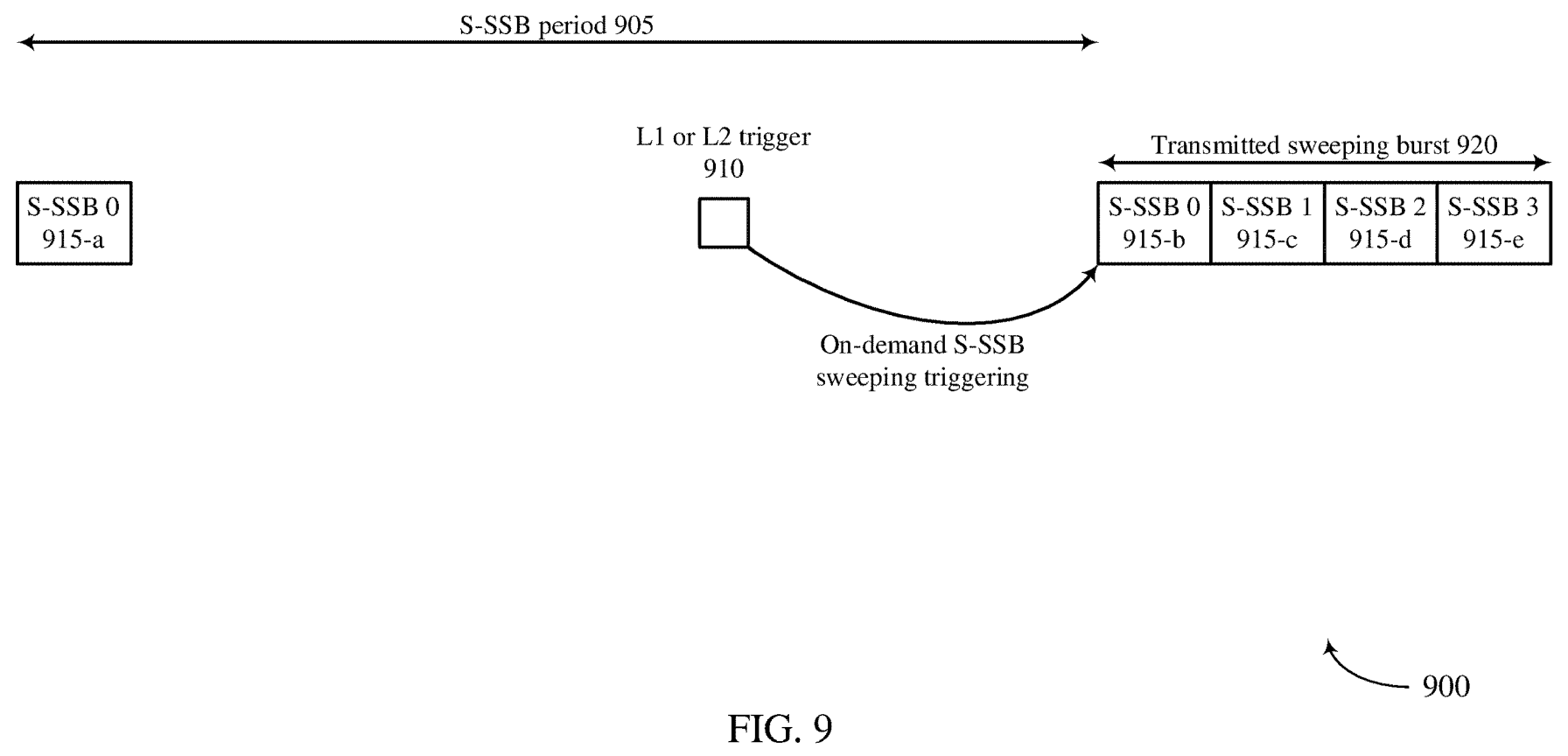

S-SSB period 905

S-SSB 0
915-a

L1 or L2 trigger
910

On-demand S-SSB
sweeping triggering

Transmitted sweeping burst 920

| S-SSB 0 | S-SSB 1 | S-SSB 2 | S-SSB 3 |
|---------|---------|---------|---------|
| 915-b   | 915-c   | 915-d   | 915-e   |

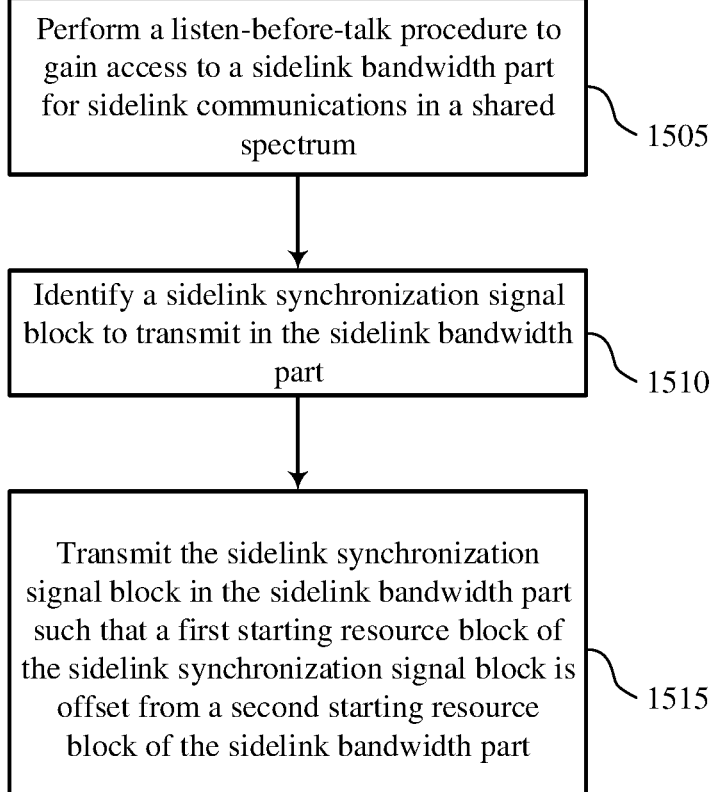

Perform a listen-before-talk procedure to gain access to a sidelink bandwidth part for sidelink communications in a shared spectrum
1505

Identify a sidelink synchronization signal block to transmit in the sidelink bandwidth part
1510

Transmit the sidelink synchronization signal block in the sidelink bandwidth part such that a first starting resource block of the sidelink synchronization signal block is offset from a second starting resource block of the sidelink bandwidth part
1515

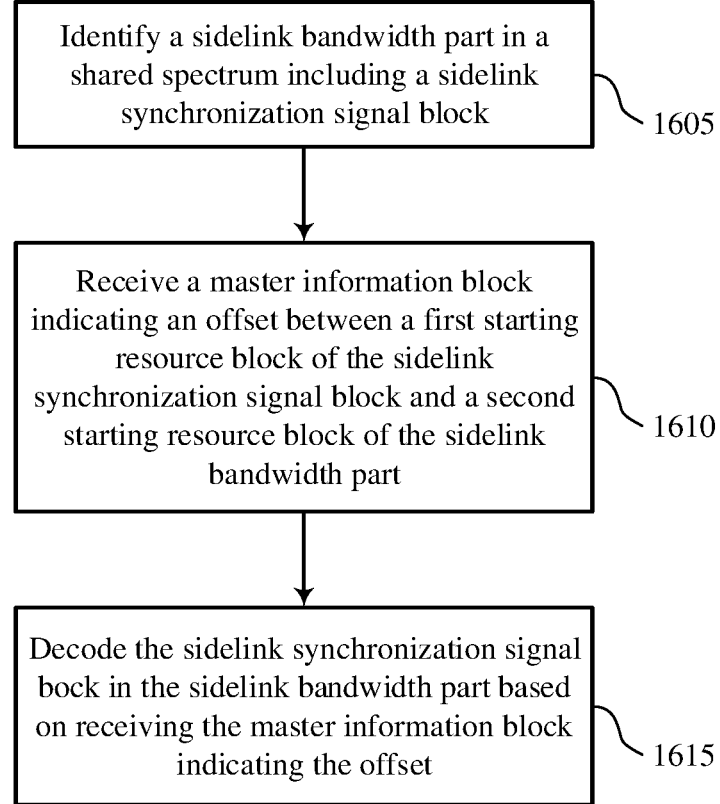

Identify a sidelink bandwidth part in a shared spectrum including a sidelink synchronization signal block

1605

Receive a master information block indicating an offset between a first starting resource block of the sidelink synchronization signal block and a second starting resource block of the sidelink bandwidth part

1610

Decode the sidelink synchronization signal bock in the sidelink bandwidth part based on receiving the master information block indicating the offset

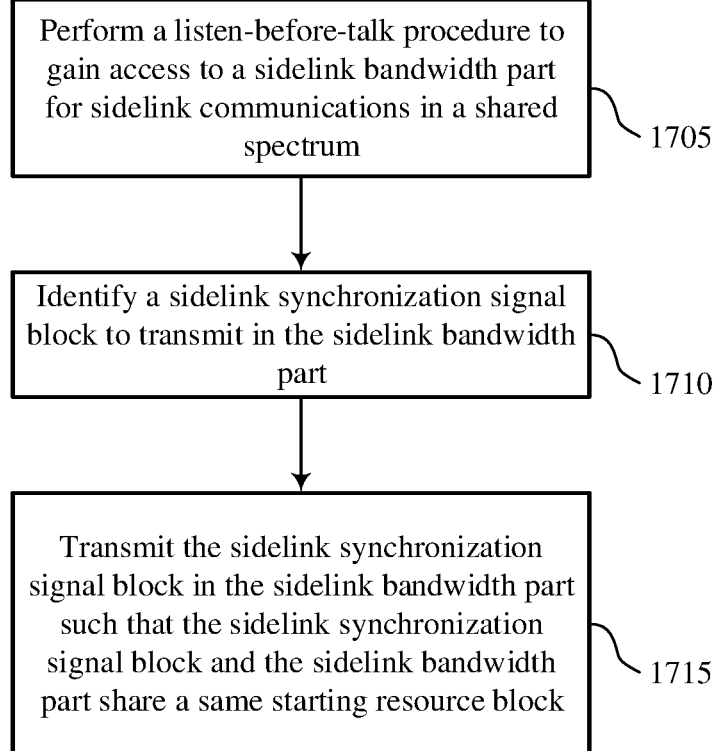

Perform a listen-before-talk procedure to gain access to a sidelink bandwidth part for sidelink communications in a shared spectrum

1705

Identify a sidelink synchronization signal block to transmit in the sidelink bandwidth part

1710

Transmit the sidelink synchronization signal block in the sidelink bandwidth part such that the sidelink synchronization signal block and the sidelink bandwidth part share a same starting resource block

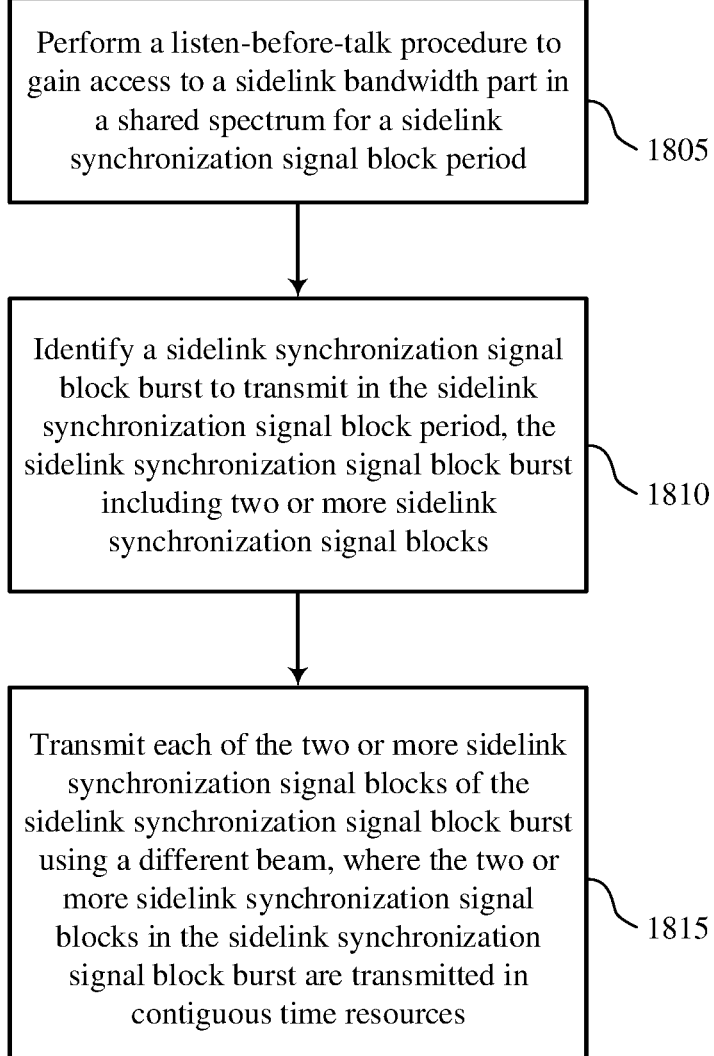

Perform a listen-before-talk procedure to gain access to a sidelink bandwidth part in a shared spectrum for a sidelink synchronization signal block period

1805

Identify a sidelink synchronization signal block burst to transmit in the sidelink synchronization signal block period, the sidelink synchronization signal block burst including two or more sidelink synchronization signal blocks

1810

Transmit each of the two or more sidelink synchronization signal blocks of the sidelink synchronization signal block burst using a different beam, where the two or more sidelink synchronization signal blocks in the sidelink synchronization signal block burst are transmitted in contiguous time resources

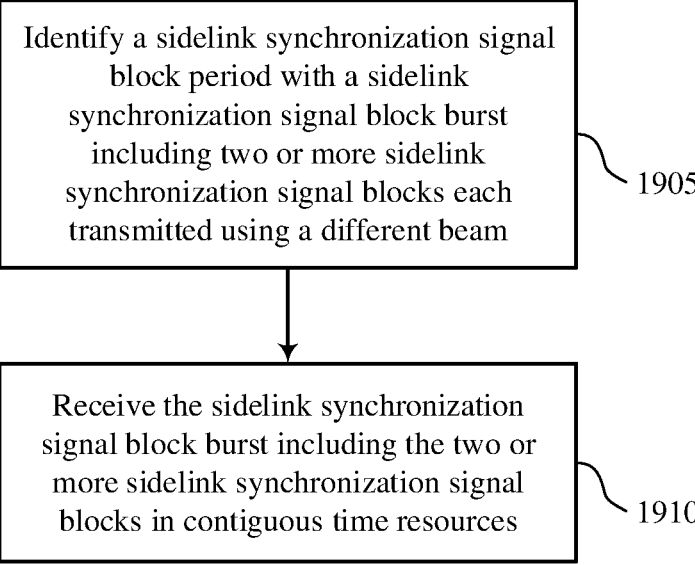

Identify a sidelink synchronization signal block period with a sidelink synchronization signal block burst including two or more sidelink synchronization signal blocks each transmitted using a different beam

1905

Receive the sidelink synchronization signal block burst including the two or more sidelink synchronization signal blocks in contiguous time resources

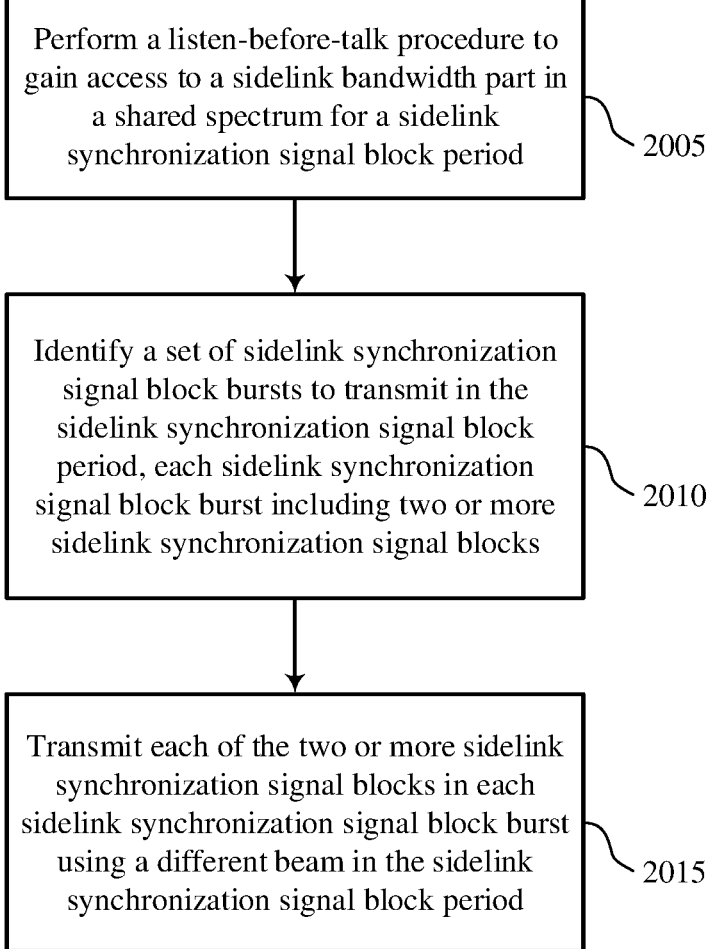

Perform a listen-before-talk procedure to gain access to a sidelink bandwidth part in a shared spectrum for a sidelink synchronization signal block period

2005

Identify a set of sidelink synchronization signal block bursts to transmit in the sidelink synchronization signal block period, each sidelink synchronization signal block burst including two or more sidelink synchronization signal blocks

2010

Transmit each of the two or more sidelink synchronization signal blocks in each sidelink synchronization signal block burst using a different beam in the sidelink synchronization signal block period

Figure 21:
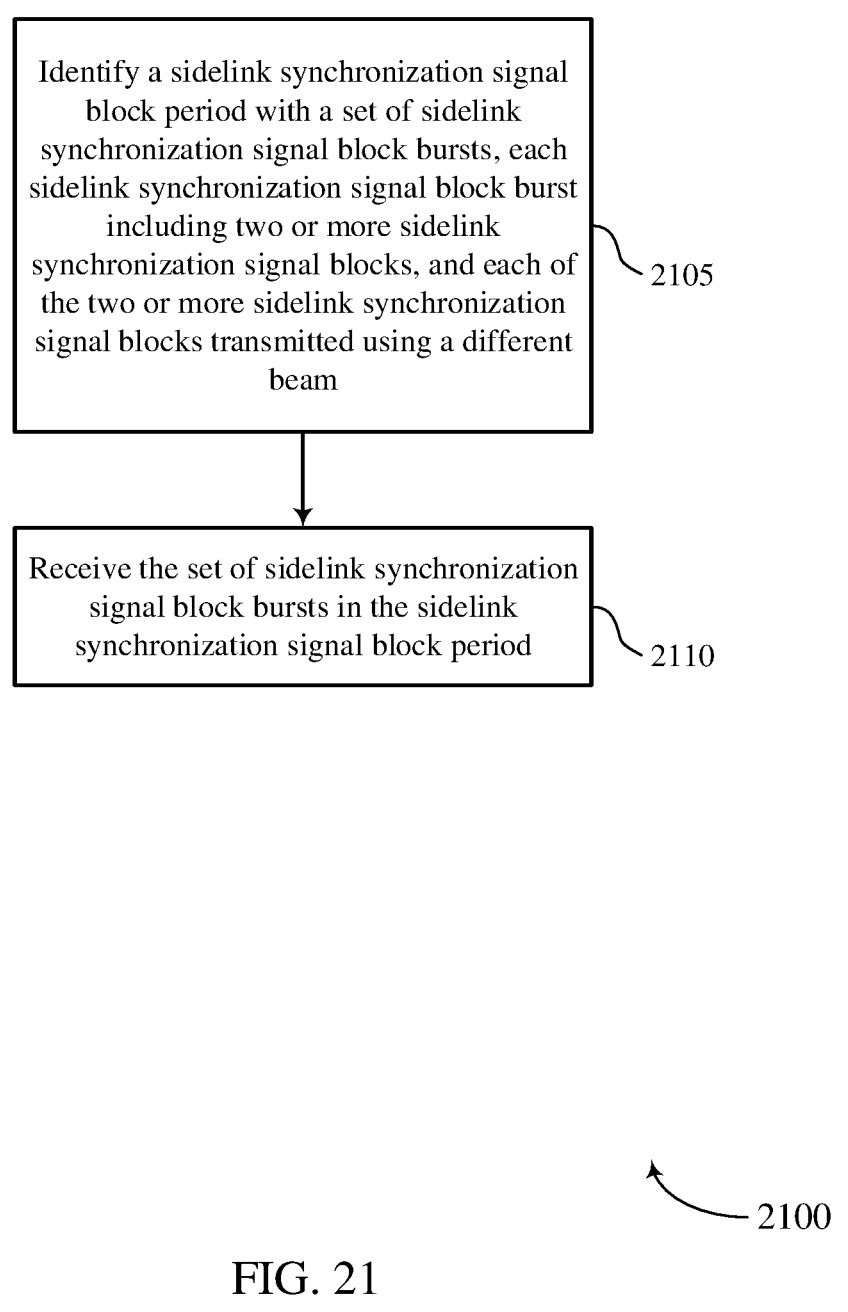

Identify a sidelink synchronization signal block period with a set of sidelink synchronization signal block bursts, each sidelink synchronization signal block burst including two or more sidelink synchronization signal blocks, and each of the two or more sidelink synchronization signal blocks transmitted using a different beam

2105

Receive the set of sidelink synchronization signal block bursts in the sidelink synchronization signal block period

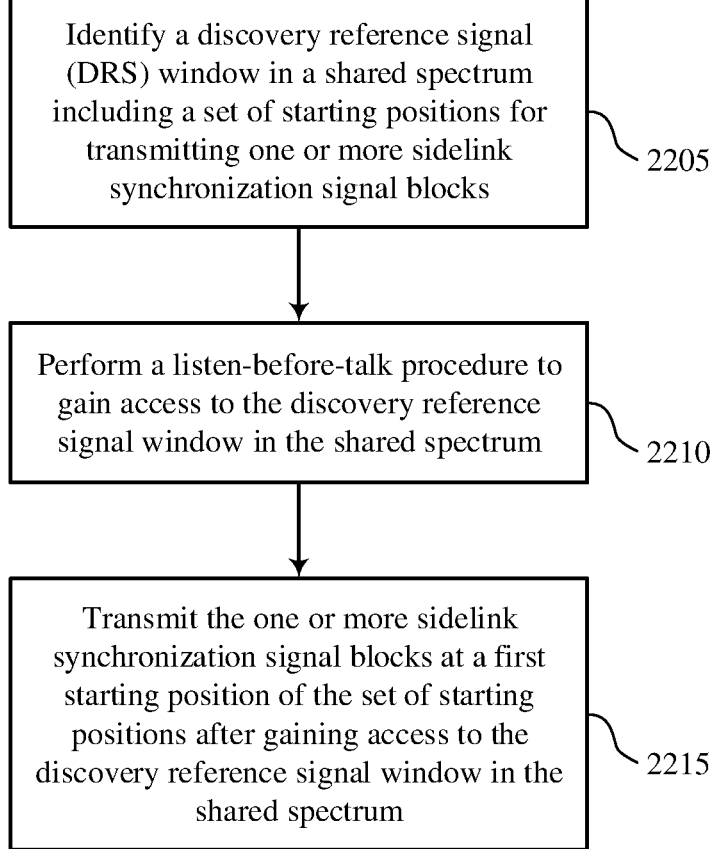

Identify a discovery reference signal
(DRS) window in a shared spectrum
including a set of starting positions for
transmitting one or more sidelink
synchronization signal blocks

2205

Perform a listen-before-talk procedure to
gain access to the discovery reference
signal window in the shared spectrum

2210

Transmit the one or more sidelink
synchronization signal blocks at a first
starting position of the set of starting
positions after gaining access to the
discovery reference signal window in the
shared spectrum

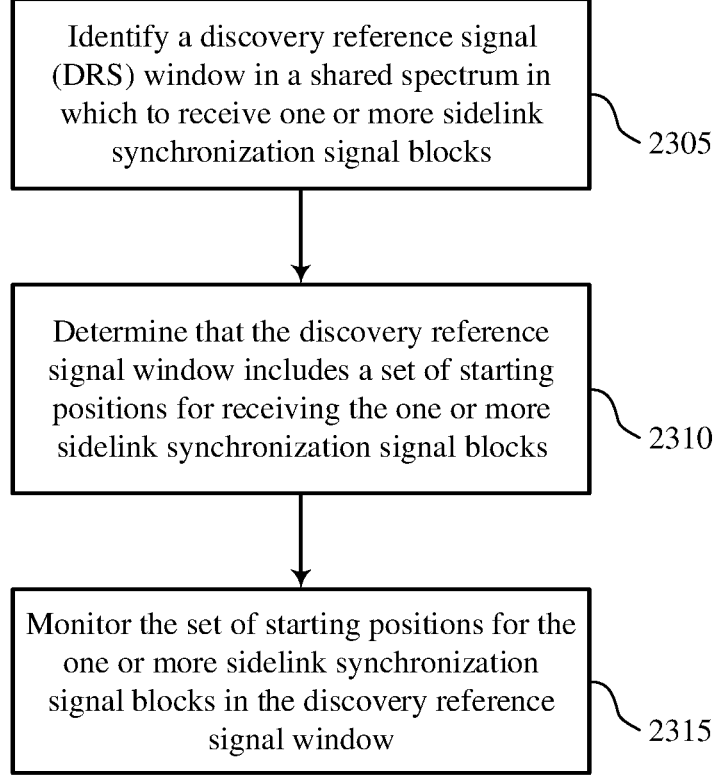

Identify a discovery reference signal (DRS) window in a shared spectrum in which to receive one or more sidelink synchronization signal blocks

2305

Determine that the discovery reference signal window includes a set of starting positions for receiving the one or more sidelink synchronization signal blocks

2310

Monitor the set of starting positions for the one or more sidelink synchronization signal blocks in the discovery reference signal window

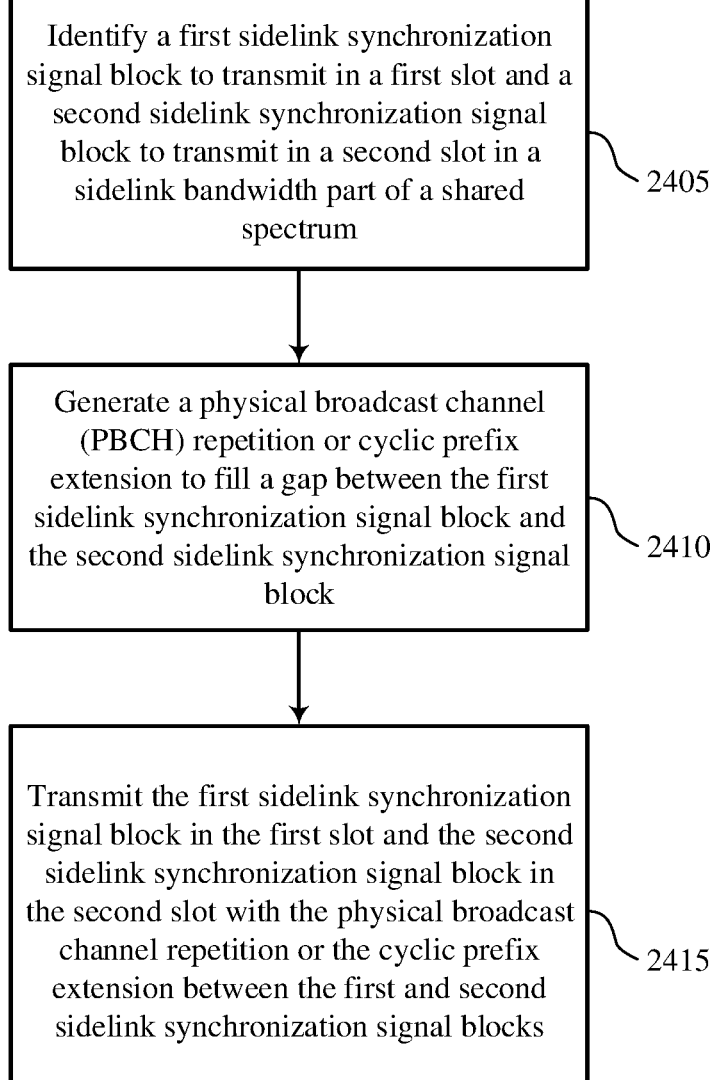

Identify a first sidelink synchronization signal block to transmit in a first slot and a second sidelink synchronization signal block to transmit in a second slot in a sidelink bandwidth part of a shared spectrum

2405

Generate a physical broadcast channel (PBCH) repetition or cyclic prefix extension to fill a gap between the first sidelink synchronization signal block and the second sidelink synchronization signal block

2410

Transmit the first sidelink synchronization signal block in the first slot and the second sidelink synchronization signal block in the second slot with the physical broadcast channel repetition or the cyclic prefix extension between the first and second sidelink synchronization signal blocks

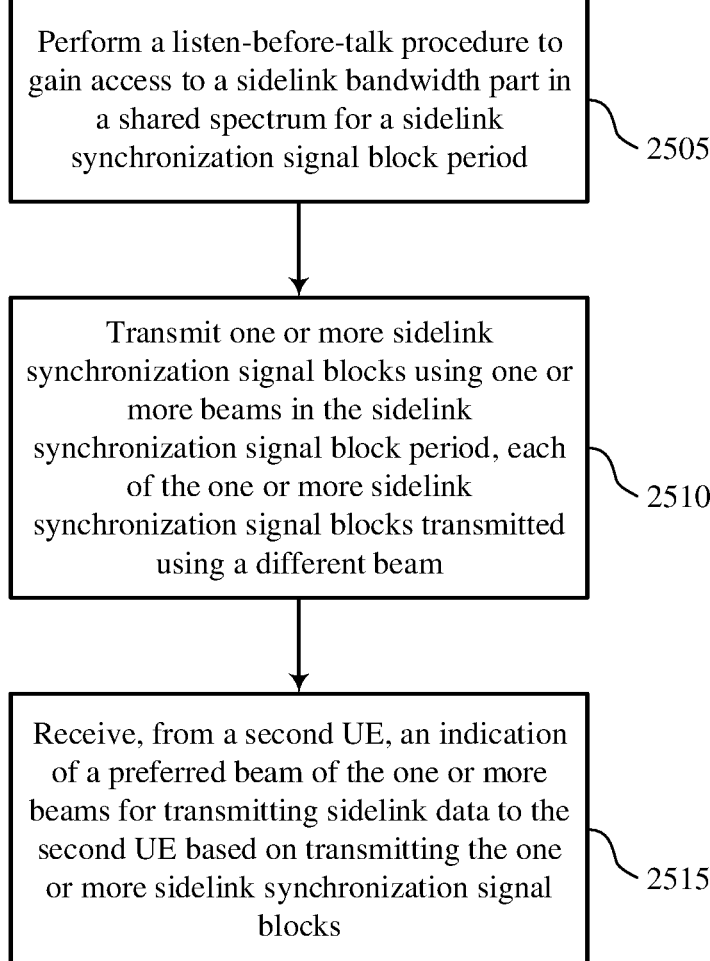

Perform a listen-before-talk procedure to gain access to a sidelink bandwidth part in a shared spectrum for a sidelink synchronization signal block period

2505

Transmit one or more sidelink synchronization signal blocks using one or more beams in the sidelink synchronization signal block period, each of the one or more sidelink synchronization signal blocks transmitted using a different beam

2510

Receive, from a second UE, an indication of a preferred beam of the one or more beams for transmitting sidelink data to the second UE based on transmitting the one or more sidelink synchronization signal blocks

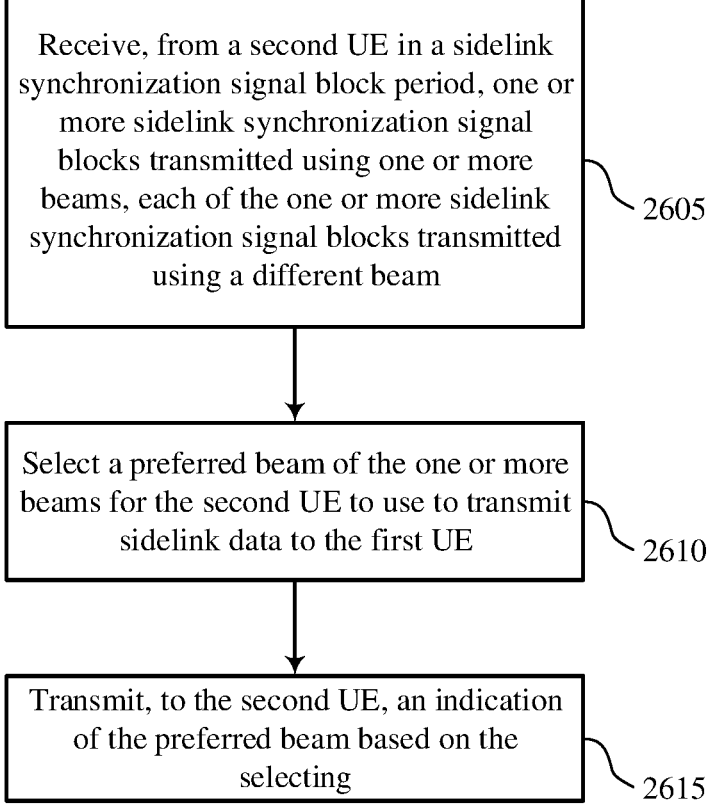

Receive, from a second UE in a sidelink synchronization signal block period, one or more sidelink synchronization signal blocks transmitted using one or more beams, each of the one or more sidelink synchronization signal blocks transmitted using a different beam

2605

Select a preferred beam of the one or more beams for the second UE to use to transmit sidelink data to the first UE

2610

Transmit, to the second UE, an indication of the preferred beam based on the selecting

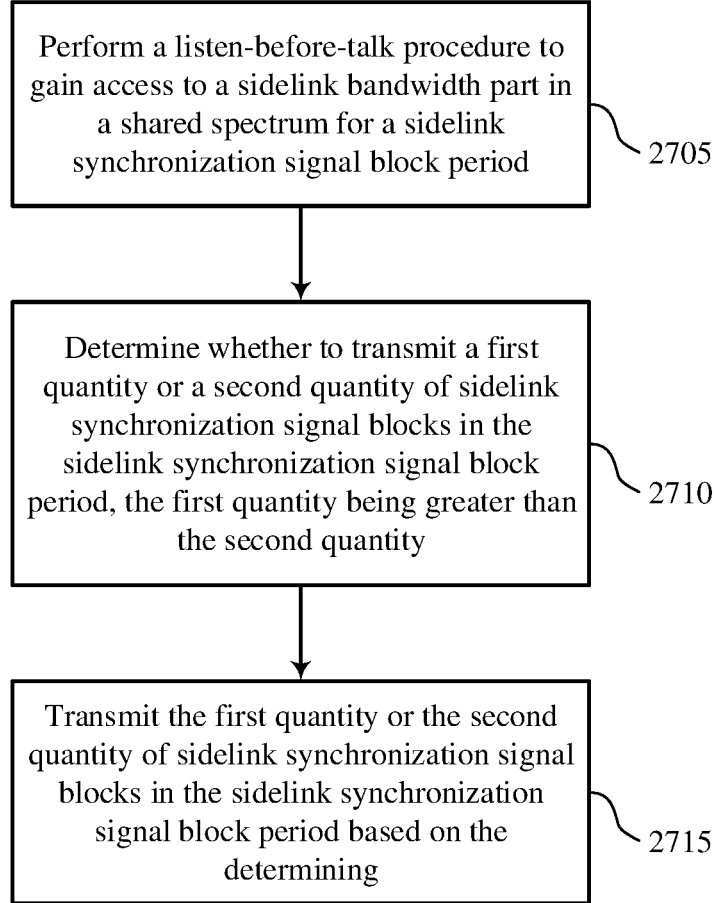

Perform a listen-before-talk procedure to gain access to a sidelink bandwidth part in a shared spectrum for a sidelink synchronization signal block period

2705

Determine whether to transmit a first quantity or a second quantity of sidelink synchronization signal blocks in the sidelink synchronization signal block period, the first quantity being greater than the second quantity

2710

Transmit the first quantity or the second quantity of sidelink synchronization signal blocks in the sidelink synchronization signal block period based on the determining

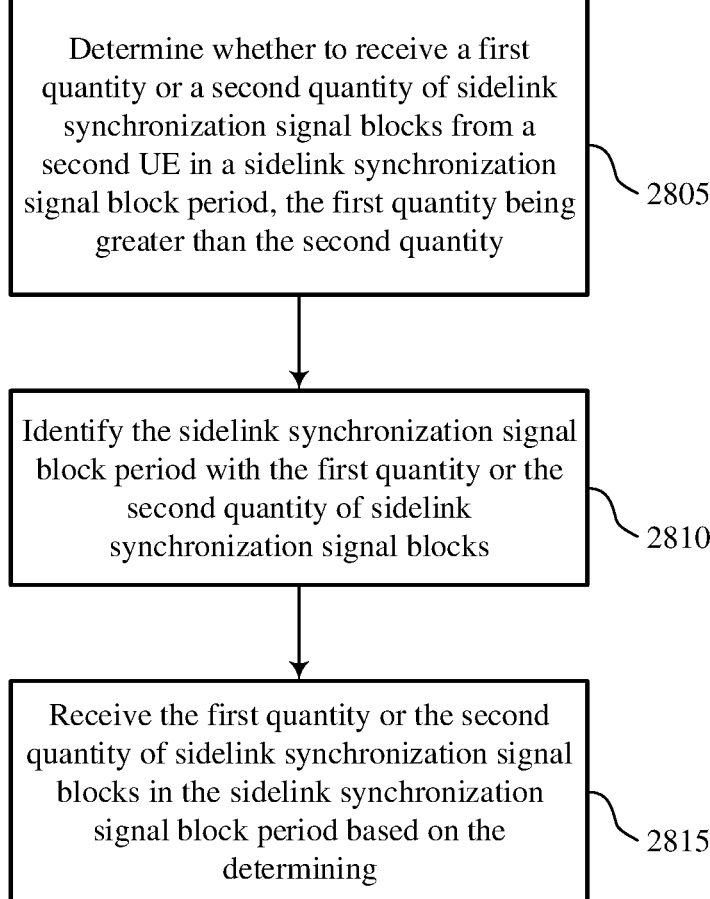

Determine whether to receive a first quantity or a second quantity of sidelink synchronization signal blocks from a second UE in a sidelink synchronization signal block period, the first quantity being greater than the second quantity

2805

Identify the sidelink synchronization signal block period with the first quantity or the second quantity of sidelink synchronization signal blocks

2810

Receive the first quantity or the second quantity of sidelink synchronization signal blocks in the sidelink synchronization signal block period based on the determining

SIDELINK SYNCHRONIZATION SIGNAL BLOCK TRANSMISSIONS IN A SHARED SPECTRUM

CROSS REFERENCE

The present application is a 371 national stage filing of International PCT Application No. PCT/CN2020/095067 by Liu et al. entitled "SIDELINK SYNCHRONIZATION SIGNAL BLOCK TRANSMISSIONS IN A SHARED SPECTRUM," filed Jun. 9, 2020, which is assigned to the assignee hereof, and which is expressly incorporated by reference in its entirety herein.

FIELD OF TECHNOLOGY

The following relates generally to wireless communications and more specifically to sidelink synchronization signal block (S-SSB) transmissions in a shared spectrum.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include a number of base stations or network access nodes, each simultaneously supporting communication for multiple communication devices, which may be otherwise known as user equipment (UEs). Some wireless communications systems may support sidelink communications between UEs over a shared spectrum. In such systems, a UE may have to contend for access to the shared spectrum to transmit sidelink signals to another UE. For instance, the UE may perform a listen-before-talk (LBT) procedure to gain access to a sidelink BWP to transmit sidelink synchronization signal blocks (S-SSBs) on the sidelink BWP. Improved techniques for supporting S-SSB transmissions in a shared spectrum may be desirable.

SUMMARY

The present disclosure relates to methods, systems, devices, and apparatuses that support sidelink synchronization signal block (S-SSB) transmissions in a shared spectrum. Generally, the described techniques provide for efficiently identifying resources for transmitting one or more S-SSBs in the shared spectrum or efficiently beam sweeping multiple S-SSBs in the shared spectrum. In one aspect, a user equipment (UE) may transmit an S-SSB in a sidelink bandwidth part (BWP) in the shared spectrum such that a lower edge of the S-SSB is aligned with or offset from a lower edge of the sidelink BWP. In another aspect, a UE may beam sweep S-SSBs in one or more S-SSB bursts in a S-SSB period to improve the chances that another UE may receive the S-SSBs. In yet another aspect, resources allocated for S-SSB transmissions may facilitate flexible S-SSB transmissions while minimizing gaps to prevent other UEs from incorrectly determining that a sidelink BWP in a shared spectrum is clear for transmission.

A method of wireless communication at a UE is described. The method may include performing a listen-before-talk procedure to gain access to a sidelink bandwidth part for sidelink communications in a shared spectrum, identifying a sidelink synchronization signal block to transmit in the sidelink bandwidth part, and transmitting the sidelink synchronization signal block in the sidelink bandwidth part such that a first starting resource block of the sidelink synchronization signal block is offset from a second starting resource block of the sidelink bandwidth part.

An apparatus for wireless communication at a UE is described. The apparatus may include a processor, memory coupled with the processor, and instructions stored in the memory. The instructions may be executable by the processor to cause the apparatus to perform a listen-before-talk procedure to gain access to a sidelink bandwidth part for sidelink communications in a shared spectrum, identify a sidelink synchronization signal block to transmit in the sidelink bandwidth part, and transmit the sidelink synchronization signal block in the sidelink bandwidth part such that a first starting resource block of the sidelink synchronization signal block is offset from a second starting resource block of the sidelink bandwidth part.

Another apparatus for wireless communication at a UE is described. The apparatus may include means for performing a listen-before-talk procedure to gain access to a sidelink bandwidth part for sidelink communications in a shared spectrum, identifying a sidelink synchronization signal block to transmit in the sidelink bandwidth part, and transmitting the sidelink synchronization signal block in the sidelink bandwidth part such that a first starting resource block of the sidelink synchronization signal block is offset from a second starting resource block of the sidelink bandwidth part.

A non-transitory computer-readable medium storing code for wireless communication at a UE is described. The code may include instructions executable by a processor to perform a listen-before-talk procedure to gain access to a sidelink bandwidth part for sidelink communications in a shared spectrum, identify a sidelink synchronization signal block to transmit in the sidelink bandwidth part, and transmit the sidelink synchronization signal block in the sidelink bandwidth part such that a first starting resource block of the sidelink synchronization signal block is offset from a second starting resource block of the sidelink bandwidth part.

Some examples of the method, apparatuses, and non-transitory computer-readable medium described herein may further include operations, features, means, or instructions for transmitting, in a master information block, an indication of the offset between the first starting resource block of the sidelink synchronization signal block and the second starting resource block of the sidelink bandwidth part. In some examples of the method, apparatuses, and non-transitory computer-readable medium described herein, the sidelink synchronization signal block and a downlink synchronization signal block in the shared spectrum share a same synchronization raster. In some examples of the method, apparatuses, and non-transitory computer-readable medium described herein, the second starting resource block of the sidelink bandwidth part includes an index of zero.

A method of wireless communication at a UE is described. The method may include identifying a sidelink bandwidth part in a shared spectrum including a sidelink synchronization signal block, receiving a master information block indicating an offset between a first starting resource block of the sidelink synchronization signal block and a second starting resource block of the sidelink bandwidth part, and decoding the sidelink synchronization signal bock in the sidelink bandwidth part based on receiving the master information block indicating the offset.

An apparatus for wireless communication at a UE is described. The apparatus may include a processor, memory coupled with the processor, and instructions stored in the memory. The instructions may be executable by the processor to cause the apparatus to identify a sidelink bandwidth part in a shared spectrum including a sidelink synchronization signal block, receive a master information block indicating an offset between a first starting resource block of the sidelink synchronization signal block and a second starting resource block of the sidelink bandwidth part, and decode the sidelink synchronization signal bock in the sidelink bandwidth part based on receiving the master information block indicating the offset.

Another apparatus for wireless communication at a UE is described. The apparatus may include means for identifying a sidelink bandwidth part in a shared spectrum including a sidelink synchronization signal block, receiving a master information block indicating an offset between a first starting resource block of the sidelink synchronization signal block and a second starting resource block of the sidelink bandwidth part, and decoding the sidelink synchronization signal bock in the sidelink bandwidth part based on receiving the master information block indicating the offset.

A non-transitory computer-readable medium storing code for wireless communication at a UE is described. The code may include instructions executable by a processor to identify a sidelink bandwidth part in a shared spectrum including a sidelink synchronization signal block, receive a master information block indicating an offset between a first starting resource block of the sidelink synchronization signal block and a second starting resource block of the sidelink bandwidth part, and decode the sidelink synchronization signal bock in the sidelink bandwidth part based on receiving the master information block indicating the offset.

In some examples of the method, apparatuses, and non-transitory computer-readable medium described herein, the sidelink synchronization signal block and a downlink synchronization signal block in the shared spectrum share a same synchronization raster. In some examples of the method, apparatuses, and non-transitory computer-readable medium described herein, an index of the second starting resource block of the sidelink bandwidth part may be zero.

A method of wireless communication at a UE is described. The method may include performing a listen-before-talk procedure to gain access to a sidelink bandwidth part for sidelink communications in a shared spectrum, identifying a sidelink synchronization signal block to transmit in the sidelink bandwidth part, and transmitting the sidelink synchronization signal block in the sidelink bandwidth part such that the sidelink synchronization signal block and the sidelink bandwidth part share a same starting resource block.

An apparatus for wireless communication at a UE is described. The apparatus may include a processor, memory coupled with the processor, and instructions stored in the memory. The instructions may be executable by the processor to cause the apparatus to perform a listen-before-talk procedure to gain access to a sidelink bandwidth part for sidelink communications in a shared spectrum, identify a sidelink synchronization signal block to transmit in the sidelink bandwidth part, and transmit the sidelink synchronization signal block in the sidelink bandwidth part such that the sidelink synchronization signal block and the sidelink bandwidth part share a same starting resource block.

Another apparatus for wireless communication at a UE is described. The apparatus may include means for performing a listen-before-talk procedure to gain access to a sidelink bandwidth part for sidelink communications in a shared spectrum, identifying a sidelink synchronization signal block to transmit in the sidelink bandwidth part, and transmitting the sidelink synchronization signal block in the sidelink bandwidth part such that the sidelink synchronization signal block and the sidelink bandwidth part share a same starting resource block.

A non-transitory computer-readable medium storing code for wireless communication at a UE is described. The code may include instructions executable by a processor to perform a listen-before-talk procedure to gain access to a sidelink bandwidth part for sidelink communications in a shared spectrum, identify a sidelink synchronization signal block to transmit in the sidelink bandwidth part, and transmit the sidelink synchronization signal block in the sidelink bandwidth part such that the sidelink synchronization signal block and the sidelink bandwidth part share a same starting resource block.

In some examples of the method, apparatuses, and non-transitory computer-readable medium described herein, a first synchronization raster of the sidelink synchronization signal block may be different from a second synchronization raster of a downlink synchronization signal block in the shared spectrum. In some examples of the method, apparatuses, and non-transitory computer-readable medium described herein, an index of the same starting resource block of the sidelink synchronization signal block and the sidelink bandwidth part may be zero.

A method of wireless communication at a UE is described. The method may include performing a listen-before-talk procedure to gain access to a sidelink bandwidth part in a shared spectrum for a sidelink synchronization signal block period, identifying a sidelink synchronization signal block burst to transmit in the sidelink synchronization signal block period, the sidelink synchronization signal block burst including two or more sidelink synchronization signal blocks, and transmitting each of the two or more sidelink synchronization signal blocks of the sidelink synchronization signal block burst using a different beam, where the two or more sidelink synchronization signal blocks in the sidelink synchronization signal block burst are transmitted in contiguous time resources.

An apparatus for wireless communication at a UE is described. The apparatus may include a processor, memory coupled with the processor, and instructions stored in the memory. The instructions may be executable by the processor to cause the apparatus to perform a listen-before-talk procedure to gain access to a sidelink bandwidth part in a shared spectrum for a sidelink synchronization signal block period, identify a sidelink synchronization signal block burst to transmit in the sidelink synchronization signal block period, the sidelink synchronization signal block burst including two or more sidelink synchronization signal blocks, and transmit each of the two or more sidelink synchronization signal blocks of the sidelink synchronization signal block burst using a different beam, where the two or more sidelink synchronization signal blocks in the sidelink synchronization signal block burst are transmitted in contiguous time resources.

Another apparatus for wireless communication at a UE is described. The apparatus may include means for performing a listen-before-talk procedure to gain access to a sidelink bandwidth part in a shared spectrum for a sidelink synchronization signal block period, identifying a sidelink synchronization signal block burst to transmit in the sidelink synchronization signal block period, the sidelink synchronization signal block burst including two or more sidelink synchronization signal blocks, and transmitting each of the two or more sidelink synchronization signal blocks of the sidelink synchronization signal block burst using a different beam, where the two or more sidelink synchronization signal blocks in the sidelink synchronization signal block burst are transmitted in contiguous time resources.

A non-transitory computer-readable medium storing code for wireless communication at a UE is described. The code may include instructions executable by a processor to perform a listen-before-talk procedure to gain access to a sidelink bandwidth part in a shared spectrum for a sidelink synchronization signal block period, identify a sidelink synchronization signal block burst to transmit in the sidelink synchronization signal block period, the sidelink synchronization signal block burst including two or more sidelink synchronization signal blocks, and transmit each of the two or more sidelink synchronization signal blocks of the sidelink synchronization signal block burst using a different beam, where the two or more sidelink synchronization signal blocks in the sidelink synchronization signal block burst are transmitted in contiguous time resources.

Some examples of the method, apparatuses, and non-transitory computer-readable medium described herein may further include operations, features, means, or instructions for identifying a beam for transmitting a sidelink synchronization signal block of the two or more sidelink synchronization signal blocks, and encoding at least a portion of a demodulation reference signal scrambling sequence included with the sidelink synchronization signal block based on a beam index of the identified beam. In some examples of the method, apparatuses, and non-transitory computer-readable medium described herein, encoding the at least the portion of the demodulation reference signal may include operations, features, means, or instructions for setting an initialization seed for the encoding as a function of the beam index of the identified beam. In some examples of the method, apparatuses, and non-transitory computer-readable medium described herein, a quantity of the two or more sidelink synchronization signal blocks corresponds to a subcarrier spacing of the sidelink bandwidth part.

A method of wireless communication at a UE is described. The method may include identifying a sidelink synchronization signal block period with a sidelink synchronization signal block burst including two or more sidelink synchronization signal blocks each transmitted using a different beam and receiving the sidelink synchronization signal block burst including the two or more sidelink synchronization signal blocks in contiguous time resources.

An apparatus for wireless communication at a UE is described. The apparatus may include a processor, memory coupled with the processor, and instructions stored in the memory. The instructions may be executable by the processor to cause the apparatus to identify a sidelink synchronization signal block period with a sidelink synchronization signal block burst including two or more sidelink synchronization signal blocks each transmitted using a different beam and receive the sidelink synchronization signal block burst including the two or more sidelink synchronization signal blocks in contiguous time resources.

Another apparatus for wireless communication at a UE is described. The apparatus may include means for identifying a sidelink synchronization signal block period with a sidelink synchronization signal block burst including two or more sidelink synchronization signal blocks each transmitted using a different beam and receiving the sidelink synchronization signal block burst including the two or more sidelink synchronization signal blocks in contiguous time resources.

A non-transitory computer-readable medium storing code for wireless communication at a UE is described. The code may include instructions executable by a processor to identify a sidelink synchronization signal block period with a sidelink synchronization signal block burst including two or more sidelink synchronization signal blocks each transmitted using a different beam and receive the sidelink synchronization signal block burst including the two or more sidelink synchronization signal blocks in contiguous time resources.

Some examples of the method, apparatuses, and non-transitory computer-readable medium described herein may further include operations, features, means, or instructions for receiving a demodulation reference signal scrambling sequence with a sidelink synchronization signal block of the two or more sidelink synchronization signal blocks, and blind decoding at least a portion of the demodulation reference signal scrambling sequence to identify a beam index of a beam used to transmit the sidelink synchronization signal block.

A method of wireless communication at a UE is described. The method may include performing a listen-before-talk procedure to gain access to a sidelink bandwidth part in a shared spectrum for a sidelink synchronization signal block period, identifying a set of sidelink synchronization signal block bursts to transmit in the sidelink synchronization signal block period, each sidelink synchronization signal block burst including two or more sidelink synchronization signal blocks, and transmitting each of the two or more sidelink synchronization signal blocks in each sidelink synchronization signal block burst using a different beam in the sidelink synchronization signal block period.

An apparatus for wireless communication at a UE is described. The apparatus may include a processor, memory coupled with the processor, and instructions stored in the memory. The instructions may be executable by the processor to cause the apparatus to perform a listen-before-talk procedure to gain access to a sidelink bandwidth part in a shared spectrum for a sidelink synchronization signal block period, identify a set of sidelink synchronization signal block bursts to transmit in the sidelink synchronization signal block period, each sidelink synchronization signal block burst including two or more sidelink synchronization signal blocks, and transmit each of the two or more sidelink synchronization signal blocks in each sidelink synchronization signal block burst using a different beam in the sidelink synchronization signal block period.

Another apparatus for wireless communication at a UE is described. The apparatus may include means for performing a listen-before-talk procedure to gain access to a sidelink bandwidth part in a shared spectrum for a sidelink synchronization signal block period, identifying a set of sidelink synchronization signal block bursts to transmit in the sidelink synchronization signal block period, each sidelink synchronization signal block burst including two or more side-link synchronization signal blocks, and transmitting each of the two or more sidelink synchronization signal blocks in each sidelink synchronization signal block burst using a different beam in the sidelink synchronization signal block period.

A non-transitory computer-readable medium storing code for wireless communication at a UE is described. The code may include instructions executable by a processor to perform a listen-before-talk procedure to gain access to a sidelink bandwidth part in a shared spectrum for a sidelink synchronization signal block period, identify a set of sidelink synchronization signal block bursts to transmit in the sidelink synchronization signal block period, each sidelink synchronization signal block burst including two or more sidelink synchronization signal blocks, and transmit each of the two or more sidelink synchronization signal blocks in each sidelink synchronization signal block burst using a different beam in the sidelink synchronization signal block period.

Some examples of the method, apparatuses, and non-transitory computer-readable medium described herein may further include operations, features, means, or instructions for selecting a sidelink time interval for each of the set of sidelink synchronization signal block bursts such that the set of sidelink synchronization signal block bursts may be non-overlapping in the sidelink synchronization signal block period, where the sidelink time interval corresponds to a time interval between each of the two or more sidelink synchronization signal blocks in each sidelink synchronization signal block burst.

Some examples of the method, apparatuses, and non-transitory computer-readable medium described herein may further include operations, features, means, or instructions for identifying a beam for transmitting a sidelink synchronization signal block in a sidelink synchronization signal block burst of the set of sidelink synchronization signal block bursts, and encoding at least a portion of a demodulation reference signal scrambling sequence included with the sidelink synchronization signal block based on a beam index of the identified beam. In some examples of the method, apparatuses, and non-transitory computer-readable medium described herein, encoding the at least the portion of the demodulation reference signal may include operations, features, means, or instructions for setting an initialization seed for the encoding as a function of the beam index of the identified beam. In some examples of the method, apparatuses, and non-transitory computer-readable medium described herein, a quantity of the two or more sidelink synchronization signal blocks in each sidelink synchronization signal block burst corresponds to a subcarrier spacing of the sidelink bandwidth part.

A method of wireless communication at a UE is described. The method may include identifying a sidelink synchronization signal block period with a set of sidelink synchronization signal block bursts, each sidelink synchronization signal block burst including two or more sidelink synchronization signal blocks, and each of the two or more sidelink synchronization signal blocks transmitted using a different beam and receiving the set of sidelink synchronization signal block bursts in the sidelink synchronization signal block period.

An apparatus for wireless communication at a UE is described. The apparatus may include a processor, memory coupled with the processor, and instructions stored in the memory. The instructions may be executable by the processor to cause the apparatus to identify a sidelink synchronization signal block period with a set of sidelink synchronization signal block bursts, each sidelink synchronization signal block burst including two or more sidelink synchronization signal blocks, and each of the two or more sidelink synchronization signal blocks transmitted using a different beam and receive the set of sidelink synchronization signal block bursts in the sidelink synchronization signal block period.

Another apparatus for wireless communication at a UE is described. The apparatus may include means for identifying a sidelink synchronization signal block period with a set of sidelink synchronization signal block bursts, each sidelink synchronization signal block burst including two or more sidelink synchronization signal blocks, and each of the two or more sidelink synchronization signal blocks transmitted using a different beam and receiving the set of sidelink synchronization signal block bursts in the sidelink synchronization signal block period.

A non-transitory computer-readable medium storing code for wireless communication at a UE is described. The code may include instructions executable by a processor to identify a sidelink synchronization signal block period with a set of sidelink synchronization signal block bursts, each sidelink synchronization signal block burst including two or more sidelink synchronization signal blocks, and each of the two or more sidelink synchronization signal blocks transmitted using a different beam and receive the set of sidelink synchronization signal block bursts in the sidelink synchronization signal block period.

Some examples of the method, apparatuses, and non-transitory computer-readable medium described herein may further include operations, features, means, or instructions for receiving a demodulation reference signal scrambling sequence with a sidelink synchronization signal block in a sidelink synchronization signal block burst of the set of sidelink synchronization signal block bursts, and blind decoding at least a portion of the demodulation reference signal scrambling sequence to identify a beam index of a beam used to transmit the sidelink synchronization signal block.

A method of wireless communication at a UE is described. The method may include identifying a discovery reference signal (DRS) window in a shared spectrum including a set of starting positions for transmitting one or more sidelink synchronization signal blocks, performing a listen-before-talk procedure to gain access to the discovery reference signal window in the shared spectrum, and transmitting the one or more sidelink synchronization signal blocks at a first starting position of the set of starting positions after gaining access to the discovery reference signal window in the shared spectrum.

An apparatus for wireless communication at a UE is described. The apparatus may include a processor, memory coupled with the processor, and instructions stored in the memory. The instructions may be executable by the processor to cause the apparatus to identify a discovery reference signal (DRS) window in a shared spectrum including a set of starting positions for transmitting one or more sidelink synchronization signal blocks, perform a listen-before-talk procedure to gain access to the discovery reference signal window in the shared spectrum, and transmit the one or more sidelink synchronization signal blocks at a first starting position of the set of starting positions after gaining access to the discovery reference signal window in the shared spectrum.

Another apparatus for wireless communication at a UE is described. The apparatus may include means for identifying a discovery reference signal (DRS) window in a shared spectrum including a set of starting positions for transmitting one or more sidelink synchronization signal blocks, performing a listen-before-talk procedure to gain access to the discovery reference signal window in the shared spectrum, and transmitting the one or more sidelink synchronization signal blocks at a first starting position of the set of starting positions after gaining access to the discovery reference signal window in the shared spectrum.

A non-transitory computer-readable medium storing code for wireless communication at a UE is described. The code may include instructions executable by a processor to identify a discovery reference signal (DRS) window in a shared spectrum including a set of starting positions for transmitting one or more sidelink synchronization signal blocks, perform a listen-before-talk procedure to gain access to the discovery reference signal window in the shared spectrum, and transmit the one or more sidelink synchronization signal blocks at a first starting position of the set of starting positions after gaining access to the discovery reference signal window in the shared spectrum.

In some examples of the method, apparatuses, and non-transitory computer-readable medium described herein, transmitting the one or more sidelink synchronization signal blocks may include operations, features, means, or instructions for transmitting a sidelink synchronization signal block of the one or more sidelink synchronization signal blocks in a physical sidelink broadcast channel with an indication of a slot that includes the synchronization signal block. In some examples of the method, apparatuses, and non-transitory computer-readable medium described herein, transmitting the one or more sidelink synchronization signal blocks may include operations, features, means, or instructions for transmitting a sidelink synchronization signal block of the one or more sidelink synchronization signal blocks in a physical sidelink broadcast channel with a demodulation reference signal scrambling sequence indicating a beam index of a beam used to transmit the synchronization signal block.

A method of wireless communication at a UE is described. The method may include identifying a discovery reference signal (DRS) window in a shared spectrum in which to receive one or more sidelink synchronization signal blocks, determining that the discovery reference signal window includes a set of starting positions for receiving the one or more sidelink synchronization signal blocks, and monitoring the set of starting positions for the one or more sidelink synchronization signal blocks in the discovery reference signal window.

An apparatus for wireless communication at a UE is described. The apparatus may include a processor, memory coupled with the processor, and instructions stored in the memory. The instructions may be executable by the processor to cause the apparatus to identify a discovery reference signal (DRS) window in a shared spectrum in which to receive one or more sidelink synchronization signal blocks, determine that the discovery reference signal window includes a set of starting positions for receiving the one or more sidelink synchronization signal blocks, and monitor the set of starting positions for the one or more sidelink synchronization signal blocks in the discovery reference signal window.

Another apparatus for wireless communication at a UE is described. The apparatus may include means for identifying a discovery reference signal (DRS) window in a shared spectrum in which to receive one or more sidelink synchronization signal blocks, determining that the discovery reference signal window includes a set of starting positions for receiving the one or more sidelink synchronization signal blocks, and monitoring the set of starting positions for the one or more sidelink synchronization signal blocks in the discovery reference signal window.

A non-transitory computer-readable medium storing code for wireless communication at a UE is described. The code may include instructions executable by a processor to identify a discovery reference signal (DRS) window in a shared spectrum in which to receive one or more sidelink synchronization signal blocks, determine that the discovery reference signal window includes a set of starting positions for receiving the one or more sidelink synchronization signal blocks, and monitor the set of starting positions for the one or more sidelink synchronization signal blocks in the discovery reference signal window.

Some examples of the method, apparatuses, and non-transitory computer-readable medium described herein may further include operations, features, means, or instructions for receiving a sidelink synchronization signal block of the one or more sidelink synchronization signal blocks in a physical sidelink broadcast channel with an indication of a slot that includes the synchronization signal block. Some examples of the method, apparatuses, and non-transitory computer-readable medium described herein may further include operations, features, means, or instructions for receiving a sidelink synchronization signal block of the one or more sidelink synchronization signal blocks in a physical sidelink broadcast channel with a demodulation reference signal scrambling sequence indicating a beam index of a beam used to transmit the synchronization signal block.

A method of wireless communication at a UE is described. The method may include identifying a first sidelink synchronization signal block to transmit in a first slot and a second sidelink synchronization signal block to transmit in a second slot in a sidelink bandwidth part of a shared spectrum, generating a physical broadcast channel (PBCH) repetition or cyclic prefix extension to fill a gap between the first sidelink synchronization signal block and the second sidelink synchronization signal block, and transmitting the first sidelink synchronization signal block in the first slot and the second sidelink synchronization signal block in the second slot with the physical broadcast channel repetition or the cyclic prefix extension between the first and second sidelink synchronization signal blocks.

An apparatus for wireless communication at a UE is described. The apparatus may include a processor, memory coupled with the processor, and instructions stored in the memory. The instructions may be executable by the processor to cause the apparatus to identify a first sidelink synchronization signal block to transmit in a first slot and a second sidelink synchronization signal block to transmit in a second slot in a sidelink bandwidth part of a shared spectrum, generate a physical broadcast channel (PBCH) repetition or cyclic prefix extension to fill a gap between the first sidelink synchronization signal block and the second sidelink synchronization signal block, and transmit the first sidelink synchronization signal block in the first slot and the second sidelink synchronization signal block in the second slot with the physical broadcast channel repetition or the cyclic prefix extension between the first and second sidelink synchronization signal blocks.

Another apparatus for wireless communication at a UE is described. The apparatus may include means for identifying a first sidelink synchronization signal block to transmit in a first slot and a second sidelink synchronization signal block to transmit in a second slot in a sidelink bandwidth part of a shared spectrum, generating a physical broadcast channel (PBCH) repetition or cyclic prefix extension to fill a gap between the first sidelink synchronization signal block and the second sidelink synchronization signal block, and transmitting the first sidelink synchronization signal block in the first slot and the second sidelink synchronization signal block in the second slot with the physical broadcast channel repetition or the cyclic prefix extension between the first and second sidelink synchronization signal blocks.

A non-transitory computer-readable medium storing code for wireless communication at a UE is described. The code may include instructions executable by a processor to identify a first sidelink synchronization signal block to transmit in a first slot and a second sidelink synchronization signal block to transmit in a second slot in a sidelink bandwidth part of a shared spectrum, generate a physical broadcast channel (PBCH) repetition or cyclic prefix extension to fill a gap between the first sidelink synchronization signal block and the second sidelink synchronization signal block, and transmit the first sidelink synchronization signal block in the first slot and the second sidelink synchronization signal block in the second slot with the physical broadcast channel repetition or the cyclic prefix extension between the first and second sidelink synchronization signal blocks.

In some examples of the method, apparatuses, and non-transitory computer-readable medium described herein, generating the physical broadcast channel repetition to fill the gap may include operations, features, means, or instructions for generating the physical broadcast channel repetition by repeating a physical broadcast channel in a last symbol of the first sidelink synchronization signal block. In some examples of the method, apparatuses, and non-transitory computer-readable medium described herein, generating the cyclic prefix extension to fill the gap may include operations, features, means, or instructions for generating the cyclic prefix extension based on a physical broadcast channel in a first symbol of the second sidelink synchronization signal block.

A method of wireless communication at a first UE is described. The method may include performing a listen-before-talk procedure to gain access to a sidelink bandwidth part in a shared spectrum for a sidelink synchronization signal block period, transmitting one or more sidelink synchronization signal blocks using one or more beams in the sidelink synchronization signal block period, each of the one or more sidelink synchronization signal blocks transmitted using a different beam, and receiving, from a second UE, an indication of a preferred beam of the one or more beams for transmitting sidelink data to the second UE based on transmitting the one or more sidelink synchronization signal blocks.

An apparatus for wireless communication at a first UE is described. The apparatus may include a processor, memory coupled with the processor, and instructions stored in the memory. The instructions may be executable by the processor to cause the apparatus to perform a listen-before-talk procedure to gain access to a sidelink bandwidth part in a shared spectrum for a sidelink synchronization signal block period, transmit one or more sidelink synchronization signal blocks using one or more beams in the sidelink synchronization signal block period, each of the one or more sidelink synchronization signal blocks transmitted using a different beam, and receive, from a second UE, an indication of a preferred beam of the one or more beams for transmitting sidelink data to the second UE based on transmitting the one or more sidelink synchronization signal blocks.

Another apparatus for wireless communication at a first UE is described. The apparatus may include means for performing a listen-before-talk procedure to gain access to a sidelink bandwidth part in a shared spectrum for a sidelink synchronization signal block period, transmitting one or more sidelink synchronization signal blocks using one or more beams in the sidelink synchronization signal block period, each of the one or more sidelink synchronization signal blocks transmitted using a different beam, and receiving, from a second UE, an indication of a preferred beam of the one or more beams for transmitting sidelink data to the second UE based on transmitting the one or more sidelink synchronization signal blocks.

A non-transitory computer-readable medium storing code for wireless communication at a first UE is described. The code may include instructions executable by a processor to perform a listen-before-talk procedure to gain access to a sidelink bandwidth part in a shared spectrum for a sidelink synchronization signal block period, transmit one or more sidelink synchronization signal blocks using one or more beams in the sidelink synchronization signal block period, each of the one or more sidelink synchronization signal blocks transmitted using a different beam, and receive, from a second UE, an indication of a preferred beam of the one or more beams for transmitting sidelink data to the second UE based on transmitting the one or more sidelink synchronization signal blocks.

Some examples of the method, apparatuses, and non-transitory computer-readable medium described herein may further include operations, features, means, or instructions for transmitting sidelink data to the second UE using the preferred beam. In some examples of the method, apparatuses, and non-transitory computer-readable medium described herein, receiving the indication of the preferred beam may include operations, features, means, or instructions for receiving signaling on a physical sidelink feedback channel (PFSCH) resource or a physical random-access channel (PRACH) resource corresponding to a sidelink synchronization signal block transmitted using the preferred beam. In some examples of the method, apparatuses, and non-transitory computer-readable medium described herein, the indication of the preferred beam may be received in a physical sidelink shared channel (PSSCH).

A method of wireless communication at a first UE is described. The method may include receiving, from a second UE in a sidelink synchronization signal block period, one or more sidelink synchronization signal blocks transmitted using one or more beams, each of the one or more sidelink synchronization signal blocks transmitted using a different beam, selecting a preferred beam of the one or more beams for the second UE to use to transmit sidelink data to the first UE, and transmitting, to the second UE, an indication of the preferred beam based on the selecting.

An apparatus for wireless communication at a first UE is described. The apparatus may include a processor, memory coupled with the processor, and instructions stored in the memory. The instructions may be executable by the processor to cause the apparatus to receive, from a second UE in a sidelink synchronization signal block period, one or more sidelink synchronization signal blocks transmitted using one or more beams, each of the one or more sidelink synchronization signal blocks transmitted using a different beam, select a preferred beam of the one or more beams for the second UE to use to transmit sidelink data to the first UE, and transmit, to the second UE, an indication of the preferred beam based on the selecting.

Another apparatus for wireless communication at a first UE is described. The apparatus may include means for receiving, from a second UE in a sidelink synchronization signal block period, one or more sidelink synchronization signal blocks transmitted using one or more beams, each of the one or more sidelink synchronization signal blocks transmitted using a different beam, selecting a preferred beam of the one or more beams for the second UE to use to transmit sidelink data to the first UE, and transmitting, to the second UE, an indication of the preferred beam based on the selecting.

A non-transitory computer-readable medium storing code for wireless communication at a first UE is described. The code may include instructions executable by a processor to receive, from a second UE in a sidelink synchronization signal block period, one or more sidelink synchronization signal blocks transmitted using one or more beams, each of the one or more sidelink synchronization signal blocks transmitted using a different beam, select a preferred beam of the one or more beams for the second UE to use to transmit sidelink data to the first UE, and transmit, to the second UE, an indication of the preferred beam based on the selecting.

Some examples of the method, apparatuses, and non-transitory computer-readable medium described herein may further include operations, features, means, or instructions for receiving sidelink data from the second UE using the preferred beam. In some examples of the method, apparatuses, and non-transitory computer-readable medium described herein, transmitting the indication of the preferred beam may include operations, features, means, or instructions for transmitting signaling on a physical sidelink feedback channel (PFSCH) resource or a physical random-access channel (PRACH) resource corresponding to a sidelink synchronization signal block transmitted by the second UE using the preferred beam. In some examples of the method, apparatuses, and non-transitory computer-readable medium described herein, the indication of the preferred beam may be received in a physical sidelink shared channel (PSSCH).

A method of wireless communication at a first UE is described. The method may include performing a listen-before-talk procedure to gain access to a sidelink bandwidth part in a shared spectrum for a sidelink synchronization signal block period, determining whether to transmit a first quantity or a second quantity of sidelink synchronization signal blocks in the sidelink synchronization signal block period, the first quantity being greater than the second quantity, and transmitting the first quantity or the second quantity of sidelink synchronization signal blocks in the sidelink synchronization signal block period based on the determining.

An apparatus for wireless communication at a first UE is described. The apparatus may include a processor, memory coupled with the processor, and instructions stored in the memory. The instructions may be executable by the processor to cause the apparatus to perform a listen-before-talk procedure to gain access to a sidelink bandwidth part in a shared spectrum for a sidelink synchronization signal block period, determine whether to transmit a first quantity or a second quantity of sidelink synchronization signal blocks in the sidelink synchronization signal block period, the first quantity being greater than the second quantity, and transmit the first quantity or the second quantity of sidelink synchronization signal blocks in the sidelink synchronization signal block period based on the determining.

Another apparatus for wireless communication at a first UE is described. The apparatus may include means for performing a listen-before-talk procedure to gain access to a sidelink bandwidth part in a shared spectrum for a sidelink synchronization signal block period, determining whether to transmit a first quantity or a second quantity of sidelink synchronization signal blocks in the sidelink synchronization signal block period, the first quantity being greater than the second quantity, and transmitting the first quantity or the second quantity of sidelink synchronization signal blocks in the sidelink synchronization signal block period based on the determining.

A non-transitory computer-readable medium storing code for wireless communication at a first UE is described. The code may include instructions executable by a processor to perform a listen-before-talk procedure to gain access to a sidelink bandwidth part in a shared spectrum for a sidelink synchronization signal block period, determine whether to transmit a first quantity or a second quantity of sidelink synchronization signal blocks in the sidelink synchronization signal block period, the first quantity being greater than the second quantity, and transmit the first quantity or the second quantity of sidelink synchronization signal blocks in the sidelink synchronization signal block period based on the determining.

Some examples of the method, apparatuses, and non-transitory computer-readable medium described herein may further include operations, features, means, or instructions for receiving, from a second UE, an indication to transmit the first quantity of sidelink synchronization signal blocks in the sidelink synchronization signal block period. In some examples of the method, apparatuses, and non-transitory computer-readable medium described herein, transmitting the first quantity or the second quantity of sidelink synchronization signal blocks may include operations, features, means, or instructions for transmitting the first quantity of sidelink synchronization signal blocks using one or more beams as part of a beam refinement procedure based on receiving the indication, each of the first quantity of sidelink synchronization signal blocks transmitted using a different beam.

In some examples of the method, apparatuses, and non-transitory computer-readable medium described herein, transmitting the first quantity or the second quantity of sidelink synchronization signal blocks may include operations, features, means, or instructions for transmitting the first quantity of sidelink synchronization signal blocks after a preconfigured time period after receiving the indication to transmit the first quantity of sidelink synchronization signal blocks. In some examples of the method, apparatuses, and non-transitory computer-readable medium described herein, the indication to transmit the first quantity of sidelink synchronization signal blocks may be received in a physical random-access channel (PRACH), sidelink control information, or a medium access control (MAC) control element (MAC-CE).

In some examples of the method, apparatuses, and non-transitory computer-readable medium described herein, determining to transmit the first quantity or the second quantity of sidelink synchronization signal blocks may include operations, features, means, or instructions for determining to transmit the second quantity of sidelink synchronization signal blocks based on failing to receive an indication to transmit the first quantity of sidelink synchronization signal blocks in the sidelink synchronization signal block period. In some examples of the method, apparatuses, and non-transitory computer-readable medium described herein, transmitting the first quantity or the second quantity of sidelink synchronization signal blocks may include operations, features, means, or instructions for transmitting the second quantity of sidelink synchronization signal blocks using a first set of beams, and transmitting the first quantity of sidelink synchronization signal blocks using a second set of beams associated with a beam refinement procedure for one or more of the first set of beams.

A method of wireless communication at a first UE is described. The method may include determining whether to receive a first quantity or a second quantity of sidelink synchronization signal blocks from a second UE in a sidelink synchronization signal block period, the first quantity being greater than the second quantity, identifying the sidelink synchronization signal block period with the first quantity or the second quantity of sidelink synchronization signal blocks, and receiving the first quantity or the second quantity of sidelink synchronization signal blocks in the sidelink synchronization signal block period based on the determining.

An apparatus for wireless communication at a first UE is described. The apparatus may include a processor, memory coupled with the processor, and instructions stored in the memory. The instructions may be executable by the processor to cause the apparatus to determine whether to receive a first quantity or a second quantity of sidelink synchronization signal blocks from a second UE in a sidelink synchronization signal block period, the first quantity being greater than the second quantity, identify the sidelink synchronization signal block period with the first quantity or the second quantity of sidelink synchronization signal blocks, and receive the first quantity or the second quantity of sidelink synchronization signal blocks in the sidelink synchronization signal block period based on the determining.

Another apparatus for wireless communication at a first UE is described. The apparatus may include means for determining whether to receive a first quantity or a second quantity of sidelink synchronization signal blocks from a second UE in a sidelink synchronization signal block period, the first quantity being greater than the second quantity, identifying the sidelink synchronization signal block period with the first quantity or the second quantity of sidelink synchronization signal blocks, and receiving the first quantity or the second quantity of sidelink synchronization signal blocks in the sidelink synchronization signal block period based on the determining.

A non-transitory computer-readable medium storing code for wireless communication at a first UE is described. The code may include instructions executable by a processor to determine whether to receive a first quantity or a second quantity of sidelink synchronization signal blocks from a second UE in a sidelink synchronization signal block period, the first quantity being greater than the second quantity, identify the sidelink synchronization signal block period with the first quantity or the second quantity of sidelink synchronization signal blocks, and receive the first quantity or the second quantity of sidelink synchronization signal blocks in the sidelink synchronization signal block period based on the determining.

Some examples of the method, apparatuses, and non-transitory computer-readable medium described herein may further include operations, features, means, or instructions for transmitting, to the second UE, an indication for the second UE to transmit the first quantity of sidelink synchronization signal blocks in the sidelink synchronization signal block period. In some examples of the method, apparatuses, and non-transitory computer-readable medium described herein, receiving the first quantity or the second quantity of sidelink synchronization signal blocks may include operations, features, means, or instructions for receiving the first quantity of sidelink synchronization signal blocks transmitted using one or more beams as part of a beam refinement procedure based on transmitting the indication, each of the first quantity of sidelink synchronization signal blocks transmitted using a different beam.

In some examples of the method, apparatuses, and non-transitory computer-readable medium described herein, receiving the first quantity or the second quantity of sidelink synchronization signal blocks may include operations, features, means, or instructions for receiving the first quantity of sidelink synchronization signal blocks after a preconfigured time period after transmitting the indication for the second UE to transmit the first quantity of sidelink synchronization signal blocks. In some examples of the method, apparatuses, and non-transitory computer-readable medium described herein, the indication to transmit the first quantity of sidelink synchronization signal blocks may be transmitted in a physical random-access channel (PRACH), sidelink control information, or a medium access control (MAC) control element (MAC-CE).

In some examples of the method, apparatuses, and non-transitory computer-readable medium described herein, receiving the first quantity or the second quantity of sidelink synchronization signal blocks may include operations, features, means, or instructions for receiving the second quantity of sidelink synchronization signal blocks based on failing to transmit an indication for the second UE to transmit the first quantity of sidelink synchronization signal blocks in the sidelink synchronization signal block period. In some examples of the method, apparatuses, and non-transitory computer-readable medium described herein, receiving the first quantity or the second quantity of sidelink synchronization signal blocks may include operations, features, means, or instructions for receiving the second quantity of sidelink synchronization signal blocks transmitted using a first set of beams, and receiving the first quantity of sidelink synchronization signal blocks transmitted using a second set of beams associated with a beam refinement procedure for one or more of the first set of beams.

BRIEF DESCRIPTION OF THE DRAWINGS

FIG. 5 illustrates aspects of S-SSB transmissions in a beam sweep in accordance with aspects of the present disclosure.

FIG. 9 illustrates aspects of on-demand S-SSB sweeping in accordance with aspects of the present disclosure.

FIGS. 15 through 28 show flowcharts illustrating methods that support S-SSB transmissions in a shared spectrum in accordance with aspects of the present disclosure.

DETAILED DESCRIPTION

Some wireless communications systems may support sidelink communications between user equipment (UEs) in a shared spectrum. In such systems, a UE may perform a listen-before-talk (LBT) procedure to gain access to a sidelink bandwidth part (BWP) for a sidelink transmission. For instance, the UE may gain access to the sidelink BWP to transmit sidelink synchronization signal blocks (S-SSBs). The S-SSBs may allow other UEs to discover the UE and establish a sidelink connection with the UE for subsequent sidelink communications. In some cases, however, because the UE may contend for access to resources in the shared spectrum to transmit the S-SSBs, it may be challenging for other UEs to identify the resources on which the S-SSBs are transmitted. Further, because the sidelink resources in the shared spectrum may be limited, and many UEs may be contending for access to the limited sidelink resources, unnecessary overhead and other inefficiencies may be detrimental to sidelink communications in a shared spectrum.

As described herein, a UE may support efficient techniques for facilitating S-SSB transmissions in a shared spectrum. In particular, a UE may efficiently identify resources for transmitting one or more S-SSBs in a shared spectrum or efficiently beam sweep multiple S-SSBs in the shared spectrum. In one aspect, the UE may transmit an S-SSB in a sidelink BWP in the shared spectrum such that a lower edge of the S-SSB is aligned with or offset from a lower edge of the sidelink BWP. In another aspect, a UE may beam sweep S-SSBs in one or more S-SSB bursts in an S-SSB period to improve the chances that another UE may receive the S-SSBs. In yet another aspect, resources allocated for S-SSB transmissions may facilitate flexible S-SSB transmissions while minimizing gaps to prevent other UEs from incorrectly determining that a sidelink BWP in a shared spectrum is clear for transmission. Using these techniques, a UE may avoid unnecessary overhead when transmitting S-SSBs while allowing receiving UEs to identify the S-SSBs transmitted by the UE.

Aspects of the disclosure introduced above are described below in the context of a wireless communications system. Examples of processes and signaling exchanges that support S-SSB transmission in a shared spectrum are then described. Aspects of the disclosure are further illustrated by and described with reference to apparatus diagrams, system diagrams, and flowcharts that relate to S-SSB transmission in a shared spectrum.

Figure 1:
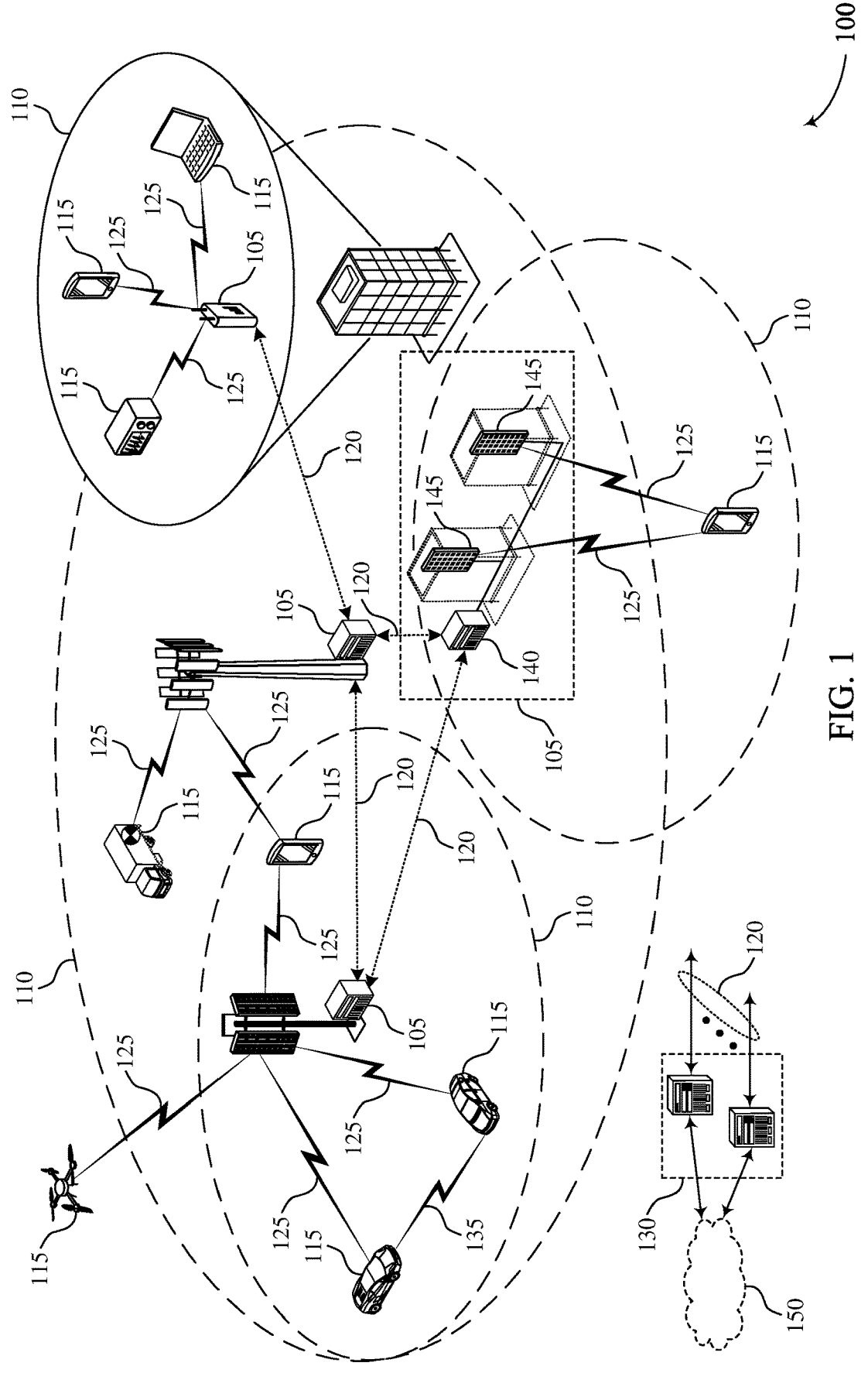
FIG. 1 illustrates aspects of a wireless communications system that supports sidelink synchronization signal block (S-SSB) transmissions in a shared spectrum in accordance with aspects of the present disclosure.

FIG. 1 illustrates an example of a wireless communications system 100 that supports S-SSB transmissions in a shared spectrum in accordance with aspects of the present disclosure. The wireless communications system 100 may include one or more base stations 105, one or more UEs 115, and a core network 130. In some examples, the wireless communications system 100 may be a Long-Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For instance, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some aspects, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some aspects, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For instance, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some aspects (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105 (e.g., in a physical uplink shared channel (PUSCH) or a physical uplink control channel (PUCCH)), or downlink transmissions from a base station 105 to a UE 115 (e.g., in a physical downlink shared channel (PDSCH) or a physical downlink control channel (PDCCH)). Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some aspects the carrier bandwidth may be referred to as a "system bandwidth" of the carrier or the wireless communications system 100. For instance, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some aspects, the wireless communications system 100 may include base stations 105 or UEs

115 that support simultaneous communications via carriers associated with multiple carrier bandwidths. In some aspects, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some aspects, a UE 115 may be configured with multiple BWPs. In some aspects, a single BWP for a carrier may be active at a given time and communications for the UE 115 may be restricted to one or more active BWPs.

The time intervals for the base stations 105 or the UEs 115 may be expressed in multiples of a basic time unit which may, for instance, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some aspects, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some aspects, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for instance, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For instance, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some aspects, a base station 105 may be movable and therefore provide communication coverage for a moving geographic coverage area 110. In some aspects, different geographic coverage areas 110 associated with different technologies may overlap, but the different geographic coverage areas 110 may be supported by the same base station 105. In other aspects, the overlapping geographic coverage areas 110 associated with different technologies may be supported by different base stations 105. The wireless communications system 100 may include, for instance, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For instance, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some aspects, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some aspects, groups of the UEs 115 communicating via D2D communications may utilize a one-to-many (1:M) system in which each UE 115 transmits to every other UE 115 in the group. In some aspects, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some aspects, the wireless communications system 100 may support millimeter wave (mmW) communications between the UEs 115 and the base stations 105, and EHF antennas of the respective devices may be smaller and more closely spaced than UHF antennas. In some aspects, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

In some cases, wireless communications system 100 may utilize both unshared (e.g., licensed) and shared (e.g., unlicensed) radio frequency spectrum bands. According to some aspects, wireless communications system 100 may employ License Assisted Access (LAA), LTE-Unlicensed (LTE-U) radio access technology, or NR technology in an unlicensed band (NR-U) such as the 5 GHz ISM band. When operating in unlicensed radio frequency spectrum bands, wireless devices such as base stations 105 and UEs 115 may employ LBT procedures to ensure a frequency channel (e.g., an LBT subchannel or a frequency band that is accessible via an LBT procedure) is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, sidelink transmissions, peer-to-peer transmissions, or a combination of these. Duplexing in unlicensed spectrum may be based on frequency division duplexing (FDD), time division duplexing (TDD), or a combination of both.

In some implementations, there may be different categories of LBT procedures, including category 1 LBT (i.e., no LBT), category 2 LBT (i.e., LBT including one-time channel sensing for a fixed period without a back-off period), category 3 LBT (i.e., LBT with a random (or other) back-off period and a fixed sized contention window), and category 4 LBT (i.e., LBT with a random (or other) back-off period and a variable sized contention window). In some cases, a category 2 LBT procedure may be referred to as a one-time LBT procedure where a UE 115 may perform channel sensing for a defined duration (e.g., 25 μs). Further, a category 4 LBT procedure may be referred to as a fairness-based LBT procedure for performing channel sensing with a backoff, where the backoff may be used to prevent a UE 115 from accessing a channel immediately after detecting that the channel is clear.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For instance, one or more base station antennas or antenna arrays may be co-located at an antenna assembly, such as an antenna tower. In some aspects, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for instance, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For instance, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For instance, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some aspects, the beam direction associated with transmissions along a single beam direction may be determined based on a signal that was transmitted in one or more beam directions. For instance, a UE 115 may receive one or more of the signals transmitted by the base station 105 in different directions and may report to the base station 105 an indication of the signal that the UE 115 received with a highest signal quality or an otherwise acceptable signal quality.

In some aspects, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For instance, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some aspects, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

A UE 115 in wireless communications system 100 may be able to communicate directly with other UEs 115 over a sidelink connection (e.g., using a peer-to-peer (P2P) or device-to-device (D2D) protocol). Such communications may be referred to as D2D or sidelink communications. One or more of a group of UEs 115 utilizing sidelink communications may be within the geographic coverage area 110 of a base station 105. In some cases, other UEs 115 in such a group may be outside the geographic coverage area 110 of the base station 105 or may be otherwise unable to receive transmissions from the base station 105. In such cases, the UEs 115 within the geographic coverage 110 of the base station 105 may relay communications between the base station 105 and the UEs 115 outside the geographic area 110 of the base station 105. UEs 115 communicating via sidelink communications may utilize a one-to-many (1:M) system in which each UE 115 transmits to every other UE 115 in the group.

In some cases, UEs 115 in wireless communications system 100 may support sidelink communications in a shared spectrum. In such systems, a UE 115 may perform an LBT procedure to gain access to a sidelink BWP for a sidelink transmission. For instance, the UE 115 may gain access to the sidelink BWP to transmit S-SSBs in a physical sidelink broadcast channel (PSBCH). The S-SSBs may allow other UEs 115 to discover the UE 115 and establish sidelink connections with the UE 115 for subsequent sidelink communications. An S-SSB may be 11 resource blocks wide and the UE 115 may transmit the S-SSB with a same numerology as a sidelink BWP in which the S-SSB is transmitted. In some cases, the S-SSB may not satisfy an occupied channel bandwidth (OCB) requirement of a channel (e.g., at 5 GHz). In such cases, the UE 115 may transmit the S-SSB in a discovery reference signal (DRS) window (e.g., NR-U DRS window) with remaining minimum system information (RMSI) in a PDSCH, channel state information reference signals (CSI-RSs), etc. That is, the RMSI, CSI-RSs, etc. may be frequency division multiplexed with the S-SSB to satisfy the OCB requirement of a channel. Additionally, or alternatively, the S-SSB may be repeated in the frequency domain (e.g., to satisfy the OCB requirement). Table 1 below shows the contents of a PBSCH.

TABLE 1

| PBSCH contents and the associated number of bits | |
|---|---|
| PBSCH Contents | Number of bits |
| Direct Frame Number (DFN) | 10 |
| Indication of TDD configuration | [12] |
| Slot index | 7 |
| In-coverage indicator | 1 |
| Reserved bits | 2 |
| Cyclic redundancy check (CRC) | 24 |
| Total Bits | 56 |

As described above, a UE 115 in wireless communications system 100 may transmit an S-SSB in a shared spectrum. In some cases, however, because the UE 115 may contend for access to resources in the shared spectrum to transmit the S-SSB, it may be challenging for other UEs 115 to identify the resources on which the S-SSB is transmitted. In addition, because the sidelink resources in the shared spectrum may be limited, and many UEs 115 may be contending for access to the limited sidelink resources, unnecessary overhead and other inefficiencies may be detrimental to sidelink communications in a shared spectrum. In such cases, selection of location for the S-SSB in a sidelink BWP in the shared spectrum may facilitate other UEs 115 in receiving the S-SSB. That is, it may be beneficial to define locations of S-SSBs in sidelink BWPs in NR-U channels according to described characteristics. Further, it may be beneficial to efficiently configure DRS windows for S-SSB transmissions in a shared spectrum (e.g., since, in NR-U, a UE 115 may perform channel access before an S-SSB transmission). Wireless communications system 100 may support efficient techniques for facilitating S-SSB transmissions in a shared spectrum.

Figure 2:
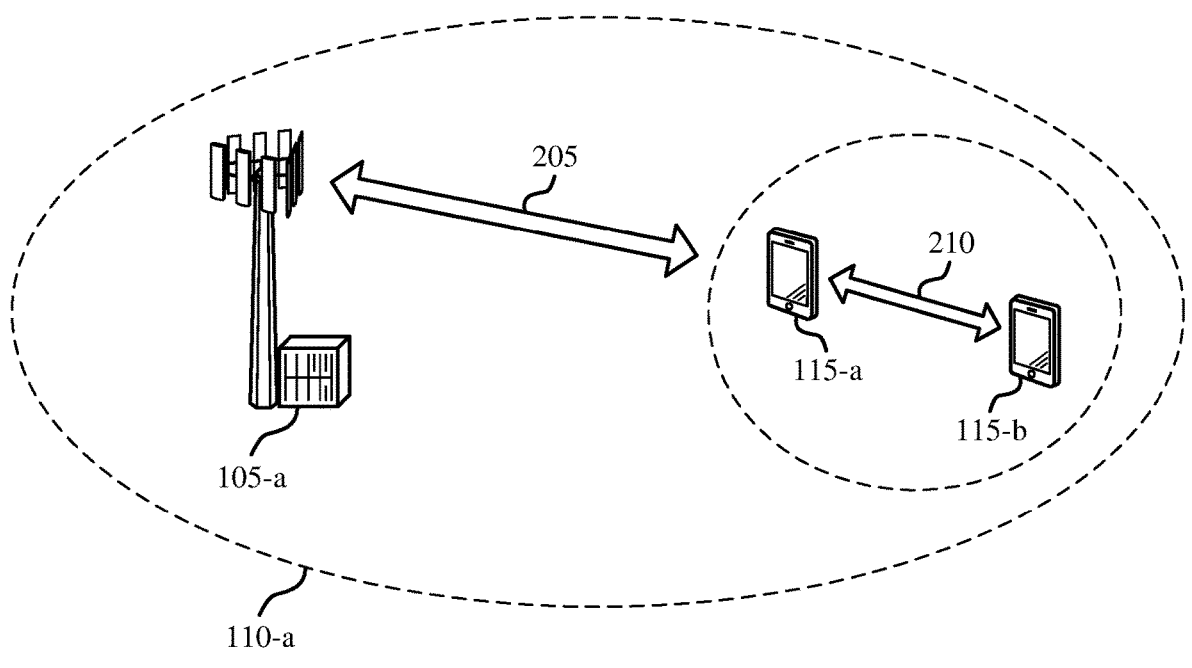
FIG. 2 illustrates aspects of a wireless communications system that supports S-SSB transmissions in a shared spectrum in accordance with aspects of the present disclosure.

FIG. 2 illustrates aspects of a wireless communications system 200 that supports S-SSB transmissions in a shared spectrum in accordance with aspects of the present disclosure. The wireless communications system 200 includes a base station 105-*a*, which may be an example of a base station 105 described with reference to FIG. 1. The wireless communications system 200 also includes a UE 115-*a* and a UE 115-*b*, which may be examples of UEs 115 described with reference to FIG. 1. Base station 105-*a* may provide communications coverage for geographic coverage area 110-*a*, which may be an example of a geographic area 110 described with reference to FIG. 1. The base station 105-*a* may communicate with the UE 115-*a* and the UE 115-*b* on resources of a carrier 205, and the UE 115-*a* may communicate with the UE 115-*b* on resources of a carrier 210. Communications between the UE 115-*a* and the UE 115-*b* may be referred to as sidelink communications. In some cases, the base station 105-*a* may schedule resources for communications between the UE 115-*a* and the UE 115-*b* (e.g., in a resource allocation mode 1). In other cases, the UE 115-*a* or the UE 115-*b* may identify resources for communications with each other without the involvement of the base station 105-*a* (e.g., in a resource allocation mode 2).

The wireless communications system 200 may implement aspects of the wireless communications system 100. For instance, wireless communications system 200 may support efficient techniques for facilitating S-SSB transmissions in a shared spectrum. Using the techniques described herein, the UE 115-*a* may efficiently identify resources for transmitting one or more S-SSBs in a shared spectrum or efficiently beam sweep multiple S-SSBs in the shared spectrum. The UE 115-*b* may then receive the one or more S-SSBs. In one aspect, the UE 115-*a* may transmit an S-SSB in a sidelink BWP in the shared spectrum such that a lower edge of the S-SSB is aligned with or offset from a lower edge of the sidelink BWP. In another aspect, the UE 115-*a* may beam sweep S-SSBs in one or more S-SSB bursts in an S-SSB period to improve the chances that the UE 115-*b* may receive the S-SSBs. In yet another aspect, resources allocated for S-SSB transmissions may facilitate flexible S-SSB transmissions while minimizing gaps to prevent other UEs 115 from incorrectly determining that a sidelink BWP in a shared spectrum is clear for transmission.

Figure 3:
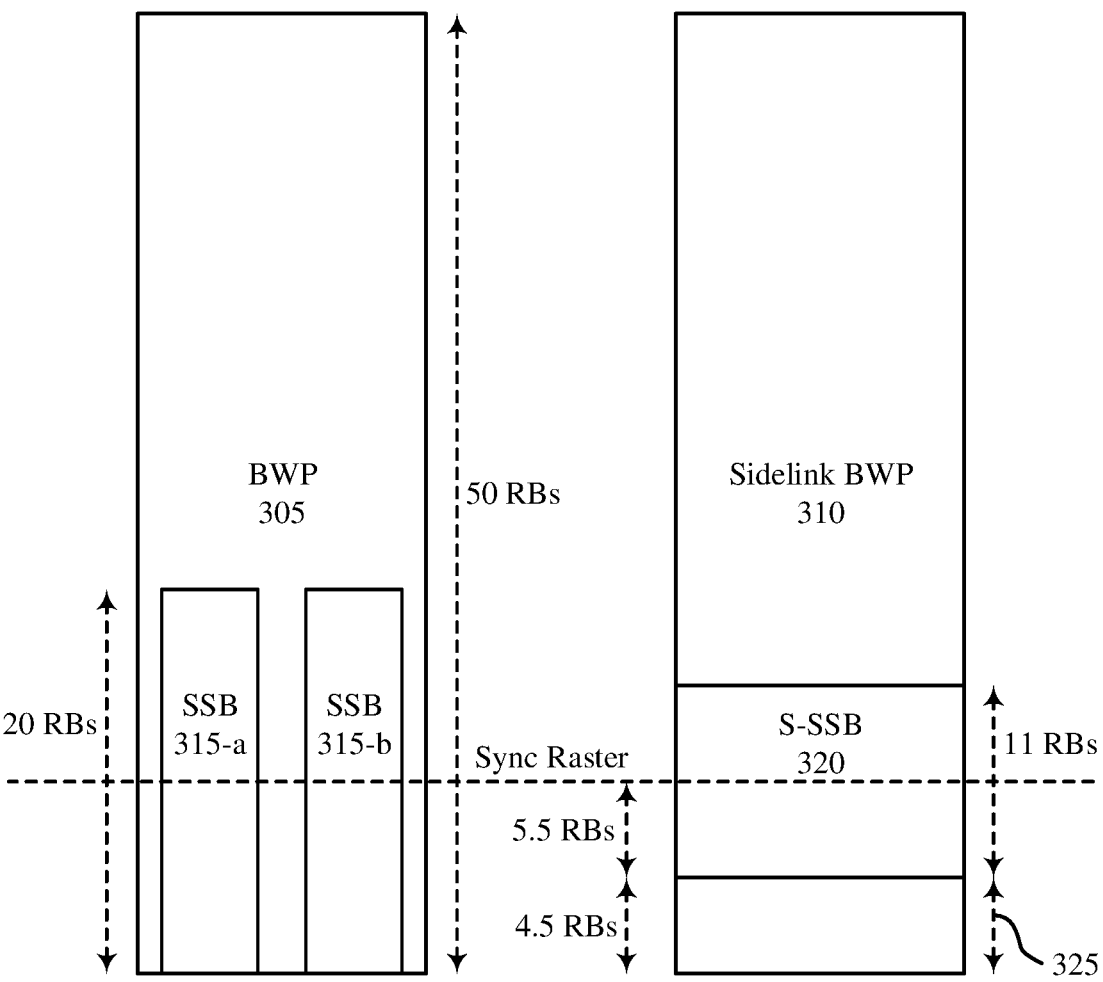
FIG. 3 illustrates aspects of the locations of synchronization signal block (SSB) transmissions in accordance with aspects of the present disclosure.

FIG. 3 illustrates aspects of the locations 300 of SSB transmissions in accordance with aspects of the present disclosure. A base station 105 may identify a BWP 305 in a shared spectrum and may transmit an SSB 315-*a* and an SSB 315-*b* in the BWP 305. A UE 115 may identify a sidelink BWP 310 in a shared spectrum, and the UE 115 may transmit an S-SSB 320 in the sidelink BWP 310. The BWP 305 and the sidelink BWP 310 may span a same set of frequency resources. The SSB 315-*a* and the SSB 315-*b* may span 20 resource blocks and may be aligned with the lower edge of the BWP 305 (i.e., in NR-U, a 20 RB SSB may be at the lower edge of a 20 MHz channel). The center frequency for NR SSB reception may be at the 0th subcarrier in the 10th resource block. In FIG. 3, the S-SSB 320 may span 11 resource blocks and may be offset from the lower edge of the BWP 305. That is, a UE 115 may transmit the S-SSB 320 in the sidelink BWP 310 such that a first starting resource block of the S-SSB 320 is offset from a second starting resource block of the sidelink BWP 310. The first starting resource block of the S-SSB 320 may refer to the resource block with the lowest index used to transmit the S-SSB 320 (e.g., the 0th resource block of the S-SSB 320), and the second starting resource block of the sidelink BWP 310 may refer to the resource block with the lowest index in the sidelink BWP 310 (e.g., the 0th resource block of the sidelink BWP 310). The center frequency for S-SSB reception may be at the 66th subcarrier within the 11 resource block S-SSB 320.

The UE 115 transmitting the S-SSB 320 may indicate the offset 325 between the starting resource block of the S-SSB 320 and the starting resource block of the sidelink BWP 310 (e.g., to UEs 115 receiving the S-SSB 320). In some cases, the S-SSB may not support RMSI, and the UE 115 may transmit the indication of the offset 325 in a master information block (MIB) transmitted with the S-SSB 320. The S-SSB 320 may share a synchronization raster with the SSB 315-*a* and the SSB 315-*b*. That is, the S-SSB 320 in the sidelink BWP 310 (i.e., the S-SSB on the edge of the 20 MHz channel) and the SSBs 315-*a* and 315-*b* in the BWP 305 (e.g., NR-U SSBs) may have a same synchronization raster (e.g., the center frequencies of the S-SSB 320 and the SSBs 315-*a* and 315-*b* may be aligned). There may be no confusion between an SSB 315 and the S-SSB 320 because the UE 115 may transmit the S-SSB 320 with a different primary synchronization signal (PSS) sequence from a PSS sequence used by a base station to transmit an SSB 315.

In some aspects, the UE 115 may transmit the indication of the offset 325 using reserved bits in the MIB (e.g., two reserved MIB fields). In other aspects, the UE 115 may transmit the indication of the offset 325 using other bits in the MIB (e.g., the other bits in the MIB may be re-interpreted as the indication of the offset 325). That is, the existing fields in the MIB may be re-interpreted to indicate the offset 325. In yet other aspects, the UE 115 may transmit the indication of the offset 325 using some codepoints for TDD configuration (e.g., since these codepoints may be unused). NR-U may use three or four bits to indicate the resource block offset between a control resource set (coreset) and an SSB. Further, NR may allocate four bits to indicate a subcarrier offset between an SSB and a common resource block (CRB). Thus, two MIB bits may be sufficient to indicate the offset 325. In some aspects, the sidelink BWP 310 may have a subcarrier level offset with the BWP 305 (e.g., NR-U BWP) since the sidelink MIB may have limited codepoints. Because NR may use four bits to indicate the subcarrier offset between the SSB and the CRB, the limited codepoints may be sufficient to indicate the subcarrier level offset between the sidelink BWP 310 and the BWP 305 (e.g., when NR-U uplink and downlink communications (NR-U UU) are time division multiplexed with sidelink communications (PC-5)).

Figure 4:
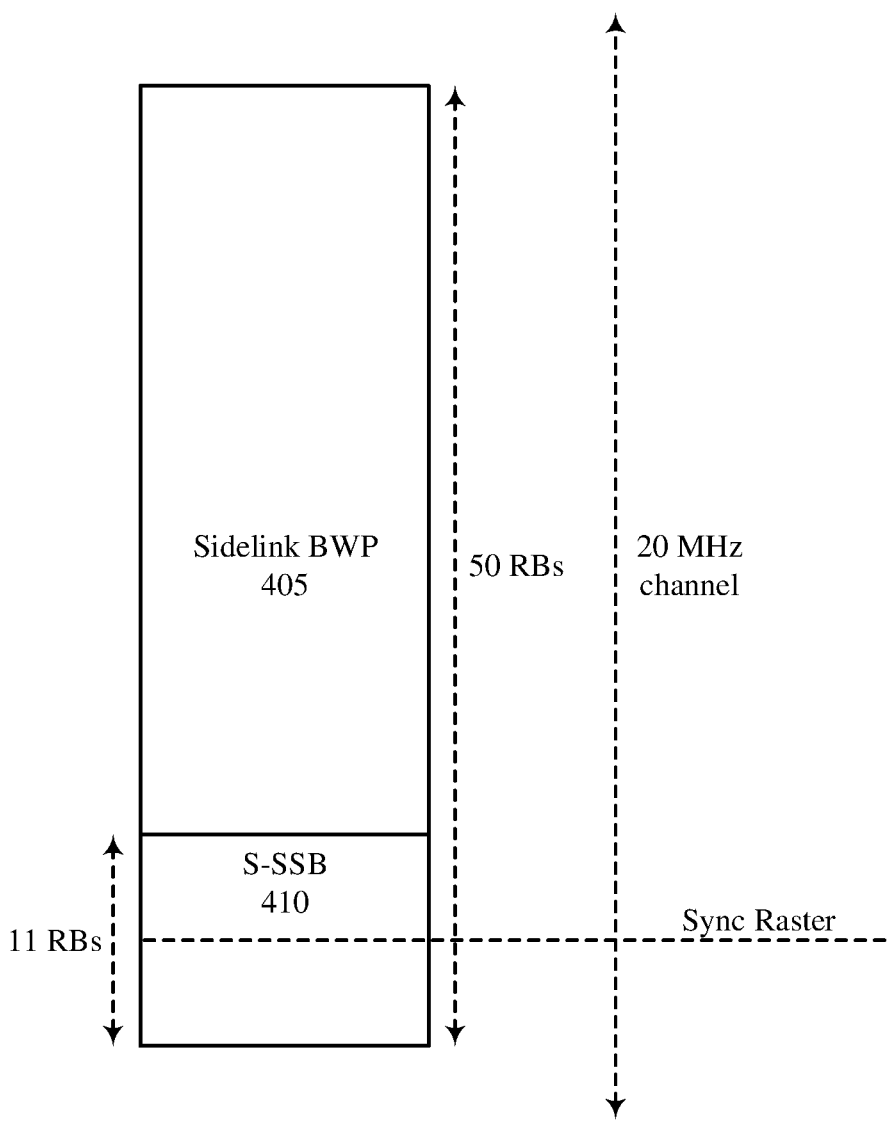
FIG. 4 illustrates aspects of a location of an SSB transmission in accordance with aspects of the present disclosure.

FIG. 4 illustrates an example of a location 400 of an SSB transmission in accordance with aspects of the present disclosure. A UE 115 may identify a sidelink BWP 405 in a shared spectrum, and the UE 115 may transmit an S-SSB 410 in the sidelink BWP 405. The S-SSB 410 may span 11 resource blocks and may be aligned with the lower edge of the sidelink BWP 405. That is, a UE 115 may transmit the S-SSB 410 in the sidelink BWP 405 such that the S-SSB 410 and the sidelink BWP 405 share a same starting resource block. The same starting resource block of the S-SSB 410 and the sidelink BWP 405 may refer to the resource block with the lowest index used to transmit the S-SSB 410 which may be the same as the resource block with the lowest index in the sidelink BWP 405 (e.g., the 0th resource block of the sidelink BWP 405 may be aligned with the 0th resource block used to transmit the S-SSB 410). Thus, a UE 115 may choose a synchronization raster for the S-SSB 410 such that the S-SSB 410 is aligned with a lower edge of a 20 MHz channel. That is, a first synchronization raster of the S-SSB 410 may be different from a second synchronization raster of a downlink SSB in the shared spectrum.

If the S-SSB 410 is aligned with the lower edge of the sidelink BWP 405 as illustrated in FIG. 4, the S-SSB 410 may overlap with a physical sidelink control channel (PSCCH) (e.g., if the PSCCH is transmitted on the two edges the sidelink BWP 405 in an interlace). For instance, a UE 115 may transmit a PSCCH in an interlace on the sidelink BWP 405 (e.g., across the 20 MHz bandwidth). Thus, an S-SSB transmission on an edge of the sidelink BWP 405, as described in FIG. 4, may overlap with the PSCCH. However, if an SSB is transmitted with an offset from a lower edge of a sidelink BWP, as described in FIG. 3, the S-SSB transmission may not overlap with the PSCCH. For instance, the offset between the S-SSB and the lower edge of the sidelink BWP may be defined to prevent the S-SSB from overlapping with the PSCCH. In some cases, the sidelink BWP 405 may align with an NR-U BWP.

The aspects described with reference to FIGS. 3 and 4 may allow a UE 115 to identify a suitable location for S-SSB transmissions in a sidelink BWP in a shared spectrum. In some cases, it may also be beneficial to provide techniques for efficiently beam sweeping S-SSBs in a shared spectrum. In some wireless communications systems, a quantity of S-SSBs within one S-SSB period may be defined. An S-SSB period may correspond to a period of time allocated to a UE 115 for transmitting S-SSBs in a shared spectrum. For a subcarrier spacing of 15 kHz in FR1 (e.g., a low frequency band, such as a sub-6 GHz band), a UE 115 may transmit one S-SSB in a single slot. For a subcarrier spacing of 30 kHz in FR1, a UE 115 may transmit one S-SSB in a single slot or two S-SSBs in respective slots. For a subcarrier spacing of 60 kHz in FR1, a UE 115 may transmit one S-SSB in a single slot or two or four S-SSBs in respective slots. For a subcarrier spacing of 30 kHz in FR2 (e.g., a high frequency band, such as a mmW band), a UE 115 may transmit one S-SSB in a single slot or two, four, eight, 16, or 32 S-SSBs in respective slots. For a subcarrier spacing of 60 kHz in FR2, a UE 115 may transmit one S-SSB in a single slot or two, four, eight, 16, 32, or 64 S-SSBs in respective slots.

Thus, S-SSB beam sweeping may be possible with a limited number of beams (e.g., for a subcarrier spacing greater than or equal to 30 kHz in FR1). In some cases, to maximize the gains of performing a beam sweep, it may be appropriate to add more S-SSB slots (e.g., slots that include SSBs) that are mapped to different beams. In some aspects, the maximum number of S-SSBs (K) within one S-SSB period may be increased (e.g., in FR1). For instance, the maximum number of S-SSBs within one S-SSB period may be increased to two (e.g., {1, 2}) for a subcarrier spacing of 15 kHz in FR1, to four (e.g., {1, 2, 4}) for a subcarrier spacing of 30 kHz in FR1, or to eight (e.g., {1, 2, 4, 8}) for a subcarrier spacing of 60 kHz. Further, a UE 115 may be configured to transmit S-SSBs in contiguous time slots (e.g., with a sidelink time interval of zero). Because each S-SSB may occupy one slot, an S-SSB burst may occupy up to 2 ms. An S-SSB burst may correspond to a group of S-SSBs (e.g., S-SSB instants) each transmitted using a different beam.

Figure 5:
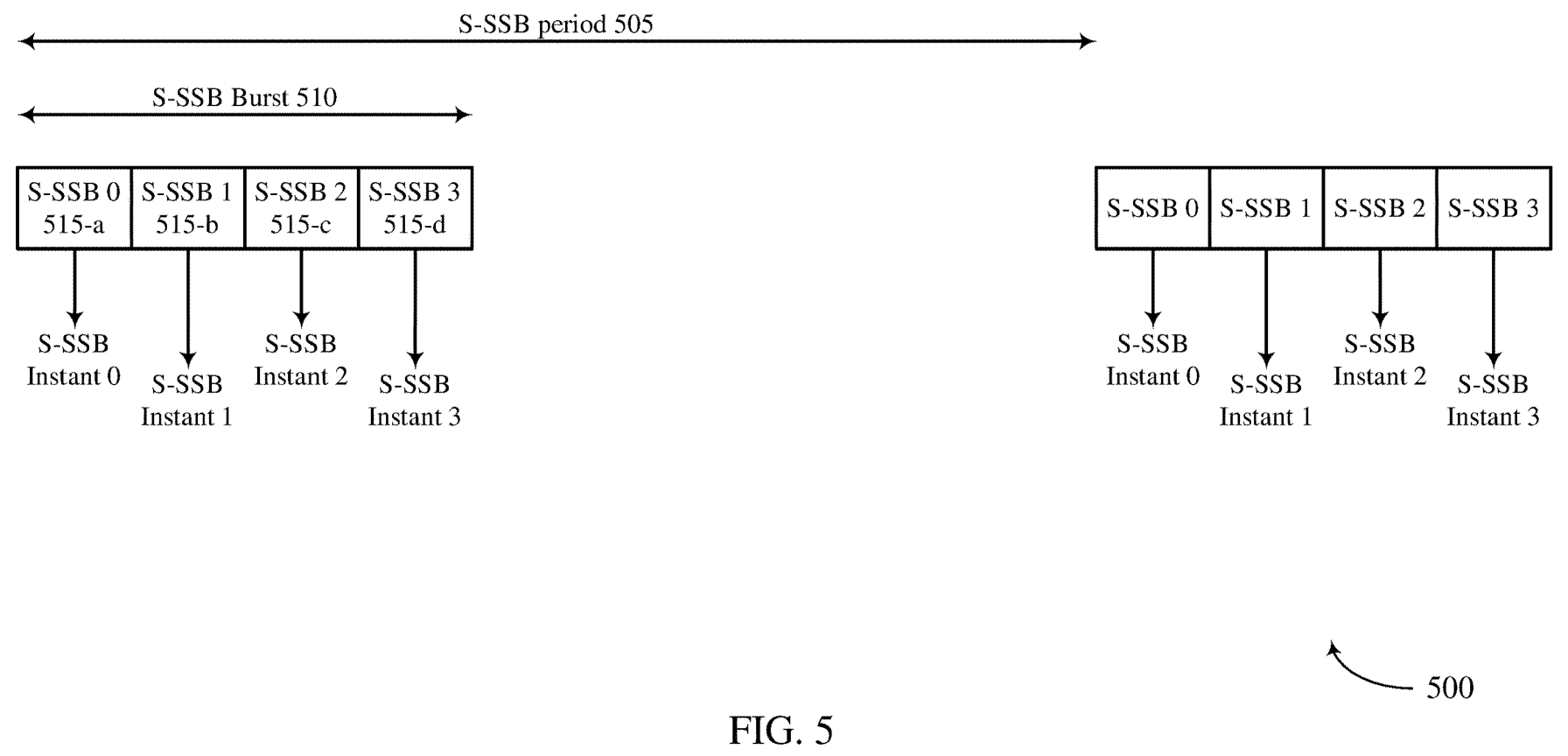

FIG. 5 illustrates aspects of SSB transmissions 500 in a beam sweep in accordance with aspects of the present disclosure. In FIG. 5, a UE 115 may perform an LBT procedure to gain access to a sidelink BWP for an S-SSB period 505 (e.g., 160 ms). The UE 115 may then identify an S-SSB burst 510 to transmit in the S-SSB period 505. The S-SSB burst 510 may include two or more S-SSBs 515, including S-SSB 515-*a*, S-SSB 515-*b*, S-SSB 515-*c*, and S-SSB 515-*d*. The UE 115 may then transmit each of the two or more S-SSBs 515 of the S-SSB burst 510 using a different beam in the S-SSB period 505. That is, the beam sweep of the S-SSBs 515 may correspond to using a different beam to transmit each of the S-SSBs 515 in the S-SSB burst 510. Further, the S-SSBs 515 in the S-SSB burst 510 may be transmitted in contiguous time resources. That is, a UE 115 may transmit the S-SSBs 515 in the S-SSB burst 510 with a sidelink time interval of zero such that there are no gaps in the S-SSB burst 510. By avoiding gaps in the S-SSB burst 510, the UE 115 may prevent other UEs from gaining access to a sidelink channel for transmissions when the UE 115 is using the sidelink channel.

Figure 6:
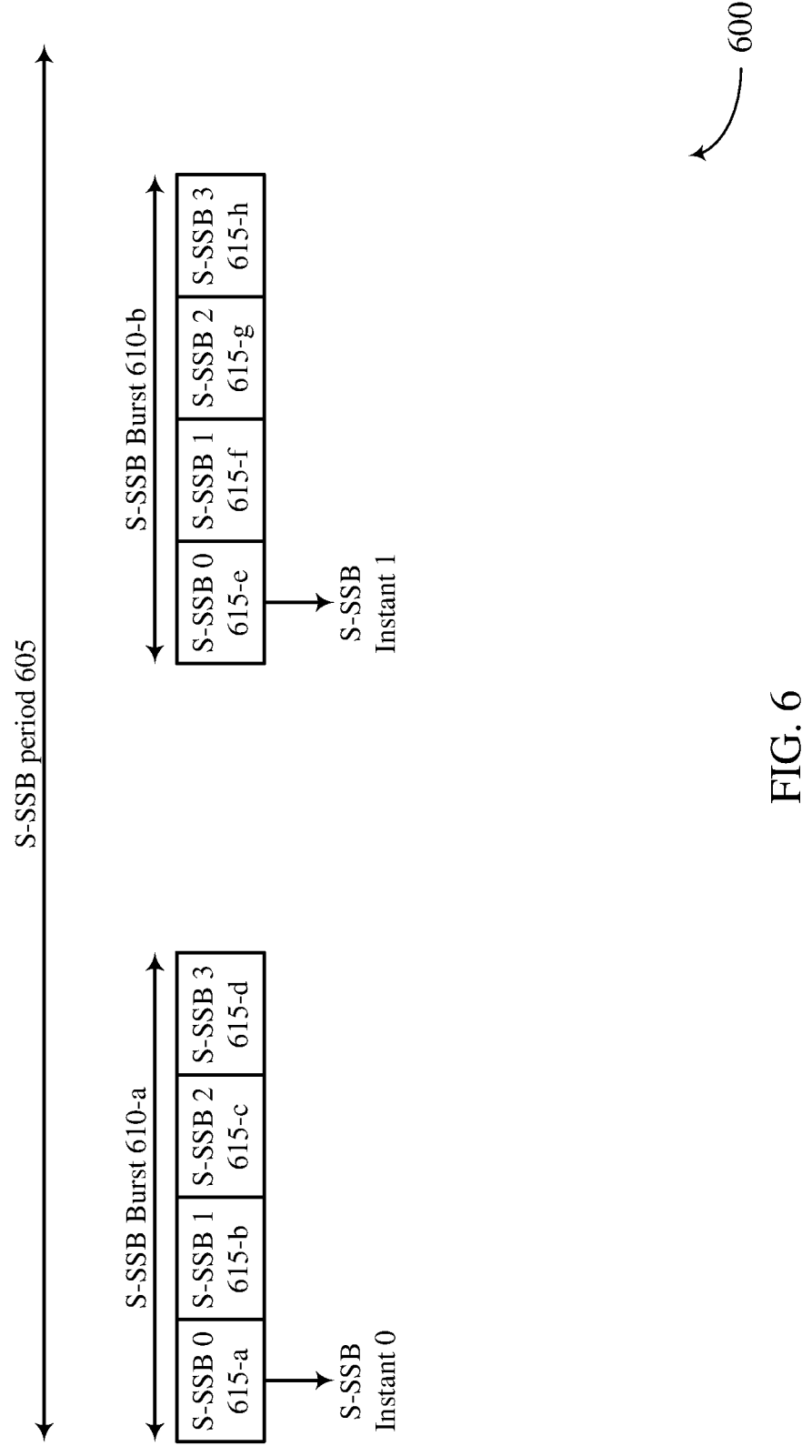
FIG. 6 illustrates aspects of SSB transmissions in a beam sweep in accordance with aspects of the present disclosure.

In some cases, in addition to transmitting an S-SSB burst with multiple S-SSBs in an S-SSB period, it may be beneficial for a UE 115 to transmit even more S-SSBs in an S-SSB period to increase the likelihood that other UEs will be able to discover the UE 115. FIG. 6 illustrates aspects of SSB transmissions 600 in a beam sweep in accordance with aspects of the present disclosure. As illustrated, a UE 115 may transmit multiple S-SSB bursts 610 in an S-SSB period 605. For instance, a wireless communications system may allow multiple contiguous S-SSB slots (e.g., S-SSB instances) in each S-SSB burst to sweep the beams, and multiple S-SSB bursts in each S-SSB period. Each S-SSB slot in an S-SSB burst may be transmitted with a different beam (e.g., from the beams used to transmit other S-SSB slots in the S-SSB burst). Further, each S-SSB burst may include a same or different beam sweep (e.g., a first S-SSB burst with S-SSBs transmitted with a first set of beams and a second S-SSB burst with S-SSBs transmitted with a second set of beams). In some aspects, for a subcarrier spacing of 30 kHz, there may be four S-SSB slots within one S-SSB burst (e.g., which sweeps up to four beams), and there may be up to two S-SSB bursts within an S-SSB period (e.g., 160 ms).

In FIG. 6, a UE 115 may perform an LBT procedure to gain access to a sidelink BWP in a shared spectrum for an S-SSB period 605. The UE 115 may then identify multiple S-SSB bursts 610 (e.g., S-SSB burst 610-*a* and S-SSB burst 610-*b*) to transmit in the S-SSB period 605. Each S-SSB burst may include two or more S-SSBs 615. For instance, S-SSB burst 610-*a* may include S-SSB 615-*a*, S-SSB 615-*b*, S-SSB 615-*c*, and S-SSB 615-*d*, and S-SSB burst 610-*b* may include S-SSB 615-*e*, S-SSB 615-*f*, S-SSB 615-*g*, and S-SSB 615-*h*. The UE 115 may then transmit each of the two or more S-SSBs 615 in each S-SSB burst 610 using a different beam in the S-SSB period 605. That is, the beams used to transmit S-SSBs 615 in each S-SSB burst 610 may be the same or different. The UE 115 may also select a sidelink time interval for each of the multiple S-SSB bursts 610 such that the multiple S-SSB bursts 610 are non-overlapping in the S-SSB period. That is, the time interval between two S-SSBs 615 may be chosen such that S-SSB bursts 610 are non-overlapping.

In some cases, a base station 105 may configure a UE 115 to transmit a particular number of S-SSB bursts in an S-SSB period. For instance, the base station 105 may transmit an indication of a number (e.g., quantity) of S-SSB bursts for the UE 115 to transmit in an S-SSB period. In FIG. 5, the base station 105 may transmit an indication for the UE 115 to transmit one S-SSB burst in an S-SSB period, and, in FIG. 6, the base station 105 may transmit an indication for the UE 115 to transmit two S-SSB bursts in an S-SSB period. In other cases, a UE 115 may be preconfigured with a number of S-SSB bursts to transmit in an S-SSB period (e.g., installed in the profile of the UE 115). Further, when a UE 115 transmits an S-SSB in a slot, the UE 115 may transmit a MIB with the S-SSB. The UE 115 may also transmit an indication of the slot index in the MIB, and the slot index may indicate the beam index of the beam used to transmit the S-SSB (e.g., after a receiving UE 115 decodes the payload of the MIB). That is, the slot index may be remapped to an S-SSB beam index if a receiving UE 115 is able to identify the S-SSB pattern.

Additionally, or alternatively, the UE 115 may transmit demodulation reference signals (DMRSs) with (e.g., alongside) an S-SSB, and the UE 115 may indicate a beam index of a beam used to transmit the S-SSB in the DMRS scrambling sequence (e.g., if the UE 115 is unable to identify the S-SSB pattern, as is the case for initial access). That is, the UE 115 may identify a beam for transmitting an S-SSB in an S-SSB burst, and the UE 115 may encode at least a portion of a DMRS scrambling sequence (e.g., two or three bits) included with the S-SSB based on a beam index of the identified beam. For instance, the UE 115 may set an initialization seed for the encoding as a function of the beam index of the identified beam. A receiving UE 115 may receive an S-SSB and a DMRS scrambling sequence with the S-SSB, and the receiving UE 115 may blind decode at least the portion of the DMRS scrambling sequence to identify a beam index of a beam used to transmit the S-SSB. For instance, the receiving UE 115 may perform blind decoding based on four or eight blind decoding hypotheses to determine the S-SSB beam index.

Figure 7:
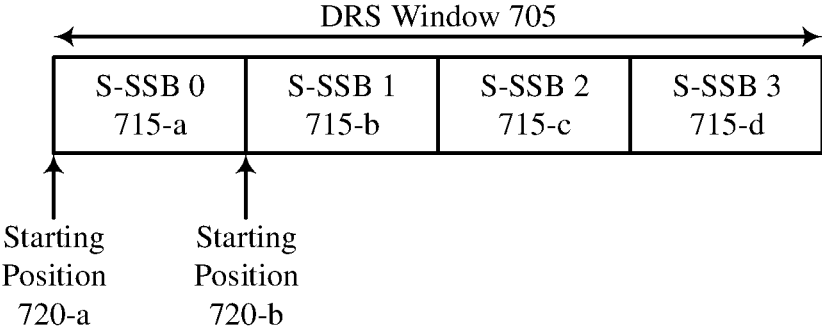
FIG. 7 illustrates aspects of SSB transmissions in a DRS window in accordance with aspects of the present disclosure.
Figure 7:
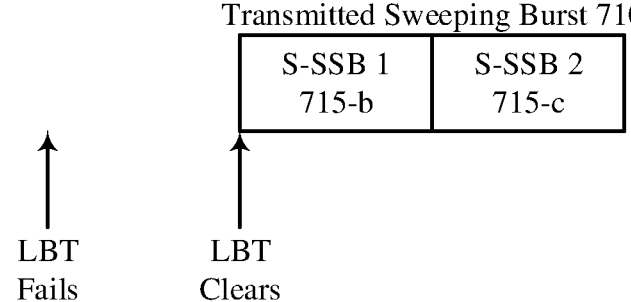
Figure 7:

FIG. 7 illustrates aspects of SSB transmissions 700 in a DRS window in accordance with aspects of the present disclosure. As described above, before transmitting S-SSBs in a shared spectrum, a UE 115 may perform an LBT procedure to gain access to a sidelink BWP to transmit the S-SSBs. In some cases, however, some attempts at gaining access to the sidelink BWP (e.g., some LBT procedures) may fail. To allow multiple chances or attempts at a successful LBT procedure, it may be beneficial for a UE 115 to be configured with multiple starting positions for transmitting the S-SSBs (e.g., S-SSB sweeping). As described herein, a DRS window 705 may be configured with multiple starting positions at which a UE 115 may begin transmitting S-SSBs (e.g., begin an S-SSB burst). That is, a DRS window 705 may be defined to allow multiple starting positions for up to K contiguous S-SSB transmissions. In some cases (e.g., in NR-U), the DRS window 705 may span 5 ms and may include contiguous SSB transmissions for up to a certain quantity of S-SSBs (e.g., X S-SSBs, where X=1, 2, 4, or 8)

The DRS window 705 may be allocated for a UE 115 to transmit multiple S-SSBs 715, including an S-SSB 715-*a*, an S-SSB 715-*b*, an S-SSB 715-*c*, and an SSB 715-*d*. The UE 115 may identify the DRS window 705 including multiple starting positions for transmitting S-SSBs 715, and the UE

115 may perform an LBT procedure to gain access to the DRS window 705 in the shared spectrum. The UE 115 may then transmit the S-SSBs 715 at a first starting position of the multiple starting positions after gaining access to the DRS window 705. The first starting position may correspond to the closest starting position, in time, to the time at which the UE 115 gains access to the DRS window 705. In FIG. 7, the UE 115 may perform a first LBT procedure before starting position 720-*a*, but the LBT procedure may fail. Thus, the UE 115 may avoid transmitting the sweeping burst 710 at the starting position 720-*a*. The UE 115 may then perform a second LBT procedure before starting position 720-*b*, and the second LBT procedure may be successful (i.e., the channel may be clear). Thus, the UE 115 may transmit the sweeping burst 710 starting at the starting position 720-*b*.

In some aspects, the maximum number of S-SSBs in an S-SSB burst may be denoted by K, and the number of slots in a DRS window may be denoted by Y. In such aspects, for a subcarrier spacing of 15 kHz, if K is equal to one, and Y is equal to two, there may be two starting positions (e.g., LBT starting positions) in the DRS window. For a subcarrier spacing of 30 kHz, if K is equal to two, and Y is equal to four, there may be three starting positions in the DRS window. For a subcarrier spacing of 60 kHz, if K is equal to four, and Y is equal to eight, there may be four starting positions in the DRS window. In the aspects described above, the DRS window 705 may span four slots, as shown in FIG. 7. In some cases, when a UE 115 transmits a physical sidelink broadcast channel (PSBCH) (e.g., including an S-SSB) in a slot in a DRS window, the UE 115 may transmit a slot number in the PBSCH indicating the slot number that includes the PB SCH. In such cases, the UE 115 may also transmit a DMRS scrambling sequence with an S-SSB indicating the beam index of a beam used to transmit the S-SSB.

Figure 8:
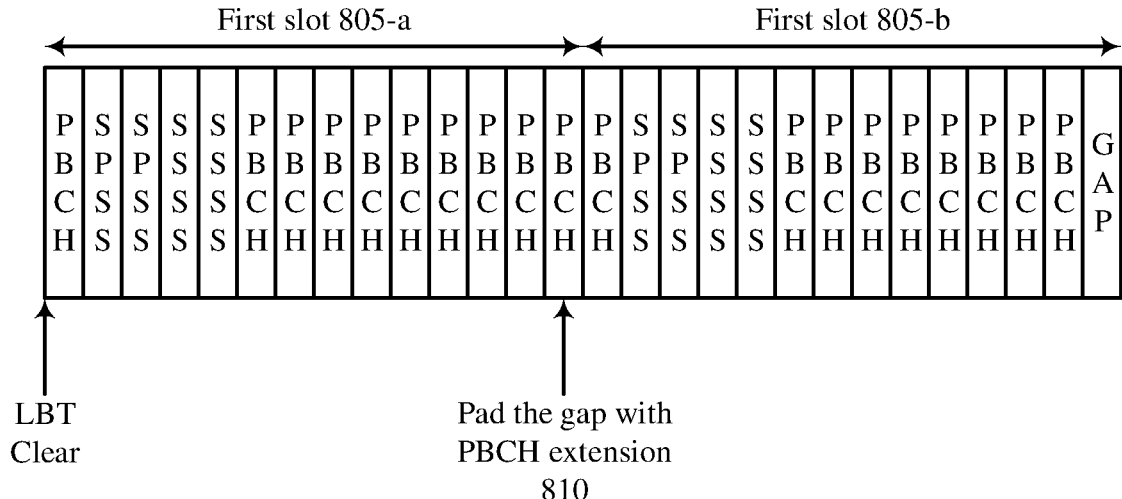
FIG. 8 illustrates aspects of SSB transmissions across multiple slots in accordance with aspects of the present disclosure.
Figure 8:
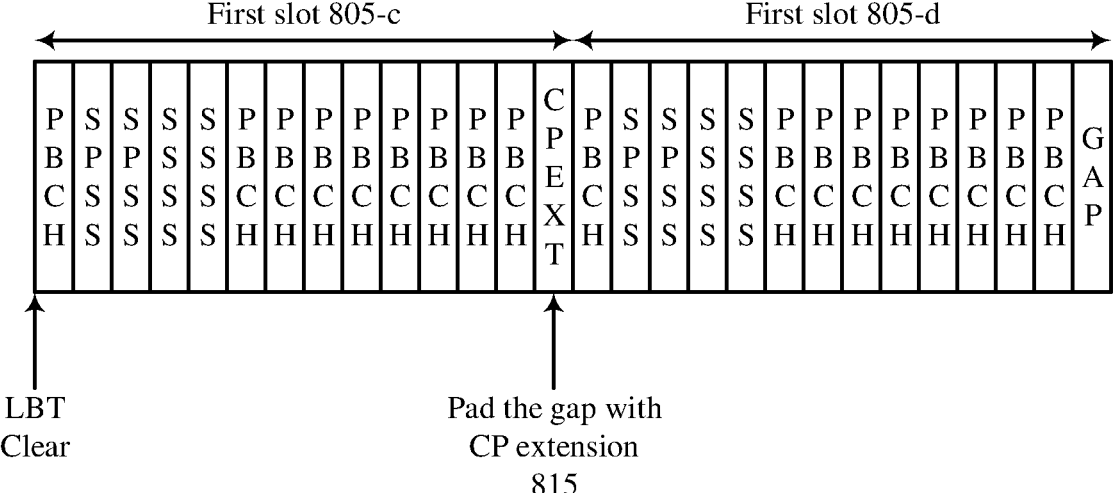

FIG. 8 illustrates aspects of SSB transmissions 800 across multiple slots in accordance with aspects of the present disclosure. In the aspects described above, a UE 115 may transmit multiple S-SSBs across multiple slots (e.g., in an S-SSB burst). In some cases, however, a last symbol at the end of a slot that includes an S-SSB may be empty. Thus, even when a UE 115 is configured to transmit multiple S-SSBs back-to-back (e.g., in contiguous time slots), there may be a one-symbol gap at the end of a slot. In such cases, other devices (e.g., UEs 115, Wi-Fi devices) may determine that a channel used to transmit the S-SSBs is clear during the gap, and these other devices may transmit signals during the gap which may interfere with the S-SSBs. As described herein, a UE 115 may fill the gap between S-SSBs to prevent other devices from accessing the channel between S-SSBs transmitted in a shared spectrum.

In a first aspect 800-*a*, a UE 115 may identify a first S-SSB to transmit in a first slot 805-*a* and a second S-SSB to transmit in a second slot 805-*b*. The UE 115 may then generate a PBCH repetition 810 to fill a gap between the first S-SSB and the second S-SSB, and the UE 115 may transmit the first S-SSB in the first slot 805-*a* and the second S-SSB in the second slot 805-*b* with the PBCH repetition 810 between the first and second S-SSBs. That is, the UE 115 may fill gaps in the middle of S-SSB bursts with PBCH repetitions. In some cases, if the UE 115 is not scheduled to transmit in a shared spectrum after a last S-SSB in a last slot (e.g., the S-SSB in the second slot 805-*b*), the UE 115 may avoid filling the last symbol of the last slot. That is, the UE 115 may fill in the 13th symbol of one or more slots with PBCH repetitions except for the 13th symbol of the slot that includes the last S-SSB in an S-SSB sweeping burst. In the first aspect, the UE 115 may prevent other devices (or nodes) from jumping in during the one-symbol gap between the first slot 805-*a* and the second slot 805-*b*. Further, the PBCH repetition 810 could be a repetition of the PBCH in the previous symbol (e.g., symbol 12 of the first slot 805-*a*).

In a second aspect 800-*b*, a UE 115 may identify a first S-SSB to transmit in a first slot 805-*c* and a second S-SSB to transmit in a second slot 805-*d*. The UE 115 may then generate a cyclic prefix (CP) extension 815 to fill a gap between the first S-SSB and the second S-SSB, and the UE 115 may transmit the first S-SSB in the first slot 805-*c* and the second S-SSB in the second slot 805-*d* with the CP extension 815 between the first and second S-SSBs. That is, the UE 115 may fill gaps in the middle of S-SSB bursts with CP extensions. In some cases, if the UE 115 is not scheduled to transmit in a shared spectrum after a last S-SSB in a last slot (e.g., the S-SSB in the second slot 805-*c*), the UE 115 may avoid filling the last symbol of the slot. That is, the UE 115 may fill in the 13th symbol of one or more slots with CP extensions except for the 13th symbol of the slot that includes the last S-SSB in an S-SSB sweeping burst. In the second aspect, the UE 115 may prevent other devices (or nodes) from jumping in during the one-symbol gap between the first slot 805-*c* and the second slot 805-*d*. In some cases, the CP extension 815 could be from the first PBCH symbol in the next slot (e.g., symbol 1 of the second slot 805-*d*). Additionally, or alternatively, the CP extension 815 could be a postfix extension (e.g., of the last symbol of the S-SSB).

In the aspects described herein, a UE 115 may perform an LBT procedure to gain access to a sidelink channel in a shared spectrum to transmit S-SSBs. For FR1, an S-SSB sweeping burst may be less than or equal to one or two ms within a period of 160 ms. Thus, a category two procedure for accessing a shared spectrum for S-SSB transmissions may be preferable but may not be used as sidelink nodes support asynchronous operation. Instead, a category four procedure for accessing the shared spectrum for S-SSB transmissions may be supported. As such, in some cases, a UE 115 may perform a category two procedure with a highest priority to access a sidelink channel for S-SSB transmissions. In other cases, a UE 115 may perform a category four procedure with a highest priority to access a sidelink channel for S-SSB transmissions.

In some cases, sidelink may have some received signal received power (RSRP) criterion for a UE 115 to become a synchronization node which sends S-SSBs. For instance, UEs that do not identify synchronization reference signals (e.g., NR-U SSBs) that satisfy an RSRP threshold may be allowed to transmit an S-SSB, while UEs that do identify at least one synchronization reference signal that satisfies the RSRP threshold may be barred from transmitting an S-SSB. Further, as mentioned above, a beam sweeping procedure for S-SSB transmissions may be introduced to improve the quality of links between UEs 115 (e.g., especially in FR2). In NR-uu (e.g., uplink and downlink communications), a beam sweeping procedure may rely on SSB repetitions and beam sweeping, and a receiving UE 115 may use a corresponding physical random access channel (PRACH) resource to select a transmit beam of a transmitting UE 115. In sidelink communications, it may be beneficial to associate each S-SSB beam with a corresponding physical sidelink feedback channel (PSFCH) or PRACH resource. That is, PRACH may be used in sidelink communications (e.g., over a PC5 interface). Because PSFCH or PRACH resources may correspond to S-SSB beams, a receiving UE 115 may choose a PSFCH or PRACH resource to indicate a preferred transmit beam (e.g., a beam for a UE 115 that transmitted the S-SSB to use for transmissions to the receiving UE 115). Additionally, or alternatively, the receiving UE 115 may indicate the preferred beam using a physical sidelink shared channel (PSSCH).

In some aspects, a UE 115 may perform an LBT procedure to gain access to a sidelink BWP in a shared spectrum for an S-SSB period, and the UE 115 may transmit one or more S-SSBs using one or more beams in the S-SSB period, where each S-SSB is transmitted using a different beam. The UE 115 may then receive, from another UE 115, an indication of a preferred beam of the one or more beams for transmitting sidelink data to the other UE 115. The UE 115 may then transmit sidelink data to the other UE 115 on the preferred beam. In one aspect, the UE 115 may receive signaling on a PSFCH resource corresponding to an S-SSB (e.g., mapped to the S-SSB), and the UE 115 may determine that a beam used to transmit the S-SSB is the preferred beam. In another aspect, the UE 115 may receive signaling on a PRACH resource corresponding to an S-SSB (e.g., mapped to the S-SSB), and the UE 115 may determine that a beam used to transmit the S-SSB is the preferred beam. In yet another aspect, the UE 115 may receive an indication of the preferred beam in a PSSCH.

By using beam sweeping to transmit S-SSBs, a UE 115 may be able to identify a suitable beam for communicating with another UE 115 over a sidelink connection. In some cases, however, S-SSB sweeping using all possible beams or a large amount of beams in corresponding S-SSB slots at all times may result in large overhead and may cause interference to other links. As described herein, a UE 115 may support a mechanism to turn on and off S-SSB beam sweeping (e.g., with long S-SSB bursts). To further limit overhead, in some aspects, the periodicity of S-SSB transmissions may be long. In such aspects, a channel state information reference signal (CSI-RS) based beam management procedure may be introduced to allow a UE 115 to perform beam recovery (e.g., based on S-SSBs) in the time between the periodic S-SSB transmissions.

FIG. 9 illustrates aspects of on-demand S-SSB sweeping 900 in accordance with aspects of the present disclosure. A UE 115 may sweep all S-SSB beams or a certain quantity of S-SSB beams if the UE 115 is triggered by another UE 115 (e.g., if indicated by layer one or layer two signaling). In some cases, there may be two numbers (e.g., X and Y) of beams or S-SSBs within one S-SSB period. The smaller number (e.g., X) may be the default value for S-SSB burst transmissions, and the larger number (e.g., Y) may be the number of beams to be used for S-SSB transmissions when the UE 115 is triggered. Thus, if on-demand S-SSB sweeping is not triggered, a transmit UE 115 may transmit X S-SSBs per S-SSB period to reduce overhead. Alternatively, a receiving UE 115 may trigger a beam management procedure at a transmit UE 115, and the transmit UE 115 may transmit Y S-SSBs in an upcoming S-SSB period. The on-demand triggered S-SSB beam sweeping may be with a different set of beams than the beams used in the default S-SSB burst. For instance, a UE 115 may transmit a default S-SSB burst with one or more wide beams, and the UE 115 may perform the triggered S-SSB beam sweeping with narrower beams for beam refinement (e.g., of one or more of the wide beams).

In FIG. 9, a UE 115 may perform an LBT procedure to gain access to a sidelink BWP in a shared spectrum for an S-SSB period 905. The UE 115 may then determine whether to transmit a first quantity or a second quantity of S-SSBs in the S-SSB period 905, where the first quantity is greater than the second quantity. Because the UE 115 may fail to receive a trigger to transmit the first quantity of S-SSBs in the S-SSB period 905, the UE 115 may transmit the second quantity of S-SSBs in the S-SSB period 905. In particular, the UE 115 may transmit a single S-SSB 915-*a* in the S-SSB period 905. The UE 115 may then receive a trigger 910 to transmit the first quantity of S-SSBs in a next S-SSB period (not shown). Thus, the UE 115 may transmit the sweeping burst 920 in the next S-SSB period. In particular, the UE 115 may transmit S-SSB 915-*b*, S-SSB 915-*c*, S-SSB 915-*d*, and S-SSB 915-*e* in the sweeping burst 920 using one or more beams (e.g., as part of a beam refinement procedure). The UE 115 may transmit each of the S-SSBs 915 in the sweeping burst 920 using a different beam.

Figure 10:
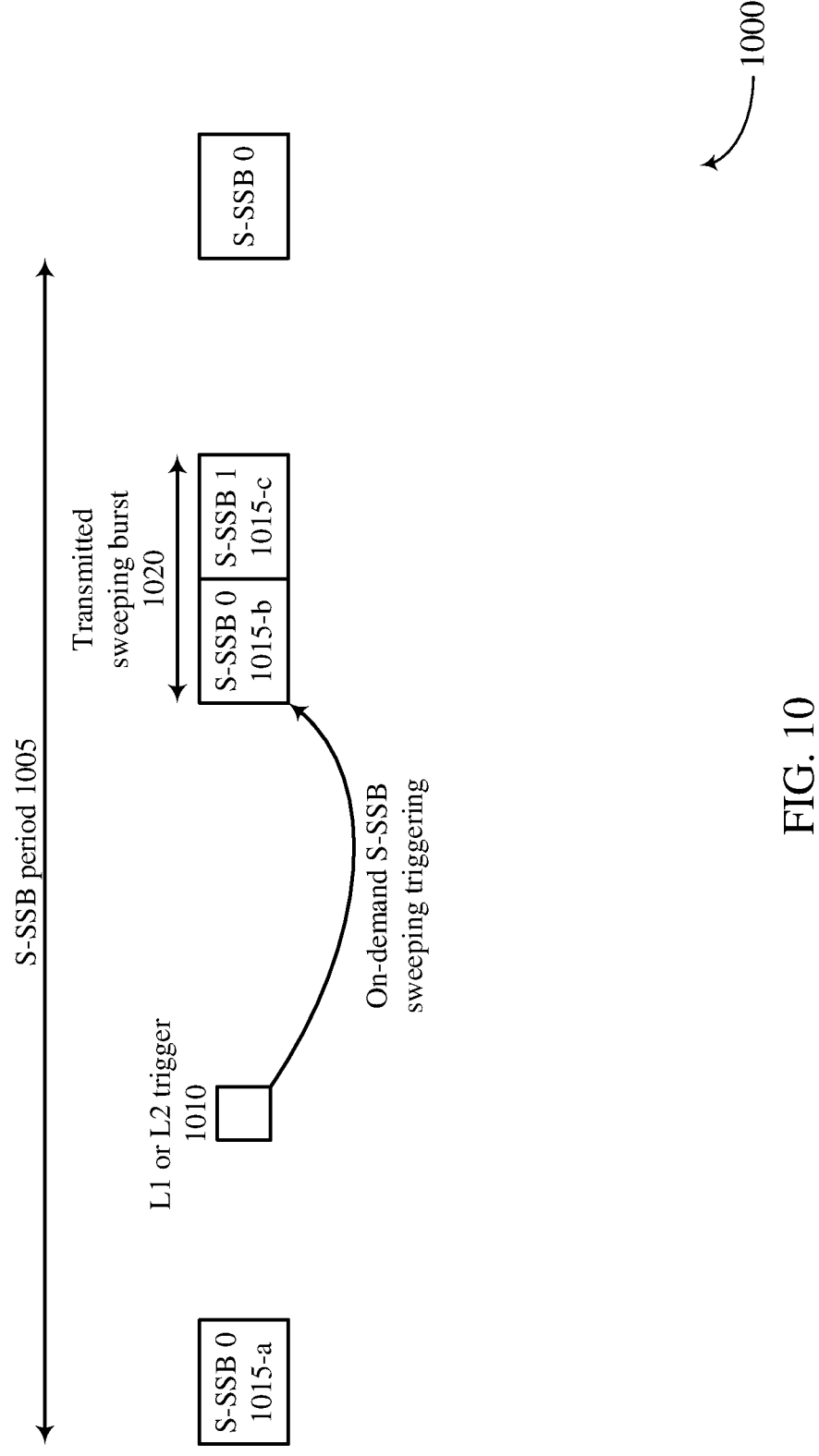
FIG. 10 illustrates aspects of on-demand S-SSB sweeping including multiple S-SSB burst transmissions in a single S-SSB period in accordance with aspects of the present disclosure.

In some cases, a UE 115 may transmit both a first quantity of S-SSBs and a second quantity of S-SSBs in a same S-SSB period. In such cases, the UE 115 may be able to support imminent S-SSB burst sweeping for beam refinement in the middle of a long S-SSB period. FIG. 10 illustrates aspects of on-demand S-SSB sweeping 1000 including multiple S-SSB burst transmissions in a single S-SSB period 1005 in accordance with aspects of the present disclosure. In FIG. 10, a UE 115 may also perform an LBT procedure to gain access to a sidelink BWP in a shared spectrum for the S-SSB period 1005. The UE 115 may then determine whether to transmit a first quantity or a second quantity of S-SSBs in the S-SSB period 1005, where the first quantity is greater than the second quantity. Because the UE 115 may fail to receive a trigger to transmit the first quantity of S-SSBs before the start of the S-SSB period 905, the UE 115 may transmit the second quantity of S-SSBs in the S-SSB period 1005. In particular, the UE 115 may transmit a single S-SSB 1015-*a* in the S-SSB period 1005.

The UE 115 may then receive a trigger 1010 to transmit the first quantity of S-SSBs in the S-SSB period 1005. Thus, the UE 115 may transmit the sweeping burst 1020 in the S-SSB period 1005. In particular, the UE 115 may transmit S-SSB 1015-*b* and S-SSB 1015-*c* in the sweeping burst 1020 using one or more beams (e.g., as part of a beam refinement procedure). The UE 115 may transmit each of the S-SSBs 1015 in the sweeping burst 1020 using a different beam. The UE 115 may transmit the on-demand S-SSB sweeping burst 1020 a predefined or preconfigured amount of time (e.g., Z slots) after receiving a trigger. In some aspects, however, transmitting the S-SSB sweeping burst 1020 in the S-SSB period 1005 may cause dynamic interference to other UE pairs since other UE pairs may not identify the dynamic S-SSB transmission (e.g., since the other UE pairs may be unable to determine the predefined or preconfigured amount of time between the trigger 1010 and the S-SSB sweeping burst 1020).

In both aspects described with reference to FIGS. 9 and 10, a UE 115 may receive a trigger to perform on-demand S-SSB beam sweeping. The UE 115 may receive the trigger in layer one or layer two signaling from another UE 115 or a base station 105. The layer one signaling may be reserved PRACH resources which may trigger the on-demand S-SSB sweeping or sidelink control information (SCI) (e.g., stage two SCI) on a reverse link which may trigger the on-demand S-SSB sweeping (e.g., SCI in a PSSCH). The layer two signaling may be a MAC-CE in a reverse link which may trigger the on-demand S-SSB sweeping. After an on-demand S-SSB transmission, a transmitting UE 115 may transmit the default number of S-SSBs in an S-SSB period (e.g., next S-SSB period) if no trigger is received.

Figure 11:
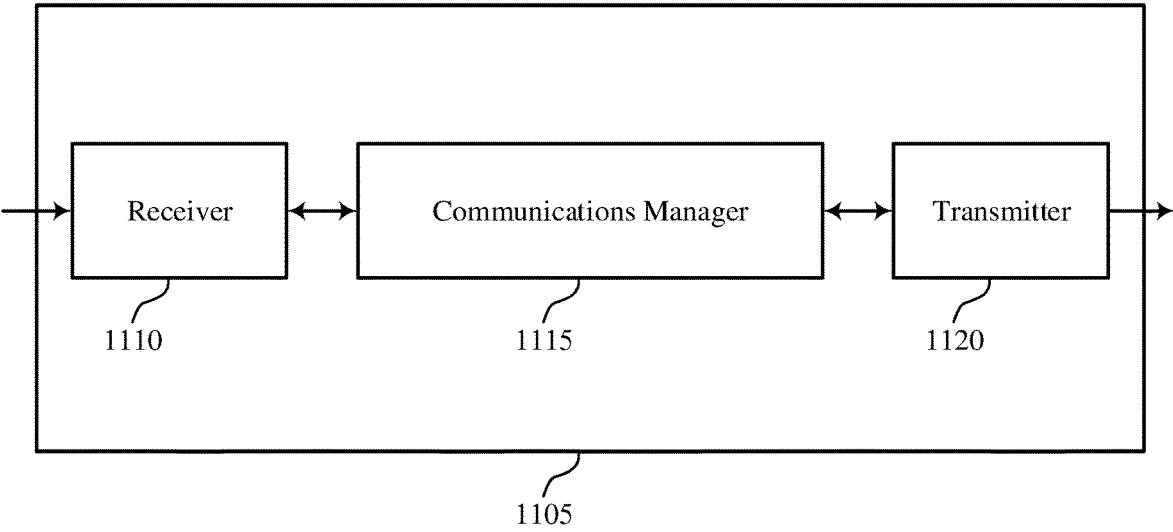
FIGS. 11 and 12 show block diagrams of devices that support S-SSB transmissions in a shared spectrum in accordance with aspects of the present disclosure.

FIG. 11 shows a block diagram 1100 of a device 1105 that supports S-SSB transmissions in a shared spectrum in accordance with aspects of the present disclosure. The device

1105 may be an example of aspects of a UE 115 as described herein. The device 1105 may include a receiver 1110, a communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to S-SSB transmissions in a shared spectrum, etc.). Information may be passed on to other components of the device 1105. The receiver 1110 may be an example of aspects of the transceiver 1420 described with reference to FIG. 14. The receiver 1110 may utilize a single antenna or a set of antennas.

The communications manager 1115 may perform a listen-before-talk procedure to gain access to a sidelink bandwidth part for sidelink communications in a shared spectrum, identify a sidelink synchronization signal block to transmit in the sidelink bandwidth part, and transmit the sidelink synchronization signal block in the sidelink bandwidth part such that a first starting resource block of the sidelink synchronization signal block is offset from a second starting resource block of the sidelink bandwidth part.

The communications manager 1115 may also identify a sidelink bandwidth part in a shared spectrum including a sidelink synchronization signal block, receive a master information block indicating an offset between a first starting resource block of the sidelink synchronization signal block and a second starting resource block of the sidelink bandwidth part, and decode the sidelink synchronization signal bock in the sidelink bandwidth part based on receiving the master information block indicating the offset.

The communications manager 1115 may also perform a listen-before-talk procedure to gain access to a sidelink bandwidth part for sidelink communications in a shared spectrum, identify a sidelink synchronization signal block to transmit in the sidelink bandwidth part, and transmit the sidelink synchronization signal block in the sidelink bandwidth part such that the sidelink synchronization signal block and the sidelink bandwidth part share a same starting resource block.

The communications manager 1115 may also perform a listen-before-talk procedure to gain access to a sidelink bandwidth part in a shared spectrum for a sidelink synchronization signal block period, identify a sidelink synchronization signal block burst to transmit in the sidelink synchronization signal block period, the sidelink synchronization signal block burst including two or more sidelink synchronization signal blocks, and transmit each of the two or more sidelink synchronization signal blocks of the sidelink synchronization signal block burst using a different beam, where the two or more sidelink synchronization signal blocks in the sidelink synchronization signal block burst are transmitted in contiguous time resources.

The communications manager 1115 may also identify a sidelink synchronization signal block period with a sidelink synchronization signal block burst including two or more sidelink synchronization signal blocks each transmitted using a different beam and receive the sidelink synchronization signal block burst including the two or more sidelink synchronization signal blocks in contiguous time resources.

The communications manager 1115 may also perform a listen-before-talk procedure to gain access to a sidelink bandwidth part in a shared spectrum for a sidelink synchronization signal block period, identify a set of sidelink synchronization signal block bursts to transmit in the sidelink synchronization signal block period, each sidelink synchronization signal block burst including two or more sidelink synchronization signal blocks, and transmit each of the two or more sidelink synchronization signal blocks in each sidelink synchronization signal block burst using a different beam in the sidelink synchronization signal block period.

The communications manager 1115 may also identify a sidelink synchronization signal block period with a set of sidelink synchronization signal block bursts, each sidelink synchronization signal block burst including two or more sidelink synchronization signal blocks, and each of the two or more sidelink synchronization signal blocks transmitted using a different beam and receive the set of sidelink synchronization signal block bursts in the sidelink synchronization signal block period.

The communications manager 1115 may also identify a DRS window in a shared spectrum including a set of starting positions for transmitting one or more sidelink synchronization signal blocks, perform a listen-before-talk procedure to gain access to the discovery reference signal window in the shared spectrum, and transmit the one or more sidelink synchronization signal blocks at a first starting position of the set of starting positions after gaining access to the discovery reference signal window in the shared spectrum.

The communications manager 1115 may also identify a DRS window in a shared spectrum in which to receive one or more sidelink synchronization signal blocks, determine that the discovery reference signal window includes a set of starting positions for receiving the one or more sidelink synchronization signal blocks, and monitor the set of starting positions for the one or more sidelink synchronization signal blocks in the discovery reference signal window.

The communications manager 1115 may also identify a first sidelink synchronization signal block to transmit in a first slot and a second sidelink synchronization signal block to transmit in a second slot in a sidelink bandwidth part of a shared spectrum, generate a PBCH repetition or cyclic prefix extension to fill a gap between the first sidelink synchronization signal block and the second sidelink synchronization signal block, and transmit the first sidelink synchronization signal block in the first slot and the second sidelink synchronization signal block in the second slot with the physical broadcast channel repetition or the cyclic prefix extension between the first and second sidelink synchronization signal blocks.

The communications manager 1115 may also perform a listen-before-talk procedure to gain access to a sidelink bandwidth part in a shared spectrum for a sidelink synchronization signal block period, transmit one or more sidelink synchronization signal blocks using one or more beams in the sidelink synchronization signal block period, each of the one or more sidelink synchronization signal blocks transmitted using a different beam, and receive, from a second UE, an indication of a preferred beam of the one or more beams for transmitting sidelink data to the second UE based on transmitting the one or more sidelink synchronization signal blocks.

The communications manager 1115 may also receive, from a second UE in a sidelink synchronization signal block period, one or more sidelink synchronization signal blocks transmitted using one or more beams, each of the one or more sidelink synchronization signal blocks transmitted using a different beam, select a preferred beam of the one or more beams for the second UE to use to transmit sidelink data to the first UE, and transmit, to the second UE, an indication of the preferred beam based on the selecting.

The communications manager 1115 may also perform a listen-before-talk procedure to gain access to a sidelink bandwidth part in a shared spectrum for a sidelink synchronization signal block period, determine whether to transmit a first quantity or a second quantity of sidelink synchronization signal blocks in the sidelink synchronization signal block period, the first quantity being greater than the second quantity, and transmit the first quantity or the second quantity of sidelink synchronization signal blocks in the sidelink synchronization signal block period based on the determining.

The communications manager 1115 may also determine whether to receive a first quantity or a second quantity of sidelink synchronization signal blocks from a second UE in a sidelink synchronization signal block period, the first quantity being greater than the second quantity, identify the sidelink synchronization signal block period with the first quantity or the second quantity of sidelink synchronization signal blocks, and receive the first quantity or the second quantity of sidelink synchronization signal blocks in the sidelink synchronization signal block period based on the determining. The communications manager 1115 may be an example of aspects of the communications manager 1410 described herein.

The communications manager 1115, or its sub-components, may be implemented in hardware, code (e.g., software or firmware) executed by a processor, or any combination thereof. If implemented in code executed by a processor, the functions of the communications manager 1115, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1115, or its sub-components, may be physically located at various positions, including being distributed such that portions of functions are implemented at different physical locations by one or more physical components. In some examples, the communications manager 1115, or its sub-components, may be a separate and distinct component in accordance with various aspects of the present disclosure. In some examples, the communications manager 1115, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

Figure 12:
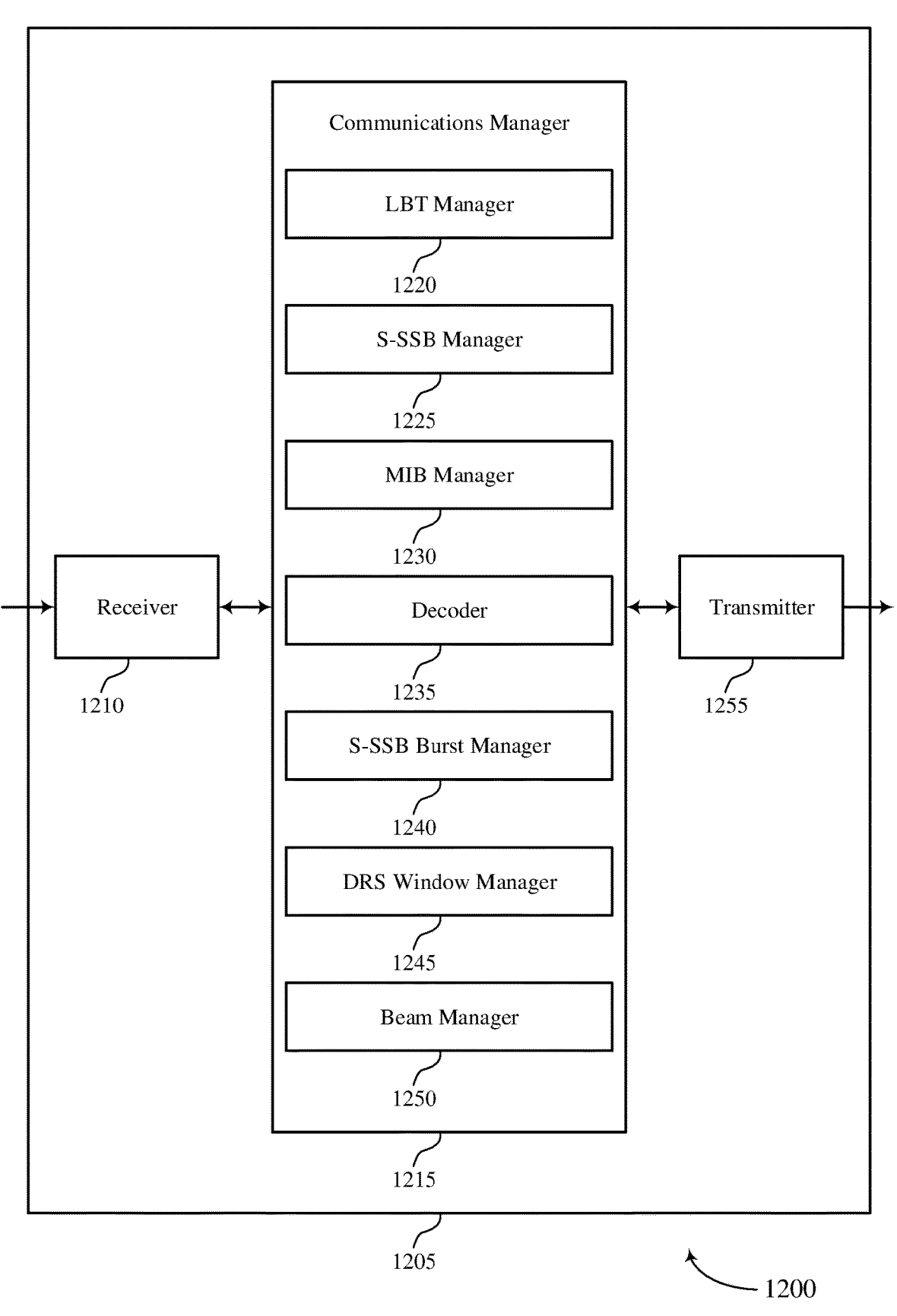

FIG. 12 shows a block diagram 1200 of a device 1205 that supports S-SSB transmissions in a shared spectrum in accordance with aspects of the present disclosure. The device 1205 may be an example of aspects of a device 1105, or a UE 115 as described herein. The device 1205 may include a receiver 1210, a communications manager 1215, and a transmitter 1255. The device 1205 may also include a processor. Each of these components may be in communication with one another (e.g., via one or more buses).

The receiver 1210 may receive information such as packets, user data, or control information associated with various information channels (e.g., control channels, data channels, and information related to S-SSB transmissions in a shared spectrum, etc.). Information may be passed on to other components of the device 1205. The receiver 1210 may be an example of aspects of the transceiver 1420 described with reference to FIG. 14. The receiver 1210 may utilize a single antenna or a set of antennas.

The communications manager 1215 may be an example of aspects of the communications manager 1115 as described herein. The communications manager 1215 may include a LBT manager 1220, a S-SSB manager 1225, a MIB manager 1230, a decoder 1235, a S-SSB burst manager 1240, a DRS window manager 1245, and a beam manager 1250. The communications manager 1215 may be an example of aspects of the communications manager 1410 described herein.

The LBT manager 1220 may perform a listen-before-talk procedure to gain access to a sidelink bandwidth part for sidelink communications in a shared spectrum. The S-SSB manager 1225 may identify a sidelink synchronization signal block to transmit in the sidelink bandwidth part and transmit the sidelink synchronization signal block in the sidelink bandwidth part such that a first starting resource block of the sidelink synchronization signal block is offset from a second starting resource block of the sidelink bandwidth part.

The S-SSB manager 1225 may identify a sidelink bandwidth part in a shared spectrum including a sidelink synchronization signal block. The MIB manager 1230 may receive a master information block indicating an offset between a first starting resource block of the sidelink synchronization signal block and a second starting resource block of the sidelink bandwidth part. The decoder 1235 may decode the sidelink synchronization signal bock in the sidelink bandwidth part based on receiving the master information block indicating the offset.

The LBT manager 1220 may perform a listen-before-talk procedure to gain access to a sidelink bandwidth part for sidelink communications in a shared spectrum. The S-SSB manager 1225 may identify a sidelink synchronization signal block to transmit in the sidelink bandwidth part and transmit the sidelink synchronization signal block in the sidelink bandwidth part such that the sidelink synchronization signal block and the sidelink bandwidth part share a same starting resource block.

The LBT manager 1220 may perform a listen-before-talk procedure to gain access to a sidelink bandwidth part in a shared spectrum for a sidelink synchronization signal block period. The S-SSB burst manager 1240 may identify a sidelink synchronization signal block burst to transmit in the sidelink synchronization signal block period, the sidelink synchronization signal block burst including two or more sidelink synchronization signal blocks. The S-SSB manager 1225 may transmit each of the two or more sidelink synchronization signal blocks of the sidelink synchronization signal block burst using a different beam, where the two or more sidelink synchronization signal blocks in the sidelink synchronization signal block burst are transmitted in contiguous time resources.

The S-SSB manager 1225 may identify a sidelink synchronization signal block period with a sidelink synchronization signal block burst including two or more sidelink synchronization signal blocks each transmitted using a different beam. The S-SSB burst manager 1240 may receive the sidelink synchronization signal block burst including the two or more sidelink synchronization signal blocks in contiguous time resources.

The LBT manager 1220 may perform a listen-before-talk procedure to gain access to a sidelink bandwidth part in a shared spectrum for a sidelink synchronization signal block period. The S-SSB burst manager 1240 may identify a set of sidelink synchronization signal block bursts to transmit in the sidelink synchronization signal block period, each sidelink synchronization signal block burst including two or more sidelink synchronization signal blocks. The S-SSB manager 1225 may transmit each of the two or more sidelink synchronization signal blocks in each sidelink synchronization signal block burst using a different beam in the sidelink synchronization signal block period.

The S-SSB manager 1225 may identify a sidelink synchronization signal block period with a set of sidelink synchronization signal block bursts, each sidelink synchronization signal block burst including two or more sidelink synchronization signal blocks, and each of the two or more sidelink synchronization signal blocks transmitted using a different beam. The S-SSB burst manager 1240 may receive the set of sidelink synchronization signal block bursts in the sidelink synchronization signal block period.

The DRS window manager 1245 may identify a discovery reference signal (DRS) window in a shared spectrum including a set of starting positions for transmitting one or more sidelink synchronization signal blocks. The LBT manager 1220 may perform a listen-before-talk procedure to gain access to the discovery reference signal window in the shared spectrum. The S-SSB manager 1225 may transmit the one or more sidelink synchronization signal blocks at a first starting position of the set of starting positions after gaining access to the discovery reference signal window in the shared spectrum.

The DRS window manager 1245 may identify a discovery reference signal (DRS) window in a shared spectrum in which to receive one or more sidelink synchronization signal blocks and determine that the discovery reference signal window includes a set of starting positions for receiving the one or more sidelink synchronization signal blocks. The S-SSB manager 1225 may monitor the set of starting positions for the one or more sidelink synchronization signal blocks in the discovery reference signal window.

The S-SSB manager 1225 may identify a first sidelink synchronization signal block to transmit in a first slot and a second sidelink synchronization signal block to transmit in a second slot in a sidelink bandwidth part of a shared spectrum, generate a PBCH repetition or cyclic prefix extension to fill a gap between the first sidelink synchronization signal block and the second sidelink synchronization signal block, and transmit the first sidelink synchronization signal block in the first slot and the second sidelink synchronization signal block in the second slot with the physical broadcast channel repetition or the cyclic prefix extension between the first and second sidelink synchronization signal blocks.

The LBT manager 1220 may perform a listen-before-talk procedure to gain access to a sidelink bandwidth part in a shared spectrum for a sidelink synchronization signal block period. The S-SSB manager 1225 may transmit one or more sidelink synchronization signal blocks using one or more beams in the sidelink synchronization signal block period, each of the one or more sidelink synchronization signal blocks transmitted using a different beam. The beam manager 1250 may receive, from a second UE, an indication of a preferred beam of the one or more beams for transmitting sidelink data to the second UE based on transmitting the one or more sidelink synchronization signal blocks.

The S-SSB manager 1225 may receive, from a second UE in a sidelink synchronization signal block period, one or more sidelink synchronization signal blocks transmitted using one or more beams, each of the one or more sidelink synchronization signal blocks transmitted using a different beam. The beam manager 1250 may select a preferred beam of the one or more beams for the second UE to use to transmit sidelink data to the first UE and transmit, to the second UE, an indication of the preferred beam based on the selecting.

The LBT manager 1220 may perform a listen-before-talk procedure to gain access to a sidelink bandwidth part in a shared spectrum for a sidelink synchronization signal block period. The S-SSB manager 1225 may determine whether to transmit a first quantity or a second quantity of sidelink synchronization signal blocks in the sidelink synchronization signal block period, the first quantity being greater than the second quantity and transmit the first quantity or the second quantity of sidelink synchronization signal blocks in the sidelink synchronization signal block period based on the determining.

The S-SSB manager 1225 may determine whether to receive a first quantity or a second quantity of sidelink synchronization signal blocks from a second UE in a sidelink synchronization signal block period, the first quantity being greater than the second quantity, identify the sidelink synchronization signal block period with the first quantity or the second quantity of sidelink synchronization signal blocks, and receive the first quantity or the second quantity of sidelink synchronization signal blocks in the sidelink synchronization signal block period based on the determining.

The transmitter 1255 may transmit signals generated by other components of the device 1205. In some examples, the transmitter 1255 may be collocated with a receiver 1210 in a transceiver module. For example, the transmitter 1255 may be an example of aspects of the transceiver 1420 described with reference to FIG. 14. The transmitter 1255 may utilize a single antenna or a set of antennas.

Figure 13:
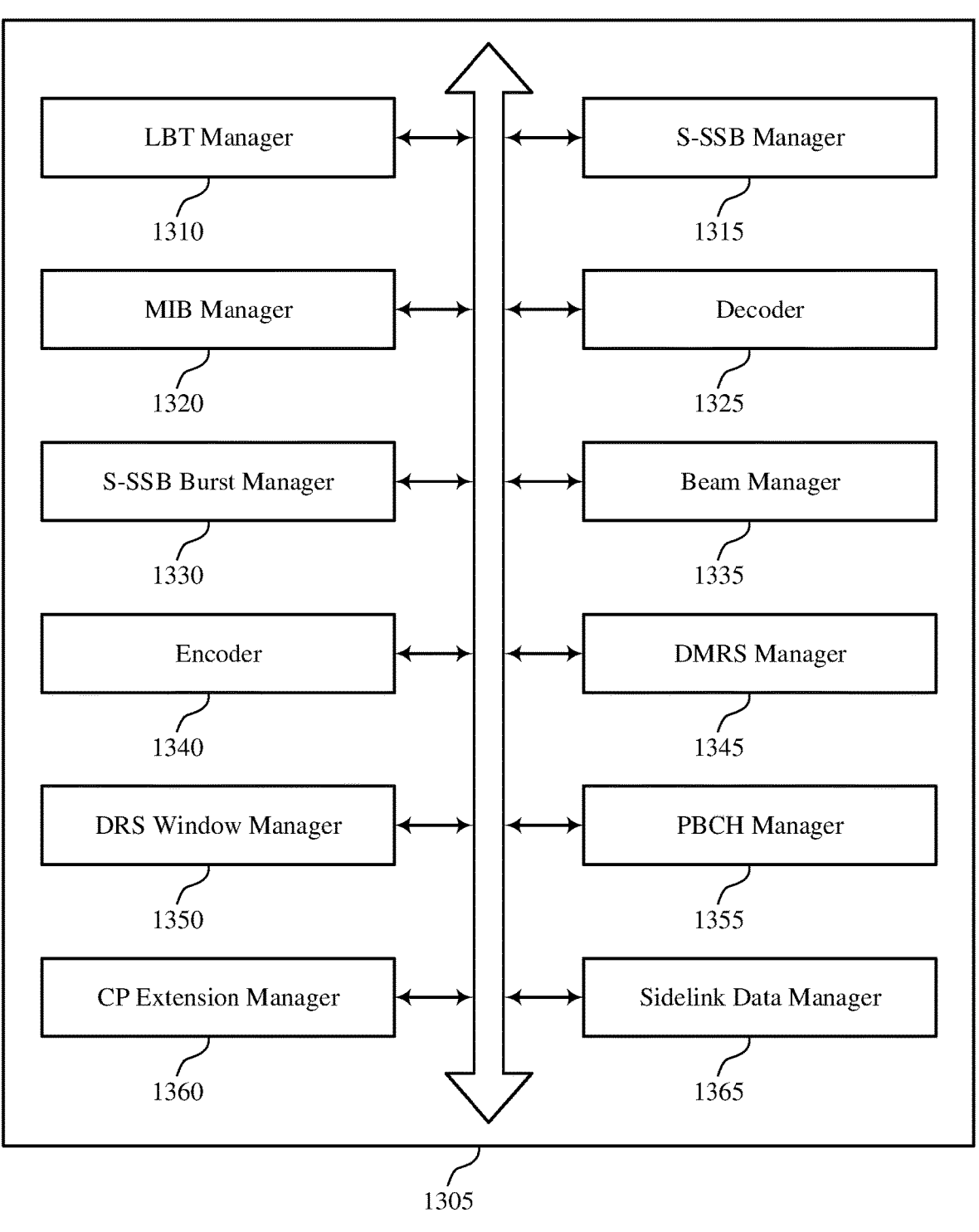
FIG. 13 shows a block diagram of a communications manager that supports S-SSB transmissions in a shared spectrum in accordance with aspects of the present disclosure.

FIG. 13 shows a block diagram 1300 of a communications manager 1305 that supports S-SSB transmissions in a shared spectrum in accordance with aspects of the present disclosure. The communications manager 1305 may be an example of aspects of a communications manager 1115, a communications manager 1215, or a communications manager 1410 described herein. The communications manager 1305 may include a LBT manager 1310, a S-SSB manager 1315, a MIB manager 1320, a decoder 1325, a S-SSB burst manager 1330, a beam manager 1335, an encoder 1340, a DMRS manager 1345, a DRS window manager 1350, a PBCH manager 1355, a CP extension manager 1360, and a sidelink data manager 1365. Each of these modules may communicate, directly or indirectly, with one another (e.g., via one or more buses).

The LBT manager 1310 may perform a listen-before-talk procedure to gain access to a sidelink bandwidth part for sidelink communications in a shared spectrum. In some examples, the LBT manager 1310 may perform a listen-before-talk procedure to gain access to a sidelink bandwidth part for sidelink communications in a shared spectrum. In some examples, the LBT manager 1310 may perform a listen-before-talk procedure to gain access to a sidelink bandwidth part in a shared spectrum for a sidelink synchronization signal block period. In some examples, the LBT manager 1310 may perform a listen-before-talk procedure to gain access to a sidelink bandwidth part in a shared spectrum for a sidelink synchronization signal block period. In some examples, the LBT manager 1310 may perform a listen-before-talk procedure to gain access to the discovery reference signal window in the shared spectrum. In some examples, the LBT manager 1310 may perform a listen-before-talk procedure to gain access to a sidelink bandwidth part in a shared spectrum for a sidelink synchronization signal block period. In some examples, the LBT manager 1310 may perform a listen-before-talk procedure to gain access to a sidelink bandwidth part in a shared spectrum for a sidelink synchronization signal block period.

The S-SSB manager 1315 may identify a sidelink synchronization signal block to transmit in the sidelink bandwidth part. In some examples, the S-SSB manager 1315 may transmit the sidelink synchronization signal block in the sidelink bandwidth part such that a first starting resource block of the sidelink synchronization signal block is offset from a second starting resource block of the sidelink bandwidth part. In some examples, the S-SSB manager 1315 may identify a sidelink bandwidth part in a shared spectrum including a sidelink synchronization signal block. In some examples, the S-SSB manager 1315 may identify a sidelink synchronization signal block to transmit in the sidelink bandwidth part. In some examples, the S-SSB manager 1315 may transmit the sidelink synchronization signal block in the sidelink bandwidth part such that the sidelink synchronization signal block and the sidelink bandwidth part share a same starting resource block. In some examples, the S-SSB manager 1315 may transmit each of the two or more sidelink synchronization signal blocks of the sidelink synchronization signal block burst using a different beam, where the two or more sidelink synchronization signal blocks in the sidelink synchronization signal block burst are transmitted in contiguous time resources.

In some examples, the S-SSB manager 1315 may identify a sidelink synchronization signal block period with a sidelink synchronization signal block burst including two or more sidelink synchronization signal blocks each transmitted using a different beam. In some examples, the S-SSB manager 1315 may transmit each of the two or more sidelink synchronization signal blocks in each sidelink synchronization signal block burst using a different beam in the sidelink synchronization signal block period. In some examples, the S-SSB manager 1315 may identify a sidelink synchronization signal block period with a set of sidelink synchronization signal block bursts, each sidelink synchronization signal block burst including two or more sidelink synchronization signal blocks, and each of the two or more sidelink synchronization signal blocks transmitted using a different beam. In some examples, the S-SSB manager 1315 may transmit the one or more sidelink synchronization signal blocks at a first starting position of the set of starting positions after gaining access to the discovery reference signal window in the shared spectrum.

In some examples, the S-SSB manager 1315 may monitor the set of starting positions for the one or more sidelink synchronization signal blocks in the discovery reference signal window. In some examples, the S-SSB manager 1315 may identify a first sidelink synchronization signal block to transmit in a first slot and a second sidelink synchronization signal block to transmit in a second slot in a sidelink bandwidth part of a shared spectrum. In some examples, the S-SSB manager 1315 may generate a PBCH repetition or cyclic prefix extension to fill a gap between the first sidelink synchronization signal block and the second sidelink synchronization signal block. In some examples, the S-SSB manager 1315 may transmit the first sidelink synchronization signal block in the first slot and the second sidelink synchronization signal block in the second slot with the physical broadcast channel repetition or the cyclic prefix extension between the first and second sidelink synchronization signal blocks.

In some examples, the S-SSB manager 1315 may transmit one or more sidelink synchronization signal blocks using one or more beams in the sidelink synchronization signal block period, each of the one or more sidelink synchronization signal blocks transmitted using a different beam. In some examples, the S-SSB manager 1315 may receive, from a second UE in a sidelink synchronization signal block period, one or more sidelink synchronization signal blocks transmitted using one or more beams, each of the one or more sidelink synchronization signal blocks transmitted using a different beam. In some examples, the S-SSB manager 1315 may determine whether to transmit a first quantity or a second quantity of sidelink synchronization signal blocks in the sidelink synchronization signal block period, the first quantity being greater than the second quantity. In some examples, the S-SSB manager 1315 may transmit the first quantity or the second quantity of sidelink synchronization signal blocks in the sidelink synchronization signal block period based on the determining.

In some examples, the S-SSB manager 1315 may determine whether to receive a first quantity or a second quantity of sidelink synchronization signal blocks from a second UE in a sidelink synchronization signal block period, the first quantity being greater than the second quantity. In some examples, the S-SSB manager 1315 may identify the sidelink synchronization signal block period with the first quantity or the second quantity of sidelink synchronization signal blocks. In some examples, the S-SSB manager 1315 may receive the first quantity or the second quantity of sidelink synchronization signal blocks in the sidelink synchronization signal block period based on the determining. In some examples, the S-SSB manager 1315 may transmit a sidelink synchronization signal block of the one or more sidelink synchronization signal blocks in a physical sidelink broadcast channel with an indication of a slot that includes the synchronization signal block. In some examples, the S-SSB manager 1315 may transmit a sidelink synchronization signal block of the one or more sidelink synchronization signal blocks in a physical sidelink broadcast channel with a demodulation reference signal scrambling sequence indicating a beam index of a beam used to transmit the synchronization signal block.

In some examples, the S-SSB manager 1315 may receive a sidelink synchronization signal block of the one or more sidelink synchronization signal blocks in a physical sidelink broadcast channel with an indication of a slot that includes the synchronization signal block. In some examples, the S-SSB manager 1315 may receive a sidelink synchronization signal block of the one or more sidelink synchronization signal blocks in a physical sidelink broadcast channel with a demodulation reference signal scrambling sequence indicating a beam index of a beam used to transmit the synchronization signal block. In some examples, the S-SSB manager 1315 may receive, from a second UE, an indication to transmit the first quantity of sidelink synchronization signal blocks in the sidelink synchronization signal block period. In some examples, the S-SSB manager 1315 may transmit the first quantity of sidelink synchronization signal blocks using one or more beams as part of a beam refinement procedure based on receiving the indication, each of the first quantity of sidelink synchronization signal blocks transmitted using a different beam.

In some examples, the S-SSB manager 1315 may transmit the first quantity of sidelink synchronization signal blocks after a preconfigured time period after receiving the indication to transmit the first quantity of sidelink synchronization signal blocks. In some examples, the S-SSB manager 1315 may determine to transmit the second quantity of sidelink synchronization signal blocks based on failing to receive an indication to transmit the first quantity of sidelink synchronization signal blocks in the sidelink synchronization signal block period. In some examples, the S-SSB manager 1315 may transmit the second quantity of sidelink synchronization signal blocks using a first set of beams. In some examples, the S-SSB manager 1315 may transmit the first quantity of sidelink synchronization signal blocks using a second set of beams associated with a beam refinement procedure for one or more of the first set of beams. In some examples, the S-SSB manager 1315 may transmit, to the second UE, an indication for the second UE to transmit the first quantity of sidelink synchronization signal blocks in the sidelink synchronization signal block period.

In some examples, the S-SSB manager 1315 may receive the first quantity of sidelink synchronization signal blocks transmitted using one or more beams as part of a beam refinement procedure based on transmitting the indication, each of the first quantity of sidelink synchronization signal blocks transmitted using a different beam. In some examples, the S-SSB manager 1315 may receive the first quantity of sidelink synchronization signal blocks after a preconfigured time period after transmitting the indication for the second UE to transmit the first quantity of sidelink synchronization signal blocks. In some examples, the S-SSB manager 1315 may receive the second quantity of sidelink synchronization signal blocks based on failing to transmit an indication for the second UE to transmit the first quantity of sidelink synchronization signal blocks in the sidelink synchronization signal block period. In some examples, the S-SSB manager 1315 may receive the second quantity of sidelink synchronization signal blocks transmitted using a first set of beams.

In some examples, the S-SSB manager 1315 may receive the first quantity of sidelink synchronization signal blocks transmitted using a second set of beams associated with a beam refinement procedure for one or more of the first set of beams. In some cases, the sidelink synchronization signal block and a downlink synchronization signal block in the shared spectrum share a same synchronization raster. In some cases, the second starting resource block of the sidelink bandwidth part includes an index of zero. In some cases, the sidelink synchronization signal block and a downlink synchronization signal block in the shared spectrum share a same synchronization raster. In some cases, an index of the second starting resource block of the sidelink bandwidth part is zero.

In some cases, a first synchronization raster of the sidelink synchronization signal block is different from a second synchronization raster of a downlink synchronization signal block in the shared spectrum. In some cases, an index of the same starting resource block of the sidelink synchronization signal block and the sidelink bandwidth part is zero. In some cases, a quantity of the two or more sidelink synchronization signal blocks corresponds to a subcarrier spacing of the sidelink bandwidth part. In some cases, a quantity of the two or more sidelink synchronization signal blocks in each sidelink synchronization signal block burst corresponds to a subcarrier spacing of the sidelink bandwidth part. In some cases, the indication to transmit the first quantity of sidelink synchronization signal blocks is received in a PRACH, sidelink control information, or a MAC-CE. In some cases, the indication to transmit the first quantity of sidelink synchronization signal blocks is transmitted in a PRACH, sidelink control information, or a MAC-CE.

The MIB manager 1320 may receive a master information block indicating an offset between a first starting resource block of the sidelink synchronization signal block and a second starting resource block of the sidelink bandwidth part. In some examples, the MIB manager 1320 may transmit, in a master information block, an indication of the offset between the first starting resource block of the sidelink synchronization signal block and the second starting resource block of the sidelink bandwidth part. The decoder 1325 may decode the sidelink synchronization signal bock in the sidelink bandwidth part based on receiving the master information block indicating the offset. In some examples, the decoder 1325 may blind decoding at least a portion of the demodulation reference signal scrambling sequence to identify a beam index of a beam used to transmit the sidelink synchronization signal block. In some examples, the decoder 1325 may blind decoding at least a portion of the demodulation reference signal scrambling sequence to identify a beam index of a beam used to transmit the sidelink synchronization signal block.

The S-SSB burst manager 1330 may identify a sidelink synchronization signal block burst to transmit in the sidelink synchronization signal block period, the sidelink synchronization signal block burst including two or more sidelink synchronization signal blocks. In some examples, the S-SSB burst manager 1330 may receive the sidelink synchronization signal block burst including the two or more sidelink synchronization signal blocks in contiguous time resources. In some examples, the S-SSB burst manager 1330 may identify a set of sidelink synchronization signal block bursts to transmit in the sidelink synchronization signal block period, each sidelink synchronization signal block burst including two or more sidelink synchronization signal blocks. In some examples, the S-SSB burst manager 1330 may receive the set of sidelink synchronization signal block bursts in the sidelink synchronization signal block period.

In some examples, the S-SSB burst manager 1330 may select a sidelink time interval for each of the set of sidelink synchronization signal block bursts such that the set of sidelink synchronization signal block bursts are non-overlapping in the sidelink synchronization signal block period, where the sidelink time interval corresponds to a time interval between each of the two or more sidelink synchronization signal blocks in each sidelink synchronization signal block burst. The beam manager 1335 may receive, from a second UE, an indication of a preferred beam of the one or more beams for transmitting sidelink data to the second UE based on transmitting the one or more sidelink synchronization signal blocks. In some examples, the beam manager 1335 may select a preferred beam of the one or more beams for the second UE to use to transmit sidelink data to the first UE.

In some examples, the beam manager 1335 may transmit, to the second UE, an indication of the preferred beam based on the selecting. In some examples, the beam manager 1335 may identify a beam for transmitting a sidelink synchronization signal block of the two or more sidelink synchronization signal blocks. In some examples, the beam manager 1335 may identify a beam for transmitting a sidelink synchronization signal block in a sidelink synchronization signal block burst of the set of sidelink synchronization signal block bursts. In some examples, the beam manager 1335 may receive signaling on a PFSCH resource or a PRACH resource corresponding to a sidelink synchronization signal block transmitted using the preferred beam. In some examples, the beam manager 1335 may transmit signaling on a PFSCH resource or a PRACH resource corresponding to a sidelink synchronization signal block transmitted by the second UE using the preferred beam. In some cases, the indication of the preferred beam is received in a PSSCH. In some cases, the indication of the preferred beam is received in a PSSCH.

The DRS window manager 1350 may identify a DRS window in a shared spectrum including a set of starting positions for transmitting one or more sidelink synchronization signal blocks. In some examples, the DRS window manager 1350 may identify a DRS window in a shared spectrum in which to receive one or more sidelink synchronization signal blocks. In some examples, determining that the discovery reference signal window includes a set of starting positions for receiving the one or more sidelink synchronization signal blocks. The encoder 1340 may encode at least a portion of a demodulation reference signal scrambling sequence included with the sidelink synchronization signal block based on a beam index of the identified beam. In some examples, the encoder 1340 may set an initialization seed for the encoding as a function of the beam index of the identified beam. In some examples, the encoder 1340 may encode at least a portion of a demodulation reference signal scrambling sequence included with the sidelink synchronization signal block based on a beam index of the identified beam. In some examples, the encoder 1340 may set an initialization seed for the encoding as a function of the beam index of the identified beam.

The DMRS manager 1345 may receive a demodulation reference signal scrambling sequence with a sidelink synchronization signal block of the two or more sidelink synchronization signal blocks. In some examples, the DMRS manager 1345 may receive a demodulation reference signal scrambling sequence with a sidelink synchronization signal block in a sidelink synchronization signal block burst of the set of sidelink synchronization signal block bursts. The PBCH manager 1355 may generate the physical broadcast channel repetition by repeating a physical broadcast channel in a last symbol of the first sidelink synchronization signal block. The CP extension manager 1360 may generate the cyclic prefix extension based on a physical broadcast channel in a first symbol of the second sidelink synchronization signal block. The sidelink data manager 1365 may transmit sidelink data to the second UE using the preferred beam. In some examples, the sidelink data manager 1365 may receive sidelink data from the second UE using the preferred beam.

Figure 14:
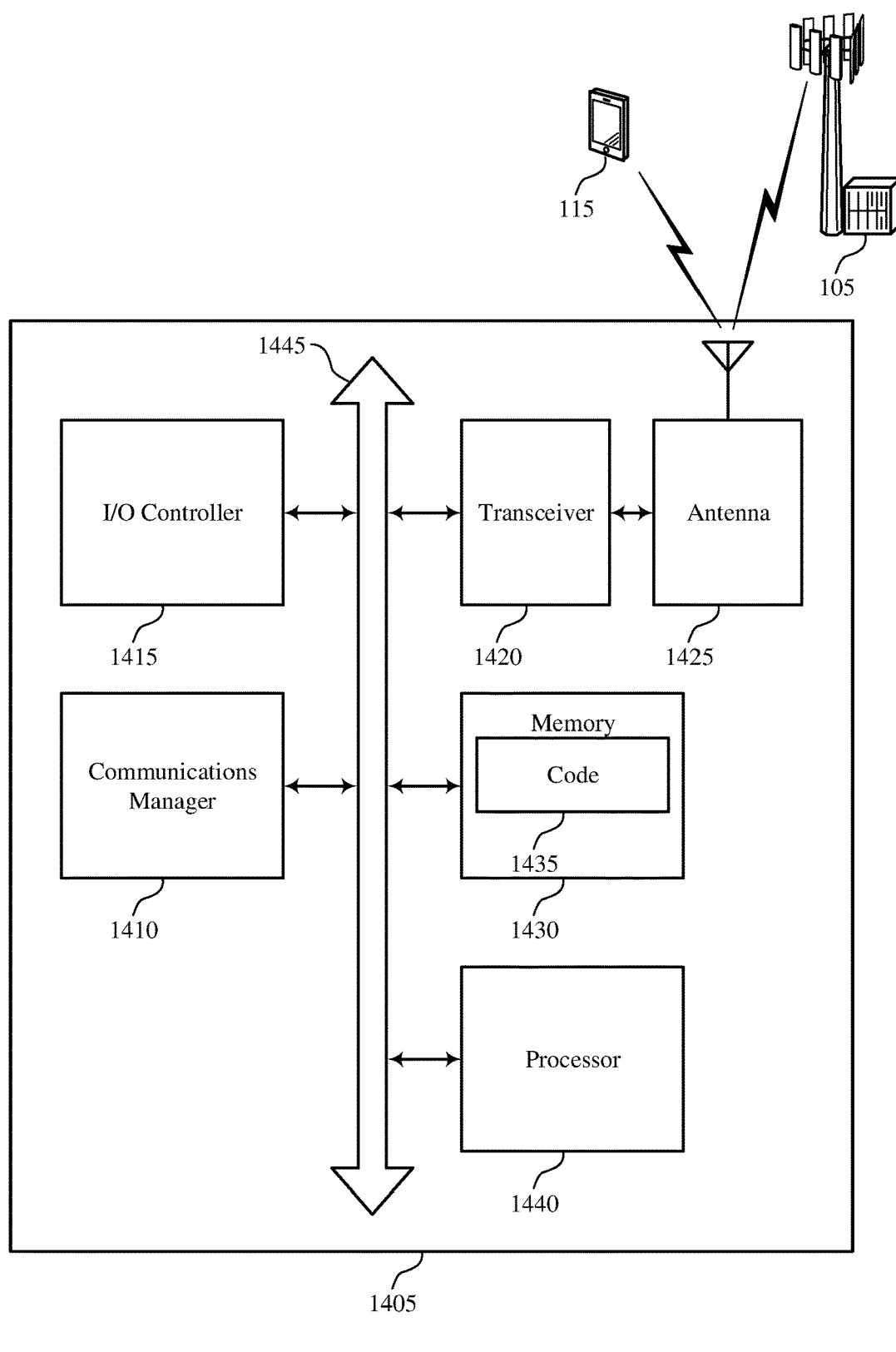
FIG. 14 shows a diagram of a system including a device that supports S-SSB transmissions in a shared spectrum in accordance with aspects of the present disclosure.

FIG. 14 shows a diagram of a system 1400 including a device 1405 that supports S-SSB transmissions in a shared spectrum in accordance with aspects of the present disclosure. The device 1405 may be an example of or include the components of device 1105, device 1205, or a UE 115 as described herein. The device 1405 may include components for bi-directional voice and data communications including components for transmitting and receiving communications, including a communications manager 1410, an I/O controller 1415, a transceiver 1420, an antenna 1425, memory 1430, and a processor 1440. These components may be in electronic communication via one or more buses (e.g., bus 1445).

The communications manager 1410 may perform a listen-before-talk procedure to gain access to a sidelink bandwidth part for sidelink communications in a shared spectrum, identify a sidelink synchronization signal block to transmit in the sidelink bandwidth part, and transmit the sidelink synchronization signal block in the sidelink bandwidth part such that a first starting resource block of the sidelink synchronization signal block is offset from a second starting resource block of the sidelink bandwidth part.

The communications manager 1410 may also identify a sidelink bandwidth part in a shared spectrum including a sidelink synchronization signal block, receive a master information block indicating an offset between a first starting resource block of the sidelink synchronization signal block and a second starting resource block of the sidelink bandwidth part, and decode the sidelink synchronization signal bock in the sidelink bandwidth part based on receiving the master information block indicating the offset.

The communications manager 1410 may also perform a listen-before-talk procedure to gain access to a sidelink bandwidth part for sidelink communications in a shared spectrum, identify a sidelink synchronization signal block to transmit in the sidelink bandwidth part, and transmit the sidelink synchronization signal block in the sidelink bandwidth part such that the sidelink synchronization signal block and the sidelink bandwidth part share a same starting resource block.

The communications manager 1410 may also perform a listen-before-talk procedure to gain access to a sidelink bandwidth part in a shared spectrum for a sidelink synchronization signal block period, identify a sidelink synchronization signal block burst to transmit in the sidelink synchronization signal block period, the sidelink synchronization signal block burst including two or more sidelink synchronization signal blocks, and transmit each of the two or more sidelink synchronization signal blocks of the sidelink synchronization signal block burst using a different beam, where the two or more sidelink synchronization signal blocks in the sidelink synchronization signal block burst are transmitted in contiguous time resources.

The communications manager 1410 may also identify a sidelink synchronization signal block period with a sidelink synchronization signal block burst including two or more sidelink synchronization signal blocks each transmitted using a different beam and receive the sidelink synchronization signal block burst including the two or more sidelink synchronization signal blocks in contiguous time resources.

The communications manager 1410 may also perform a listen-before-talk procedure to gain access to a sidelink bandwidth part in a shared spectrum for a sidelink synchronization signal block period, identify a set of sidelink synchronization signal block bursts to transmit in the sidelink synchronization signal block period, each sidelink synchronization signal block burst including two or more sidelink synchronization signal blocks, and transmit each of the two or more sidelink synchronization signal blocks in each sidelink synchronization signal block burst using a different beam in the sidelink synchronization signal block period.

The communications manager 1410 may also identify a sidelink synchronization signal block period with a set of sidelink synchronization signal block bursts, each sidelink synchronization signal block burst including two or more sidelink synchronization signal blocks, and each of the two or more sidelink synchronization signal blocks transmitted using a different beam and receive the set of sidelink synchronization signal block bursts in the sidelink synchronization signal block period.

The communications manager 1410 may also identify a DRS window in a shared spectrum including a set of starting positions for transmitting one or more sidelink synchronization signal blocks, perform a listen-before-talk procedure to gain access to the discovery reference signal window in the shared spectrum, and transmit the one or more sidelink synchronization signal blocks at a first starting position of the set of starting positions after gaining access to the discovery reference signal window in the shared spectrum.

The communications manager 1410 may also identify a DRS window in a shared spectrum in which to receive one or more sidelink synchronization signal blocks, determine that the discovery reference signal window includes a set of starting positions for receiving the one or more sidelink synchronization signal blocks, and monitor the set of starting positions for the one or more sidelink synchronization signal blocks in the discovery reference signal window.

The communications manager 1410 may also identify a first sidelink synchronization signal block to transmit in a first slot and a second sidelink synchronization signal block to transmit in a second slot in a sidelink bandwidth part of a shared spectrum, generate a PBCH repetition or cyclic prefix extension to fill a gap between the first sidelink synchronization signal block and the second sidelink synchronization signal block, and transmit the first sidelink synchronization signal block in the first slot and the second sidelink synchronization signal block in the second slot with the physical broadcast channel repetition or the cyclic prefix extension between the first and second sidelink synchronization signal blocks.

The communications manager 1410 may also perform a listen-before-talk procedure to gain access to a sidelink bandwidth part in a shared spectrum for a sidelink synchronization signal block period, transmit one or more sidelink synchronization signal blocks using one or more beams in the sidelink synchronization signal block period, each of the one or more sidelink synchronization signal blocks transmitted using a different beam, and receive, from a second UE, an indication of a preferred beam of the one or more beams for transmitting sidelink data to the second UE based on transmitting the one or more sidelink synchronization signal blocks.

The communications manager 1410 may also receive, from a second UE in a sidelink synchronization signal block period, one or more sidelink synchronization signal blocks transmitted using one or more beams, each of the one or more sidelink synchronization signal blocks transmitted using a different beam, select a preferred beam of the one or more beams for the second UE to use to transmit sidelink data to the first UE, and transmit, to the second UE, an indication of the preferred beam based on the selecting.

The communications manager 1410 may also perform a listen-before-talk procedure to gain access to a sidelink bandwidth part in a shared spectrum for a sidelink synchronization signal block period, determine whether to transmit a first quantity or a second quantity of sidelink synchronization signal blocks in the sidelink synchronization signal block period, the first quantity being greater than the second quantity, and transmit the first quantity or the second quantity of sidelink synchronization signal blocks in the sidelink synchronization signal block period based on the determining.

The communications manager 1410 may also determine whether to receive a first quantity or a second quantity of sidelink synchronization signal blocks from a second UE in a sidelink synchronization signal block period, the first quantity being greater than the second quantity, identify the sidelink synchronization signal block period with the first quantity or the second quantity of sidelink synchronization signal blocks, and receive the first quantity or the second quantity of sidelink synchronization signal blocks in the sidelink synchronization signal block period based on the determining.

The I/O controller 1415 may manage input and output signals for the device 1405. The I/O controller 1415 may also manage peripherals not integrated into the device 1405. In some cases, the I/O controller 1415 may represent a physical connection or port to an external peripheral. In some cases, the I/O controller 1415 may utilize an operating system such as iOS®, ANDROID®, MS-DOS®, MS-WINDOWS®, OS/2®, UNIX®, LINUX®, or another known operating system. In other cases, the I/O controller 1415 may represent or interact with a modem, a keyboard, a mouse, a touchscreen, or a similar device. In some cases, the I/O controller 1415 may be implemented as part of a processor. In some cases, a user may interact with the device 1405 via the I/O controller 1415 or via hardware components controlled by the I/O controller 1415.

The transceiver 1420 may communicate bi-directionally, via one or more antennas, wired, or wireless links as described above. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include RAM and ROM. The memory 1430 may store computer-readable, computer-executable code 1435 including instructions that, when executed, cause the processor to perform various functions described herein. In some cases, the memory 1430 may contain, among other things, a BIOS which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting S-SSB transmissions in a shared spectrum).

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

FIG. 15 shows a flowchart illustrating a method 1500 that supports S-SSB transmissions in a shared spectrum in accordance with aspects of the present disclosure. The operations of method 1500 may be implemented by a UE 115 or its components as described herein. For example, the operations of method 1500 may be performed by a communications manager as described with reference to FIGS. 11 through 14. In some examples, a UE may execute a set of instructions to control the functional elements of the UE to perform the functions described below. Additionally, or alternatively, a UE may perform aspects of the functions described below using special-purpose hardware.

At 1505, the UE may perform a listen-before-talk procedure to gain access to a sidelink bandwidth part for sidelink communications in a shared spectrum. The operations of 1505 may be performed according to the methods described herein. In some examples, aspects of the operations of 1505 may be performed by a LBT manager as described with reference to FIGS. 11 through 14.

At 1510, the UE may identify a sidelink synchronization signal block to transmit in the sidelink bandwidth part. The operations of 1510 may be performed according to the methods described herein. In some examples, aspects of the operations of 1510 may be performed by a S-SSB manager as described with reference to FIGS. 11 through 14.

At 1515, the UE may transmit the sidelink synchronization signal block in the sidelink bandwidth part such that a first starting resource block of the sidelink synchronization signal block is offset from a second starting resource block of the sidelink bandwidth part. The operations of 1515 may be performed according to the methods described herein. In some examples, aspects of the operations of 1515 may be performed by a S-SSB manager as described with reference to FIGS. 11 through 14.

FIG. 16 shows a flowchart illustrating a method 1600 that supports S-SSB transmissions in a shared spectrum in accordance with aspects of the present disclosure. The operations of method 1600 may be implemented by a UE 115 or its components as described herein. For example, the operations of method 1600 may be performed by a communications manager as described with reference to FIGS. 11 through 14. In some examples, a UE may execute a set of instructions to control the functional elements of the UE to perform the functions described below. Additionally, or alternatively, a UE may perform aspects of the functions described below using special-purpose hardware.

At 1605, the UE may identify a sidelink bandwidth part in a shared spectrum including a sidelink synchronization signal block. The operations of 1605 may be performed according to the methods described herein. In some examples, aspects of the operations of 1605 may be performed by a S-SSB manager as described with reference to FIGS. 11 through 14.

At 1610, the UE may receive a master information block indicating an offset between a first starting resource block of the sidelink synchronization signal block and a second starting resource block of the sidelink bandwidth part. The operations of 1610 may be performed according to the methods described herein. In some examples, aspects of the operations of 1610 may be performed by a MIB manager as described with reference to FIGS. 11 through 14.

At 1615, the UE may decode the sidelink synchronization signal bock in the sidelink bandwidth part based on receiving the master information block indicating the offset. The operations of 1615 may be performed according to the methods described herein. In some examples, aspects of the operations of 1615 may be performed by a decoder as described with reference to FIGS. 11 through 14.

FIG. 17 shows a flowchart illustrating a method 1700 that supports S-SSB transmissions in a shared spectrum in accordance with aspects of the present disclosure. The operations of method 1700 may be implemented by a UE 115 or its components as described herein. For example, the operations of method 1700 may be performed by a communications manager as described with reference to FIGS. 11 through 14. In some examples, a UE may execute a set of instructions to control the functional elements of the UE to perform the functions described below. Additionally, or alternatively, a UE may perform aspects of the functions described below using special-purpose hardware.

At 1705, the UE may perform a listen-before-talk procedure to gain access to a sidelink bandwidth part for sidelink communications in a shared spectrum. The operations of 1705 may be performed according to the methods described herein. In some examples, aspects of the operations of 1705 may be performed by a LBT manager as described with reference to FIGS. 11 through 14.

At 1710, the UE may identify a sidelink synchronization signal block to transmit in the sidelink bandwidth part. The operations of 1710 may be performed according to the methods described herein. In some examples, aspects of the operations of 1710 may be performed by a S-SSB manager as described with reference to FIGS. 11 through 14.

At 1715, the UE may transmit the sidelink synchronization signal block in the sidelink bandwidth part such that the sidelink synchronization signal block and the sidelink bandwidth part share a same starting resource block. The operations of 1715 may be performed according to the methods described herein. In some examples, aspects of the operations of 1715 may be performed by a S-SSB manager as described with reference to FIGS. 11 through 14.

FIG. 18 shows a flowchart illustrating a method 1800 that supports S-SSB transmissions in a shared spectrum in accordance with aspects of the present disclosure. The operations of method 1800 may be implemented by a UE 115 or its components as described herein. For example, the operations of method 1800 may be performed by a communications manager as described with reference to FIGS. 11 through 14. In some examples, a UE may execute a set of instructions to control the functional elements of the UE to perform the functions described below. Additionally, or alternatively, a UE may perform aspects of the functions described below using special-purpose hardware.

At 1805, the UE may perform a listen-before-talk procedure to gain access to a sidelink bandwidth part in a shared spectrum for a sidelink synchronization signal block period. The operations of 1805 may be performed according to the methods described herein. In some examples, aspects of the operations of 1805 may be performed by a LBT manager as described with reference to FIGS. 11 through 14.

At 1810, the UE may identify a sidelink synchronization signal block burst to transmit in the sidelink synchronization signal block period, the sidelink synchronization signal block burst including two or more sidelink synchronization signal blocks. The operations of 1810 may be performed according to the methods described herein. In some examples, aspects of the operations of 1810 may be performed by a S-SSB burst manager as described with reference to FIGS. 11 through 14.

At 1815, the UE may transmit each of the two or more sidelink synchronization signal blocks of the sidelink synchronization signal block burst using a different beam, where the two or more sidelink synchronization signal blocks in the sidelink synchronization signal block burst are transmitted in contiguous time resources. The operations of 1815 may be performed according to the methods described herein. In some examples, aspects of the operations of 1815 may be performed by a S-SSB manager as described with reference to FIGS. 11 through 14.

FIG. 19 shows a flowchart illustrating a method 1900 that supports S-SSB transmissions in a shared spectrum in accordance with aspects of the present disclosure. The operations of method 1900 may be implemented by a UE 115 or its components as described herein. For example, the operations of method 1900 may be performed by a communications manager as described with reference to FIGS. 11 through 14. In some examples, a UE may execute a set of instructions to control the functional elements of the UE to perform the functions described below. Additionally, or alternatively, a UE may perform aspects of the functions described below using special-purpose hardware.

At 1905, the UE may identify a sidelink synchronization signal block period with a sidelink synchronization signal block burst including two or more sidelink synchronization signal blocks each transmitted using a different beam. The operations of 1905 may be performed according to the methods described herein. In some examples, aspects of the operations of 1905 may be performed by a S-SSB manager as described with reference to FIGS. 11 through 14.

At 1910, the UE may receive the sidelink synchronization signal block burst including the two or more sidelink synchronization signal blocks in contiguous time resources. The operations of 1910 may be performed according to the methods described herein. In some examples, aspects of the operations of 1910 may be performed by a S-SSB burst manager as described with reference to FIGS. 11 through 14.

FIG. 20 shows a flowchart illustrating a method 2000 that supports S-SSB transmissions in a shared spectrum in accordance with aspects of the present disclosure. The operations of method 2000 may be implemented by a UE 115 or its components as described herein. For example, the operations of method 2000 may be performed by a communications manager as described with reference to FIGS. 11 through 14. In some examples, a UE may execute a set of instructions to control the functional elements of the UE to perform the functions described below. Additionally, or alternatively, a UE may perform aspects of the functions described below using special-purpose hardware.

At 2005, the UE may perform a listen-before-talk procedure to gain access to a sidelink bandwidth part in a shared spectrum for a sidelink synchronization signal block period. The operations of 2005 may be performed according to the methods described herein. In some examples, aspects of the operations of 2005 may be performed by a LBT manager as described with reference to FIGS. 11 through 14.

At 2010, the UE may identify a set of sidelink synchronization signal block bursts to transmit in the sidelink synchronization signal block period, each sidelink synchronization signal block burst including two or more sidelink synchronization signal blocks. The operations of 2010 may be performed according to the methods described herein. In some examples, aspects of the operations of 2010 may be performed by a S-SSB burst manager as described with reference to FIGS. 11 through 14.

At 2015, the UE may transmit each of the two or more sidelink synchronization signal blocks in each sidelink synchronization signal block burst using a different beam in the sidelink synchronization signal block period. The operations of 2015 may be performed according to the methods described herein. In some examples, aspects of the operations of 2015 may be performed by a S-SSB manager as described with reference to FIGS. 11 through 14.

FIG. 21 shows a flowchart illustrating a method 2100 that supports S-SSB transmissions in a shared spectrum in accordance with aspects of the present disclosure. The operations of method 2100 may be implemented by a UE 115 or its components as described herein. For example, the operations of method 2100 may be performed by a communications manager as described with reference to FIGS. 11 through 14. In some examples, a UE may execute a set of instructions to control the functional elements of the UE to perform the functions described below. Additionally, or alternatively, a UE may perform aspects of the functions described below using special-purpose hardware.

At 2105, the UE may identify a sidelink synchronization signal block period with a set of sidelink synchronization signal block bursts, each sidelink synchronization signal block burst including two or more sidelink synchronization signal blocks, and each of the two or more sidelink synchronization signal blocks transmitted using a different beam. The operations of 2105 may be performed according to the methods described herein. In some examples, aspects of the operations of 2105 may be performed by a S-SSB manager as described with reference to FIGS. 11 through 14.

At 2110, the UE may receive the set of sidelink synchronization signal block bursts in the sidelink synchronization signal block period. The operations of 2110 may be performed according to the methods described herein. In some examples, aspects of the operations of 2110 may be performed by a S-SSB burst manager as described with reference to FIGS. 11 through 14.

FIG. 22 shows a flowchart illustrating a method 2200 that supports S-SSB transmissions in a shared spectrum in accordance with aspects of the present disclosure. The operations of method 2200 may be implemented by a UE 115 or its components as described herein. For example, the operations of method 2200 may be performed by a communications manager as described with reference to FIGS. 11 through 14. In some examples, a UE may execute a set of instructions to control the functional elements of the UE to perform the functions described below. Additionally, or alternatively, a UE may perform aspects of the functions described below using special-purpose hardware.

At 2205, the UE may identify a discovery reference signal (DRS) window in a shared spectrum including a set of starting positions for transmitting one or more sidelink synchronization signal blocks. The operations of 2205 may be performed according to the methods described herein. In some examples, aspects of the operations of 2205 may be performed by a DRS window manager as described with reference to FIGS. 11 through 14.

At 2210, the UE may perform a listen-before-talk procedure to gain access to the discovery reference signal window in the shared spectrum. The operations of 2210 may be performed according to the methods described herein. In some examples, aspects of the operations of 2210 may be performed by an LBT manager as described with reference to FIGS. 11 through 14.

At 2215, the UE may transmit the one or more sidelink synchronization signal blocks at a first starting position of the set of starting positions after gaining access to the discovery reference signal window in the shared spectrum. The operations of 2215 may be performed according to the methods described herein. In some examples, aspects of the operations of 2215 may be performed by a S-SSB manager as described with reference to FIGS. 11 through 14.

FIG. 23 shows a flowchart illustrating a method 2300 that supports S-SSB transmissions in a shared spectrum in accordance with aspects of the present disclosure. The operations of method 2300 may be implemented by a UE 115 or its components as described herein. For example, the operations of method 2300 may be performed by a communications manager as described with reference to FIGS. 11 through 14. In some examples, a UE may execute a set of instructions to control the functional elements of the UE to perform the functions described below. Additionally, or alternatively, a UE may perform aspects of the functions described below using special-purpose hardware.

At 2305, the UE may identify a discovery reference signal (DRS) window in a shared spectrum in which to receive one or more sidelink synchronization signal blocks. The operations of 2305 may be performed according to the methods described herein. In some examples, aspects of the operations of 2305 may be performed by a DRS window manager as described with reference to FIGS. 11 through 14.

At 2310, the UE may determine that the discovery reference signal window includes a set of starting positions for receiving the one or more sidelink synchronization signal blocks. The operations of 2310 may be performed according to the methods described herein. In some examples, aspects of the operations of 2310 may be performed by a DRS window manager as described with reference to FIGS. 11 through 14.

At 2315, the UE may monitor the set of starting positions for the one or more sidelink synchronization signal blocks in the discovery reference signal window. The operations of 2315 may be performed according to the methods described herein. In some examples, aspects of the operations of 2315 may be performed by a S-SSB manager as described with reference to FIGS. 11 through 14.

FIG. 24 shows a flowchart illustrating a method 2400 that supports S-SSB transmissions in a shared spectrum in accordance with aspects of the present disclosure. The operations of method 2400 may be implemented by a UE 115 or its components as described herein. For example, the operations of method 2400 may be performed by a communications manager as described with reference to FIGS. 11 through 14. In some examples, a UE may execute a set of instructions to control the functional elements of the UE to perform the functions described below. Additionally, or alternatively, a UE may perform aspects of the functions described below using special-purpose hardware.

At 2405, the UE may identify a first sidelink synchronization signal block to transmit in a first slot and a second sidelink synchronization signal block to transmit in a second slot in a sidelink bandwidth part of a shared spectrum. The operations of 2405 may be performed according to the methods described herein. In some examples, aspects of the operations of 2405 may be performed by a S-SSB manager as described with reference to FIGS. 11 through 14.

At 2410, the UE may generate a physical broadcast channel (PBCH) repetition or cyclic prefix extension to fill a gap between the first sidelink synchronization signal block and the second sidelink synchronization signal block. The operations of 2410 may be performed according to the methods described herein. In some examples, aspects of the operations of 2410 may be performed by a S-SSB manager as described with reference to FIGS. 11 through 14.

At 2415, the UE may transmit the first sidelink synchronization signal block in the first slot and the second sidelink synchronization signal block in the second slot with the physical broadcast channel repetition or the cyclic prefix extension between the first and second sidelink synchronization signal blocks. The operations of 2415 may be performed according to the methods described herein. In some examples, aspects of the operations of 2415 may be performed by a S-SSB manager as described with reference to FIGS. 11 through 14.

FIG. 25 shows a flowchart illustrating a method 2500 that supports S-SSB transmissions in a shared spectrum in accordance with aspects of the present disclosure. The operations of method 2500 may be implemented by a UE 115 or its components as described herein. For example, the operations of method 2500 may be performed by a communications manager as described with reference to FIGS. 11 through 14. In some examples, a UE may execute a set of instructions to control the functional elements of the UE to perform the functions described below. Additionally, or alternatively, a UE may perform aspects of the functions described below using special-purpose hardware.

At 2505, the UE may perform a listen-before-talk procedure to gain access to a sidelink bandwidth part in a shared spectrum for a sidelink synchronization signal block period. The operations of 2505 may be performed according to the methods described herein. In some examples, aspects of the operations of 2505 may be performed by a LBT manager as described with reference to FIGS. 11 through 14.

At 2510, the UE may transmit one or more sidelink synchronization signal blocks using one or more beams in the sidelink synchronization signal block period, each of the one or more sidelink synchronization signal blocks transmitted using a different beam. The operations of 2510 may be performed according to the methods described herein. In some examples, aspects of the operations of 2510 may be performed by a S-SSB manager as described with reference to FIGS. 11 through 14.

At 2515, the UE may receive, from a second UE, an indication of a preferred beam of the one or more beams for transmitting sidelink data to the second UE based on transmitting the one or more sidelink synchronization signal blocks. The operations of 2515 may be performed according to the methods described herein. In some examples, aspects of the operations of 2515 may be performed by a beam manager as described with reference to FIGS. 11 through 14.

FIG. 26 shows a flowchart illustrating a method 2600 that supports S-SSB transmissions in a shared spectrum in accordance with aspects of the present disclosure. The operations of method 2600 may be implemented by a UE 115 or its components as described herein. For example, the operations of method 2600 may be performed by a communications manager as described with reference to FIGS. 11 through 14. In some examples, a UE may execute a set of instructions to control the functional elements of the UE to perform the functions described below. Additionally, or alternatively, a UE may perform aspects of the functions described below using special-purpose hardware.

At 2605, the UE may receive, from a second UE in a sidelink synchronization signal block period, one or more sidelink synchronization signal blocks transmitted using one or more beams, each of the one or more sidelink synchronization signal blocks transmitted using a different beam. The operations of 2605 may be performed according to the methods described herein. In some examples, aspects of the operations of 2605 may be performed by a S-SSB manager as described with reference to FIGS. 11 through 14.

At 2610, the UE may select a preferred beam of the one or more beams for the second UE to use to transmit sidelink data to the first UE. The operations of 2610 may be performed according to the methods described herein. In some examples, aspects of the operations of 2610 may be performed by a beam manager as described with reference to FIGS. 11 through 14.

At 2615, the UE may transmit, to the second UE, an indication of the preferred beam based on the selecting. The operations of 2615 may be performed according to the methods described herein. In some examples, aspects of the operations of 2615 may be performed by a beam manager as described with reference to FIGS. 11 through 14.

FIG. 27 shows a flowchart illustrating a method 2700 that supports S-SSB transmissions in a shared spectrum in accordance with aspects of the present disclosure. The operations of method 2700 may be implemented by a UE 115 or its components as described herein. For example, the operations of method 2700 may be performed by a communications manager as described with reference to FIGS. 11 through 14. In some examples, a UE may execute a set of instructions to control the functional elements of the UE to perform the functions described below. Additionally, or alternatively, a UE may perform aspects of the functions described below using special-purpose hardware.

At 2705, the UE may perform a listen-before-talk procedure to gain access to a sidelink bandwidth part in a shared spectrum for a sidelink synchronization signal block period. The operations of 2705 may be performed according to the methods described herein. In some examples, aspects of the operations of 2705 may be performed by a LBT manager as described with reference to FIGS. 11 through 14.

At 2710, the UE may determine whether to transmit a first quantity or a second quantity of sidelink synchronization signal blocks in the sidelink synchronization signal block period, the first quantity being greater than the second quantity. The operations of 2710 may be performed according to the methods described herein. In some examples, aspects of the operations of 2710 may be performed by a S-SSB manager as described with reference to FIGS. 11 through 14.

At 2715, the UE may transmit the first quantity or the second quantity of sidelink synchronization signal blocks in the sidelink synchronization signal block period based on the determining. The operations of 2715 may be performed according to the methods described herein. In some examples, aspects of the operations of 2715 may be performed by a S-SSB manager as described with reference to FIGS. 11 through 14.

FIG. 28 shows a flowchart illustrating a method 2800 that supports S-SSB transmissions in a shared spectrum in accordance with aspects of the present disclosure. The operations of method 2800 may be implemented by a UE 115 or its components as described herein. For example, the operations of method 2800 may be performed by a communications manager as described with reference to FIGS. 11 through 14. In some examples, a UE may execute a set of instructions to control the functional elements of the UE to perform the functions described below. Additionally, or alternatively, a UE may perform aspects of the functions described below using special-purpose hardware.

At 2805, the UE may determine whether to receive a first quantity or a second quantity of sidelink synchronization signal blocks from a second UE in a sidelink synchronization signal block period, the first quantity being greater than the second quantity. The operations of 2805 may be performed according to the methods described herein. In some examples, aspects of the operations of 2805 may be performed by a S-SSB manager as described with reference to FIGS. 11 through 14.

At 2810, the UE may identify the sidelink synchronization signal block period with the first quantity or the second quantity of sidelink synchronization signal blocks. The operations of 2810 may be performed according to the methods described herein. In some examples, aspects of the operations of 2810 may be performed by a S-SSB manager as described with reference to FIGS. 11 through 14.

At 2815, the UE may receive the first quantity or the second quantity of sidelink synchronization signal blocks in the sidelink synchronization signal block period based on the determining. The operations of 2815 may be performed according to the methods described herein. In some examples, aspects of the operations of 2815 may be performed by a S-SSB manager as described with reference to FIGS. 11 through 14.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:

identifying a discovery reference signal (DRS) window in a shared spectrum comprising a plurality of starting positions for transmitting one or more sidelink synchronization signal blocks;

performing a listen-before-talk procedure to gain access to the discovery reference signal window in the shared spectrum; and transmitting the one or more sidelink synchronization signal blocks at a first starting position of the plurality of starting positions after gaining access to the discovery reference signal window in the shared spectrum, wherein the one or more sidelink synchronization signal blocks are transmitted in a sidelink bandwidth part, and a lower edge in a frequency domain of the one or more sidelink synchronization signal blocks is aligned with or offset from a lower edge in the frequency domain of the sidelink bandwidth part.

2. The method of claim 1, wherein transmitting the one or more sidelink synchronization signal blocks comprises:

transmitting a sidelink synchronization signal block of the one or more sidelink synchronization signal blocks in a physical sidelink broadcast channel with an indication of a slot that includes the synchronization signal block.

3. The method of claim 1, wherein transmitting the one or more sidelink synchronization signal blocks comprises:

transmitting a sidelink synchronization signal block of the one or more sidelink synchronization signal blocks in a physical sidelink broadcast channel with a demodulation reference signal scrambling sequence indicating a beam index of a beam used to transmit the synchronization signal block.

4. The method of claim 1, wherein the performing the listen-before-talk procedure comprises:

performing a category two listen-before-talk procedure to gain access to the discovery reference signal window in the shared spectrum.

5. The method of claim 1, wherein the performing the listen-before-talk procedure comprises:

performing a category four listen-before-talk procedure to gain access to the discovery reference signal window in the shared spectrum.

6. The method of claim 1, wherein the performing the listen-before-talk procedure comprises:

performing a category two or a category four listen-before-talk procedure with a highest available priority associated therewith to gain access to the discovery reference signal window in the shared spectrum.

7. A user equipment (UE), comprising:

one or more memories storing processor-executable code; and one or more processors coupled with the one or more memories and individually or collectively operable to execute the code to cause the UE to:

identify a discovery reference signal (DRS) window in a shared spectrum comprising a plurality of starting positions for transmitting one or more sidelink synchronization signal blocks;

perform a listen-before-talk procedure to gain access to the discovery reference signal window in the shared spectrum; and transmit the one or more sidelink synchronization signal blocks at a first starting position of the plurality of starting positions after gaining access to the discovery reference signal window in the shared spectrum, wherein the one or more sidelink synchronization signal blocks are transmitted in a sidelink bandwidth part, and a lower edge in a frequency domain of the one or more sidelink synchronization signal blocks is aligned with or offset from a lower edge in the frequency domain of the sidelink bandwidth part.

8. The UE of claim 7, wherein to transmit the one or more sidelink synchronization signal blocks, the one or more processors are individually or collectively operable to execute the code to cause the UE to:

transmit a sidelink synchronization signal block of the one or more sidelink synchronization signal blocks in a physical sidelink broadcast channel with an indication of a slot that includes the synchronization signal block.

9. The UE of claim 7, wherein to transmit the one or more sidelink synchronization signal blocks, the one or more processors are individually or collectively operable to execute the code to cause the UE to:

transmitting a sidelink synchronization signal block of the one or more sidelink synchronization signal blocks in a physical sidelink broadcast channel with a demodulation reference signal scrambling sequence indicating a beam index of a beam used to transmit the synchronization signal block.

10. The UE of claim 7, wherein to perform the listen-before-talk procedure, the one or more processors are individually or collectively operable to execute the code to cause the UE to:

perform a category two listen-before-talk procedure to gain access to the discovery reference signal window in the shared spectrum.

11. The UE of claim 7, wherein to perform the listen-before-talk procedure, the one or more processors are individually or collectively operable to execute the code to cause the UE to:

perform a category four listen-before-talk procedure to gain access to the discovery reference signal window in the shared spectrum.

12. The UE of claim 7, wherein to perform the listen-before-talk procedure, the one or more processors are individually or collectively operable to execute the code to cause the UE to:

perform a category two or a category four listen-before-talk procedure using a highest available priority associated therewith to gain access to the discovery reference signal window in the shared spectrum.

13. A user equipment (UE) for wireless communications, comprising:

means for identifying a discovery reference signal (DRS) window in a shared spectrum comprising a plurality of starting positions for transmitting one or more sidelink synchronization signal blocks;

means for performing a listen-before-talk procedure to gain access to the discovery reference signal window in the shared spectrum; and means for transmitting the one or more sidelink synchronization signal blocks at a first starting position of the plurality of starting positions after gaining access to the discovery reference signal window in the shared spectrum, wherein the one or more sidelink synchronization signal blocks are transmitted in a sidelink bandwidth part, and a lower edge in a frequency domain of the one or more sidelink synchronization signal blocks is aligned with or offset from a lower edge in the frequency domain of the sidelink bandwidth part.

14. The UE of claim 13, wherein the means for transmitting the one or more sidelink synchronization signal blocks comprise:

means for transmitting a sidelink synchronization signal block of the one or more sidelink synchronization signal blocks in a physical sidelink broadcast channel with an indication of a slot that includes the synchronization signal block.

15. The UE of claim 13, wherein the means for transmitting the one or more sidelink synchronization signal blocks comprise:

means for transmitting a sidelink synchronization signal block of the one or more sidelink synchronization signal blocks in a physical sidelink broadcast channel with a demodulation reference signal scrambling sequence indicating a beam index of a beam used to transmit the synchronization signal block.

16. The UE of claim 13, wherein the means for performing the listen-before-talk procedure comprise:

means for performing a category two listen-before-talk procedure to gain access to the discovery reference signal window in the shared spectrum.

17. The UE of claim 13, wherein the means for performing the listen-before-talk procedure comprise:

means for performing a category four listen-before-talk procedure to gain access to the discovery reference signal window in the shared spectrum.

18. The UE of claim 13, wherein the means for performing the listen-before-talk procedure comprise:

means for performing a category two or a category four listen-before-talk procedure with a highest available priority associated therewith to gain access to the discovery reference signal window in the shared spectrum.

19. A non-transitory computer-readable medium storing code for wireless communications, the code comprising instructions executable by one or more processors to:

identify a discovery reference signal (DRS) window in a shared spectrum comprising a plurality of starting positions for transmitting one or more sidelink synchronization signal blocks;

perform a listen-before-talk procedure to gain access to the discovery reference signal window in the shared spectrum; and transmit the one or more sidelink synchronization signal blocks at a first starting position of the plurality of starting positions after gaining access to the discovery reference signal window in the shared spectrum, wherein the one or more sidelink synchronization signal blocks are transmitted in a sidelink bandwidth part, and a lower edge in a frequency domain of the one or more sidelink synchronization signal blocks is aligned with or offset from a lower edge in the frequency domain of the sidelink bandwidth part.

20. The non-transitory computer-readable medium of claim 19, wherein the instructions to transmit the one or more sidelink synchronization signal blocks are executable by the one or more processors to:

transmit a sidelink synchronization signal block of the one or more sidelink synchronization signal blocks in a physical sidelink broadcast channel with an indication of a slot that includes the synchronization signal block.

21. The non-transitory computer-readable medium of claim 19, wherein the instructions to transmit the one or more sidelink synchronization signal blocks are executable by the one or more processors to:

transmit a sidelink synchronization signal block of the one or more sidelink synchronization signal blocks in a physical sidelink broadcast channel with a demodulation reference signal scrambling sequence indicating a beam index of a beam used to transmit the synchronization signal block.

22. The non-transitory computer-readable medium of claim 19, wherein the instructions to perform the listen-before-talk procedure are executable by the one or more processors to:

perform a category two listen-before-talk procedure to gain access to the discovery reference signal window in the shared spectrum.

23. The non-transitory computer-readable medium of claim 19, wherein the instructions to perform the listen-before-talk procedure are executable by the one or more processors to:

perform a category four listen-before-talk procedure to gain access to the discovery reference signal window in the shared spectrum.

24. The non-transitory computer-readable medium of claim 19, wherein the instructions to perform the listen-before-talk procedure are executable by the one or more processors to:

perform a category two or a category four listen-before-talk procedure with a highest available priority associated therewith to gain access to the discovery reference signal window in the shared spectrum.

* * * * *